US012684300B2

(12) United States Patent
Qi et al.

(10) Patent No.: US 12,684,300 B2
(45) **Date of Patent: *Jul. 14, 2026**

(54) SYSTEMS AND METHODS FOR SUPPRESSING SOUND LEAKAGE

(71) Applicant: SHENZHEN SHOKZ CO., LTD., Guangdong (CN)

(72) Inventors: Xin Qi, Shenzhen (CN); Fengyun Liao, Shenzhen (CN); Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 120 days.

This patent is subject to a terminal disclaimer.

(21) Appl. No.: 18/468,676

(22) Filed: Sep. 15, 2023

(65) Prior Publication Data

US 2024/0007804 A1 Jan. 4, 2024

Related U.S. Application Data

(63) Continuation-in-part of application No. 18/334,401, filed on Jun. 14, 2023, which is a continuation of (Continued)

(51) Int. Cl.
*H04R 25/00* (2006.01)
*G10K 9/13* (2006.01)

(Continued)

(52) U.S. Cl.
CPC ............. *H04R 25/505* (2013.01); *G10K 9/13* (2013.01); *G10K 9/22* (2013.01); *G10K 11/175* (2013.01);

(Continued)

(58) Field of Classification Search
CPC ........ H04R 1/025; H04R 1/10; H04R 1/2811; H04R 1/2849; H04R 1/2876; H04R 1/288;

(Continued)

(56) References Cited

U.S. PATENT DOCUMENTS 2,327,320 A 8/1943 Shapiro
4,987,597 A 1/1991 Haertl (Continued)

FOREIGN PATENT DOCUMENTS

CN 202602881 U 12/2012
CN 109547888 A 3/2019

(Continued)

OTHER PUBLICATIONS

Notice of Preliminary Rejection in Korean Application No. 10-2024-7027447 mailed on Aug. 13, 2025, 10 pages.

(Continued)

*Primary Examiner* — Phylesha Dabney
(74) *Attorney, Agent, or Firm* — METIS IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole guides the sound wave inside the housing through the at least one sound guiding hole to an outside of the housing. The guided sound wave interferes with the leaked sound wave in a target region. The interference at a specific frequency relates to a distance between the at least one sound guiding hole and the portion of the housing.

20 Claims, 32 Drawing Sheets

Related U.S. Application Data application No. PCT/CN2023/083546, filed on Mar. 24, 2023, application No. 18/468,676 is a continuation-in-part of application No. 18/187,652, filed on Mar. 21, 2023, now Pat. No. 12,342,132, which is a continuation of application No. 17/455,927, filed on Nov. 22, 2021, now Pat. No. 11,622,211, which is a continuation of application No. 17/074,762, filed on Oct. 20, 2020, now Pat. No. 11,197,106, which is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978.

(51) Int. Cl.

| | |
|---|---|
| ***G10K 9/22*** | (2006.01) |
| ***G10K 11/175*** | (2006.01) |
| ***G10K 11/178*** | (2006.01) |
| ***G10K 11/26*** | (2006.01) |
| ***H04R 1/02*** | (2006.01) |
| ***H04R 1/10*** | (2006.01) |
| ***H04R 1/28*** | (2006.01) |
| ***H04R 1/34*** | (2006.01) |
| ***H04R 9/06*** | (2006.01) |
| *H04R 17/00* | (2006.01) |

(52) U.S. Cl.

CPC ............ *G10K 11/178* (2013.01); *G10K 11/26* (2013.01); *H04R 1/025* (2013.01); *H04R 1/10* (2013.01); *H04R 1/2811* (2013.01); *H04R 1/2849* (2013.01); *H04R 1/288* (2013.01); *H04R 1/345* (2013.01); *H04R 9/066* (2013.01); *G10K 2210/3216* (2013.01); *H04R 1/2876* (2013.01); *H04R 17/00* (2013.01); *H04R 2460/13* (2013.01)

(58) Field of Classification Search

CPC .... H04R 1/345; H04R 17/00; H04R 2460/13; H04R 25/505; H04R 9/06; H04R 9/066; H04R 1/1008; H04R 1/105; H04R 1/1075; H04R 2201/10; H04R 2400/11; H04R 9/025

USPC ............................................................ 381/60

See application file for complete search history.

(56) References Cited

U.S. PATENT DOCUMENTS

| | | | |
|---|---|---|---|
| 5,430,803 | A | 7/1995 | Kimura et al. |
| 5,692,059 | A | 11/1997 | Kruger |
| 5,757,935 | A | 5/1998 | Kang et al. |
| 5,790,684 | A | 8/1998 | Niino et al. |
| 6,478,108 | B1 | 11/2002 | Linhard et al. |
| 6,850,138 | B1 | 2/2005 | Sakai |
| 7,639,825 | B2 | 12/2009 | Fukuda |
| 8,141,678 | B2 | 3/2012 | Ikeyama et al. |
| 8,340,334 | B2 | 12/2012 | Suyama |
| 8,345,915 | B2 | 1/2013 | Shin et al. |
| 9,226,075 | B2 | 12/2015 | Lee |
| 9,729,978 | B2 | 8/2017 | Qi et al. |
| 10,149,071 | B2 | 12/2018 | Qi et al. |
| 10,334,372 | B2 | 6/2019 | Qi et al. |
| 10,506,362 | B1 | 12/2019 | Gomes |
| 10,631,075 | B1 | 4/2020 | Patil et al. |
| 10,897,677 | B2 | 1/2021 | Walraevens et al. |
| 11,197,106 | B2 | 12/2021 | Qi et al. |
| 11,582,563 | B2 | 2/2023 | Qi et al. |
| 12,052,537 | B2 | 7/2024 | Zhang et al. |
| 12,063,472 | B2 | 8/2024 | Zhang et al. |
| 2003/0048913 | A1 | 3/2003 | Lee et al. |
| 2003/0235321 | A1 | 12/2003 | Lu |
| 2004/0131219 | A1 | 7/2004 | Polk, Jr. |
| 2005/0251952 | A1 | 11/2005 | Johnson |
| 2006/0098829 | A1 | 5/2006 | Kobayashi |
| 2007/0009133 | A1 | 1/2007 | Gerkinsmeyer |
| 2007/0034493 | A1 | 2/2007 | Kawasaki et al. |
| 2007/0041595 | A1 | 2/2007 | Carazo et al. |
| 2007/0237341 | A1 | 10/2007 | Laroche |
| 2008/0144874 | A1 | 6/2008 | Wu et al. |
| 2009/0095613 | A1 | 4/2009 | Lin |
| 2009/0127020 | A1 | 5/2009 | Connor |
| 2009/0147981 | A1 | 6/2009 | Blanchard et al. |
| 2009/0208031 | A1 | 8/2009 | Abolfathi |
| 2009/0285417 | A1 | 11/2009 | Shin et al. |
| 2009/0290730 | A1 | 11/2009 | Fukuda et al. |
| 2010/0054492 | A1 | 3/2010 | Eaton et al. |
| 2010/0086167 | A1 | 4/2010 | Akihiko et al. |
| 2010/0316235 | A1 | 12/2010 | Park et al. |
| 2010/0322454 | A1 | 12/2010 | Ambrose et al. |
| 2011/0150262 | A1 | 6/2011 | Nakama |
| 2012/0020501 | A1 | 1/2012 | Lee |
| 2012/0070022 | A1 | 3/2012 | Saiki |
| 2012/0177206 | A1 | 7/2012 | Yamagishi et al. |
| 2012/0201406 | A1 | 8/2012 | Yamaguchi |
| 2013/0188803 | A1 | 7/2013 | Shaanan et al. |
| 2013/0287242 | A1 | 10/2013 | Nabata et al. |
| 2013/0329919 | A1 | 12/2013 | He |
| 2014/0009008 | A1 | 1/2014 | Li et al. |
| 2014/0064533 | A1 | 3/2014 | Kasic, II |
| 2014/0185822 | A1 | 7/2014 | Kunimoto et al. |
| 2014/0185837 | A1 | 7/2014 | Kunimoto et al. |
| 2014/0274229 | A1 | 9/2014 | Fukuda |
| 2014/0315605 | A1 | 10/2014 | Cho et al. |
| 2014/0355777 | A1 | 12/2014 | Nabaa et al. |
| 2015/0030189 | A1 | 1/2015 | Nabata et al. |
| 2015/0256656 | A1 | 9/2015 | Horii |
| 2015/0264473 | A1 | 9/2015 | Fukuda |
| 2015/0326967 | A1 | 11/2015 | Otani |
| 2016/0037243 | A1 | 2/2016 | Lippert et al. |
| 2016/0150337 | A1 | 5/2016 | Nandy |
| 2016/0165357 | A1 | 6/2016 | Morishita et al. |
| 2016/0219360 | A1 | 7/2016 | Zhao et al. |
| 2016/0295328 | A1 | 10/2016 | Park |
| 2016/0329041 | A1 | 11/2016 | Qi et al. |
| 2017/0201823 | A1 | 7/2017 | Shetye et al. |
| 2017/0223445 | A1 | 8/2017 | Bullen et al. |
| 2017/0289667 | A1 | 10/2017 | Okita |
| 2018/0033419 | A1 | 2/2018 | Shetye et al. |
| 2018/0054670 | A1 | 2/2018 | Struzik et al. |
| 2018/0167710 | A1 | 6/2018 | Silver et al. |
| 2018/0182370 | A1 | 6/2018 | Hyde et al. |
| 2018/0288518 | A1 | 10/2018 | Schmidt et al. |
| 2019/0052954 | A1 | 2/2019 | Rusconi Clerici Beltrami et al. |
| 2019/0238971 | A1 | 8/2019 | Wakeland et al. |
| 2019/0320258 | A1 | 10/2019 | Ohura |
| 2020/0196062 | A1 | 6/2020 | Zhang |
| 2020/0367008 | A1 | 11/2020 | Walsh et al. |
| 2021/0067857 | A1 | 3/2021 | Struzik |
| 2021/0099027 | A1 | 4/2021 | Larsson et al. |
| 2021/0219059 | A1 | 7/2021 | Qi et al. |
| 2021/0306738 | A1 | 9/2021 | Nilsen |
| 2021/0392430 | A1 | 12/2021 | Peeters |
| 2022/0053259 | A1 | 2/2022 | Daley et al. |
| 2022/0095029 | A1 | 3/2022 | Zheng et al. |
| 2022/0124428 | A1 | 4/2022 | Zheng et al. |
| 2022/0312108 | A1 | 9/2022 | Zhang et al. |
| 2023/0130211 | A1 | 4/2023 | Li et al. |
| 2023/0179907 | A1 | 6/2023 | Zhang et al. |
| 2023/0254634 | A1 | 8/2023 | Li et al. |

(56) References Cited

U.S. PATENT DOCUMENTS

| | | | |
|---|---|---|---|
| 2024/0107219 A1 | 3/2024 | He | |
| 2024/0276155 A1 | 8/2024 | Li et al. | |

FOREIGN PATENT DOCUMENTS

| | | | |
|---|---|---|---|
| CN | 209330353 | U | 8/2019 |
| CN | 212909891 | U | 4/2021 |
| CN | 214014497 | U | 8/2021 |
| CN | 113573215 | A | 10/2021 |
| CN | 113905304 | A | 1/2022 |
| CN | 114286228 | A | 4/2022 |
| CN | 114286237 | A | 4/2022 |
| CN | 216357224 | U | 4/2022 |
| CN | 115175069 | A | 10/2022 |
| CN | 115209264 | A | 10/2022 |
| CN | 115209267 | A | 10/2022 |
| CN | 115209268 | A | 10/2022 |
| CN | 115209285 | A | 10/2022 |
| JP | S5977795 | A | 5/1984 |
| JP | 2001326986 | A | 11/2001 |
| JP | 4580025 | B1 | 11/2010 |
| JP | 2013232845 | A | 11/2013 |
| KR | 970006323 | Y1 | 6/1997 |
| WO | 2021133679 | A1 | 7/2021 |

OTHER PUBLICATIONS

Notice of Allowance in Japanese Application No. 2024-550246 mailed on Sep. 2, 2025, 6 pages.

The Extended European Search Report in European Application No. 23881092.3 mailed on Jun. 30, 2025, 9 pages.

The Extended European Search Report in European Application No. 23881047.7 mailed on Apr. 2, 2025, 9 pages.

Notice of Reasons for Rejection in Japanese Application No. 2024550245 mailed on Sep. 2, 2025, 8 pages.

SYSTEMS AND METHODS FOR SUPPRESSING SOUND LEAKAGE

CROSS-REFERENCE TO RELATED APPLICATIONS

The present application is a continuation-in-part of U.S. patent application Ser. No. 18/187,652, filed on Mar. 21, 2023, which is a continuation of U.S. patent application Ser. No. 17/455,927 (issued as U.S. Pat. No. 11,622,211), filed on Nov. 22, 2021, which is a continuation of U.S. patent application Ser. No. 17/074,762 (issued as U.S. Pat. No. 11,197,106), filed on Oct. 20, 2020, which is a continuation-in-part of U.S. patent application Ser. No. 16/813,915 (issued as U.S. Pat. No. 10,848,878), filed on Mar. 10, 2020, which is a continuation of U.S. patent application Ser. No. 16/419,049 (issued as U.S. Pat. No. 10,616,696), filed on May 22, 2019, which is a continuation of U.S. patent application Ser. No. 16/180,020 (issued as U.S. Pat. No. 10,334,372), filed on Nov. 5, 2018, which is a continuation of U.S. patent application Ser. No. 15/650,909 (issued as U.S. Pat. No. 10,149,071), filed on Jul. 16, 2017, which is a continuation of U.S. patent application Ser. No. 15/109,831 (issued as U.S. Pat. No. 9,729,978), filed on Jul. 6, 2016, which is a U.S. National Stage entry under 35 U.S.C. § 371 of International Application No. PCT/CN2014/094065, filed on Dec. 17, 2014, designating the United States of America, which claims priority to Chinese Patent Application No. 201410005804.0, filed on Jan. 6, 2014; the present application is also a continuation-in-part of U.S. patent application Ser. No. 18/334,401, filed on Jun. 14, 2023, which is a is a continuation of International Patent Application No. PCT/CN2023/083546, filed on Mar. 24, 2023, which claims priority of Chinese Patent Application No. 202211336918.4, filed on Oct. 28, 2022, Chinese Patent Application No. 202223239628.6, filed on Dec. 1, 2022, International Application No. PCT/CN2022/144339, filed on Dec. 30, 2022, International Application No. PCT/CN2023/079411, filed on Mar. 2, 2023, International Application No. PCT/CN2023/079404, filed on Mar. 2, 2023, and International Application No. PCT/CN2023/079410, filed on Mar. 2, 2023. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a vibration board 1210, a transducer 1220, and a linking component 123. The transducer 1220 may transduce electrical signals to mechanical vibrations. The vibration board 1210 may be connected to the transducer 1220 and vibrate synchronically with the transducer 1220. The vibration board 1210 may stretch out from the opening of the housing 110 and contact with human skin to pass vibrations to auditory nerves through human tissues and bones, which in turn enables people to hear sound. The linking component 123 may reside between the transducer 1220 and the housing 110, configured to fix the vibrating transducer 1220 inside the housing 110. To minimize its effect on the vibrations generated by the transducer 1220, the linking component 123 may be made of an elastic material.

However, the mechanical vibrations generated by the transducer 1220 may not only cause the vibration board 1210 to vibrate, but may also cause the housing 110 to vibrate through the linking component 123. Accordingly, the mechanical vibrations generated by the bone conduction speaker may push human tissues through the bone board 1210, and at the same time a portion of the vibrating board 1210 and the housing 110 that are not in contact with human issues may nevertheless push air. Air sound may thus be generated by the air pushed by the portion of the vibrating board 1210 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including:

providing a bone conduction speaker including a vibration board fitting human skin and passing vibrations, a transducer, and a housing, wherein at least one sound guiding hole is located in at least one portion of the housing;

the transducer drives the vibration board to vibrate;

the housing vibrates, along with the vibrations of the transducer, and pushes air, forming a leaked sound wave transmitted in the air;

the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a vibration board and a transducer, wherein:

the transducer is configured to generate vibrations and is located inside the housing;

the vibration board is configured to be in contact with skin and pass vibrations;

At least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 1210, vibration board; 1220, transducer; 123, linking component; 210, first frame; 220, second frame; 230, moving coil; 240, inner magnetic component; 250, outer magnetic component; 260; vibration board; 270, vibration unit; 1000, housing; 1100, sidewall; 1200, bottom; 21, vibration board; 22, transducer; 23, linking component; 24, elastic component; 30, sound guiding hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
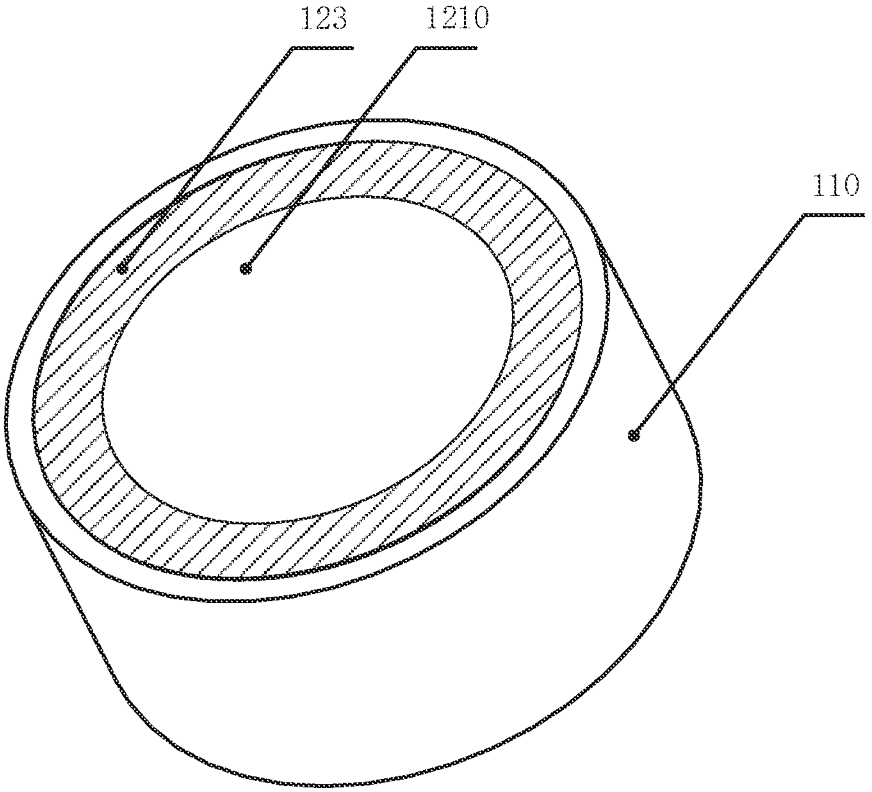
FIGS. 1A and 1B are schematic structures illustrating a bone conduction speaker of prior art.
Figure 1B:
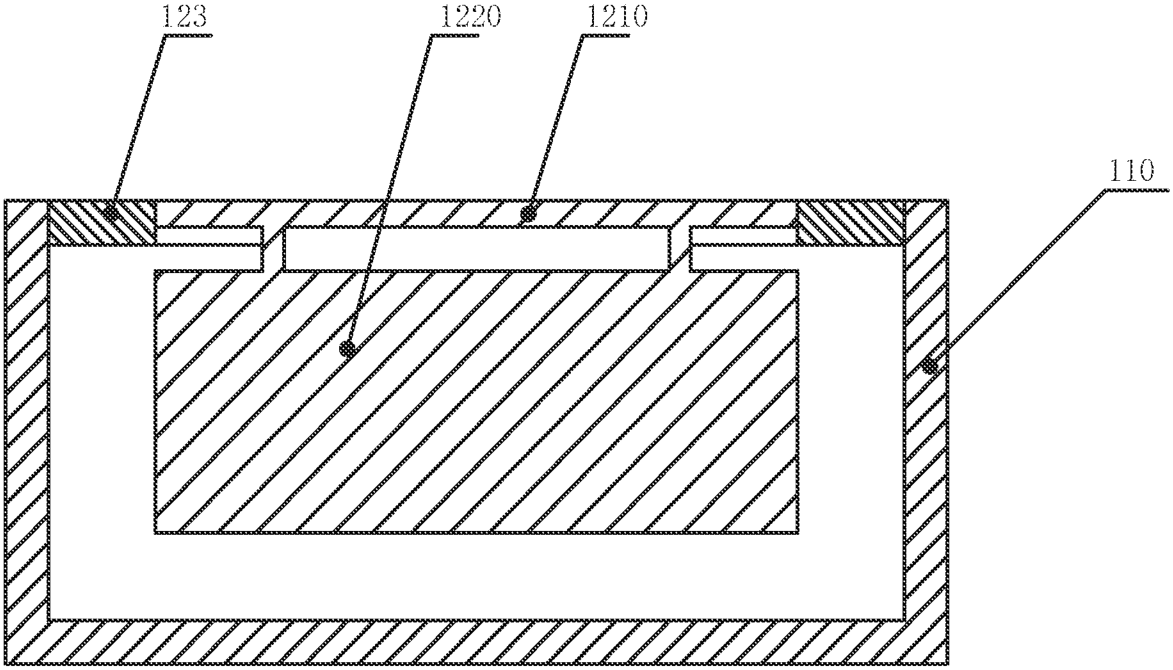
Figure 2:
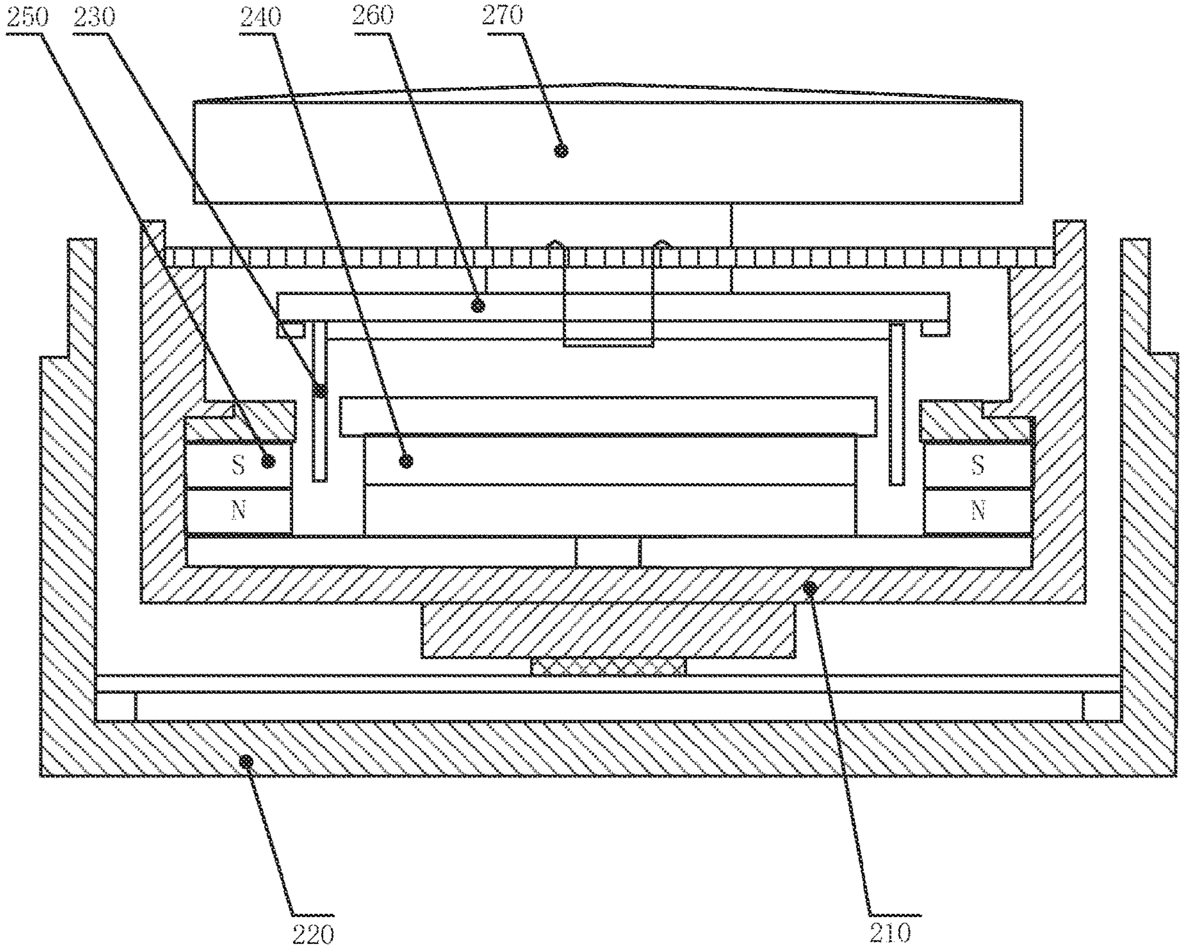
FIG. 2 is a schematic structure illustrating another bone conduction speaker of prior art.
Figure 3:
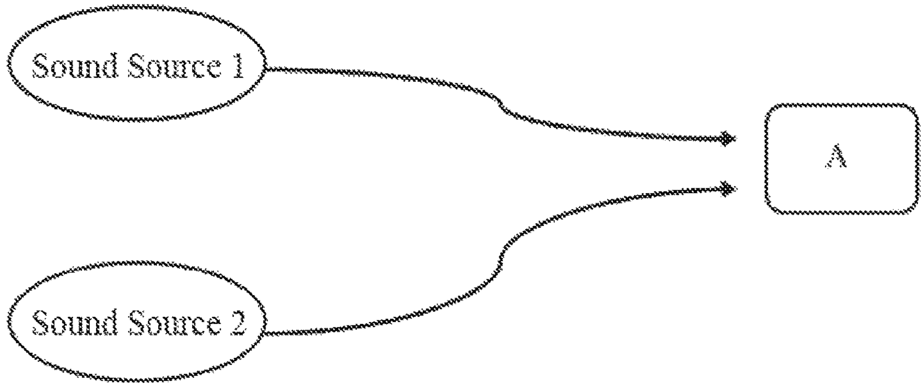
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage. This disclosure also applies above-noted principles of sound wave interference to an air conduction speaker and discloses an air conduction speaker that can reduce sound leakage and/or an earphone including the air conduction speaker.

Embodiment One

Figure 4A:
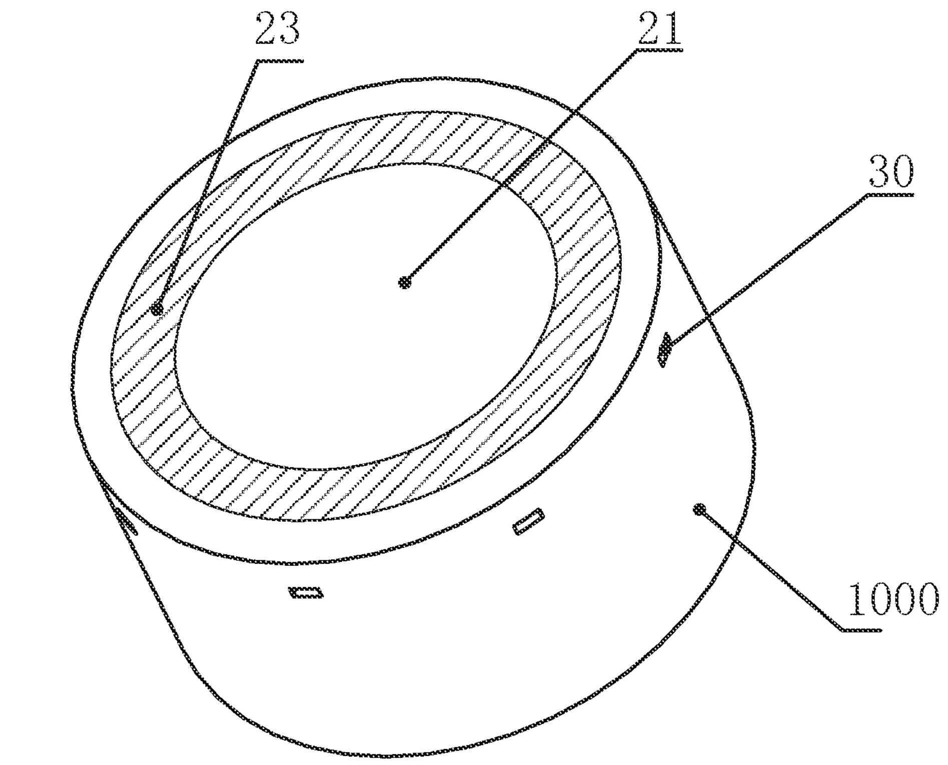
FIGS. 4A and 4B are schematic structures of an exemplary bone conduction speaker according to some embodiments of the present disclosure.
Figure 4B:
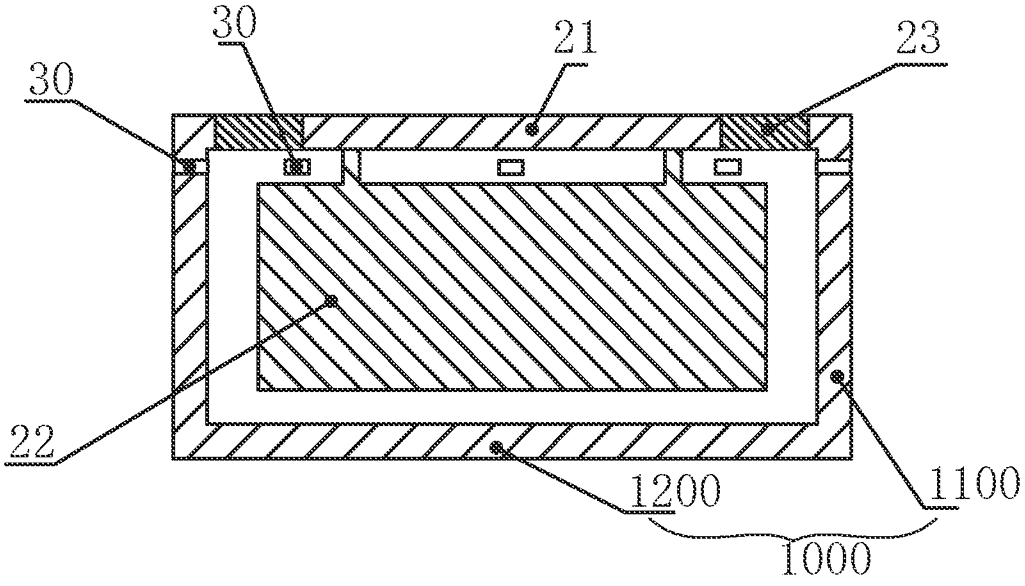

FIGS. 4A and 4B are schematic structures of an exemplary bone conduction speaker. The bone conduction speaker may include a housing 1000, a vibration board 21, and a transducer 22. The transducer 22 may be inside the housing 1000 and configured to generate vibrations. The housing 1000 may have one or more sound guiding holes 30. The sound guiding hole(s) 30 may be configured to guide sound waves inside the housing 1000 to the outside of the housing 1000. In some embodiments, the guided sound waves may form interference with leaked sound waves generated by the vibrations of the housing 1000, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the vibration board 21 may be connected to the transducer 22 and configured to vibrate along with the transducer 22. The vibration board 21 may stretch out from the opening of the housing 1000, and touch the skin of the user and pass vibrations to auditory nerves through human tissues and bones, which in turn enables the user to hear sound. The linking component 23 may reside between the transducer 22 and the housing 1000, configured to fix the vibrating transducer 1220 inside the housing. The linking component 23 may include one or more separate components, or may be integrated with the transducer 22 or the housing 1000. In some embodiments, the linking component 23 is made of an elastic material.

The transducer 22 may drive the vibration board 21 to vibrate. The transducer 22, which resides inside the housing 1000, may vibrate. The vibrations of the transducer 22 may drives the air inside the housing 1000 to vibrate, producing a sound wave inside the housing 1000, which can be referred to as "sound wave inside the housing." Since the vibration board 21 and the transducer 22 are fixed to the housing 1000 via the linking component 23, the vibrations may pass to the housing 1000, causing the housing 1000 to vibrate synchronously. The vibrations of the housing 1000 may generate a leaked sound wave, which spreads outwards as sound leakage.

The sound wave inside the housing and the leaked sound wave are like the two sound sources in FIG. 3. In some embodiments, the sidewall 1100 of the housing 1000 may have one or more sound guiding holes 30 configured to guide the sound wave inside the housing 1000 to the outside. The guided sound wave through the sound guiding hole(s) 30 may interfere with the leaked sound wave generated by the vibrations of the housing 1000, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 1100. As used herein, the upper portion of the sidewall 1100 refers to the portion of the sidewall 1100 starting from the top of the sidewall (contacting with the vibration board 21) to about the ⅓ height of the sidewall.

Figure 4C:
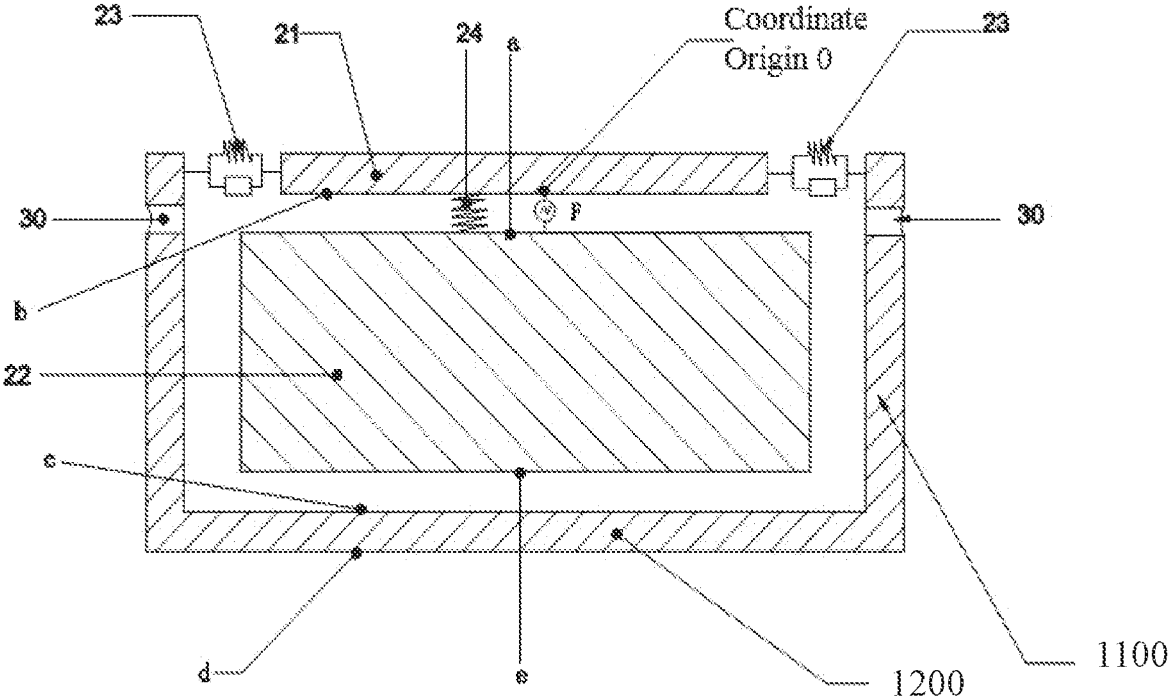
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 1100 of the housing 1000 and the vibration board 21 may be represented by an elastic element 23 and a damping element in the parallel connection. The linking relationship between the vibration board 21 and the transducer 22 may be represented by an elastic element 24.

Outside the housing 1000, the sound leakage reduction is proportional to $$\left(\iint_{S_{hole}} P\,ds - \iint_{S_{housing}} P_d\,ds\right) \tag{1}$$

wherein $S_{hole}$ is the area of the opening of the sound guiding hole 30, $S_{housing}$ is the area of the housing 1000 (e.g., the sidewall 1100 and the bottom 1200) that is not in contact with human face.

The pressure inside the housing may be expressed as $$P=P_a+P_b+P_c+P_e \tag{2}$$

wherein $P_a$, $P_b$, $P_c$ and $P_e$, are the sound pressures of an arbitrary point inside the housing 1000 generated by side a, side b, side c and side e (as illustrated in FIG. 4C), respectively. As used herein, side a refers to the upper surface of the transducer 22 that is close to the vibration board 21, side b refers to the lower surface of the vibration board 21 that is close to the transducer 22, side c refers to the inner upper surface of the bottom 1200 that is close to the transducer 22, and side e refers to the lower surface of the transducer 22 that is close to the bottom 1200.

The center of the side b, 0 point, is set as the origin of the space coordinates, and the side b can be set as the z=0 plane, so $P_a$, $P_b$, $P_c$ and $P_e$, may be expressed as follows:

$$P_a(x, y, z) = -j\omega\rho_0 \int\int_{S_a} W_a(x'_a, y'_a) \cdot \frac{e^{jkR(x'_a, y'_a)}}{4\pi R(x'_a, y'_a)} dx'_a dy'_a - P_{aR} \tag{6}$$

-continued $$P_b(x,y,z) = -j\omega\rho_0 \int\int_{S_b} W_b(x',y') \cdot \frac{e^{jkR(x',y')}}{4\pi R(x',y')} dx'dy' - P_{bR} \quad (4)$$

$$P_c(x,y,z) = -j\omega\rho_0 \int\int_{S_c} W_c(x'_c,y'_c) \cdot \frac{e^{jkR(x'_c,y'_c)}}{4\pi R(x'_c,y'_c)} dx'_c dy'_c - P_{cR} \quad (5)$$

$$P_e(x,y,z) = -j\omega\rho_0 \int\int_{S_e} W_e(x'_e,y'_e) \cdot \frac{e^{jkR(x'_e,y'_e)}}{4\pi R(x'_e,y'_e)} dx'_e dy'_e - P_{eR} \quad (6)$$

wherein $R(x', y')=\sqrt{(x-x')^2+(y-y')^2+z^2}$ is the distance between the observation point (x, y, z) and a point on side b (x', y', 0); $S_a$, $S_b$, $S_c$ and $S_e$ are the areas of side a, side b, side c and side e, respectively;

$R(x'_a, y'_a)=\sqrt{(x-x_a')^2+(y-y_a')^2+(z-z_a)^2}$ is the distance between the observation point (x, y, z) and a point on side a ($x'_a$, $y'_a$, $z_a$);

$R(x'_c, y'_c)=\sqrt{(x-x_c')^2+(y-y_c')^2+(z-z_c)^2}$ is the distance between the observation point (x, y, z) and a point on side c ($x'_c$, $y'_c$, $z_c$);

$R(x'_e, y'_e)=\sqrt{(x-x_e')^2+(y-y_e')^2+(z-z_e)^2}$ is the distance between the observation point (x, y, z) and a point on side e ($x'_e$, $y'_e$, $z_e$);

$k=\omega/u$ (u is the velocity of sound) is wave number, $\rho_0$ is an air density, $\omega$ is an angular frequency of vibration;

$P_{aR}$, $P_{bR}$, $P_{cR}$ and $P_{eR}$ are acoustic resistances of air, which respectively are:

$$P_{aR} = A \cdot \frac{z_a \cdot r + j\omega \cdot z_a \cdot r'}{\varphi} + \delta \quad (7)$$

$$P_{bR} = A \cdot \frac{z_b \cdot r + j\omega \cdot z_b \cdot r'}{\varphi} + \delta \quad (8)$$

$$P_{cR} = A \cdot \frac{z_c \cdot r + j\omega \cdot z_c \cdot r'}{\varphi} + \delta \quad (9)$$

$$P_{eR} = A \cdot \frac{z_e \cdot r + j\omega z_e \cdot r'}{\varphi} + \delta \quad (10)$$

wherein r is the acoustic resistance per unit length, r' is the sound quality per unit length, z a is the distance between the observation point and side a, z b is the distance between the observation point and side b, $z_c$ is the distance between the observation point and side c, z e is the distance between the observation point and side e.

$W_a$ (x, y), $W_b$(x, y), $W_c$(x, y), $W_e$(x, y) and $W_d$(x, y) are the sound source power per unit area of side a, side b, side c, side e and side d, respectively, which can be derived from following formulas (11):

$$F_e=F_a=F-k_1 \cos \omega t-\iint_{S_a} W_a(x,y)dxdy-\iint_{S_e} W_e(x,y)dxdy-f$$

$$F_b=-F+k_1 \cos \omega t+\iint_{S_b} W_b(x,y)dxdy-\iint_{S_e} W_e(x,y)dxdy-L$$

$$F_c=F_d=F_b-k_2 \cos \omega t-\iint_{S_c} W_c(x,y)dxdy-f-\gamma$$

$$F_d=F_b-k_2 \cos \omega t-\iint_{S_d} W_d(x, y)dxdy \quad (11)$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 1200. S d is the region of side d, f is the viscous resistance formed in the small gap of the sidewalls, and $f=\eta\Delta s(dv/dy)$.

L is the equivalent load on human face when the vibration board acts on the human face, $\gamma$ is the energy dissipated on elastic element 24, $k_1$ and $k_2$ are the elastic coefficients of elastic element 23 and elastic element 24 respectively, $\eta$ is the fluid viscosity coefficient, dv/dy is the velocity gradient of fluid, $\Delta s$ is the cross-section area of a subject (board), A is the amplitude, $\varphi$ is the region of the sound field, and $\delta$ is a high order minimum (which is generated by the incompletely symmetrical shape of the housing);

The sound pressure of an arbitrary point outside the housing, generated by the vibration of the housing 1000 is expressed as:

$$P_d = -j\omega\rho_0 \int\int W_d(x'_d,y'_d) \cdot \frac{e^{jkR(x'_d,y'_d)}}{4\pi R(x'_d,y'_d)} dx'_d dy'_d \quad (12)$$

wherein $R(x'_d, y'_d)=\sqrt{(x-x_d')^2+(y-y_d')^2+(z-z_d)^2}$ is the distance between the observation point (x, y, z) and a point on side d ($x'_d$, $y'_d$, $z_d$).

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}}$ Pds.

In the meanwhile, because the vibration board 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 1000. For illustrative purposes, the sound pressure generated by the housing 1000 may be expressed as $\iint_{S_{housing}} P_d ds$.

The leaked sound wave and the guided sound wave interference may result in a weakened sound wave, i.e., to make $\iint_{S_{hole}}$ Pds and $\iint_{S_{housing}} P_d ds$ have the same value but opposite directions, and the sound leakage may be reduced. In some embodiments, if, $\iint_{S_{hole}}$ Pds may be adjusted to reduce the sound leakage. Since $\iint_{S_{hole}}$ Pds corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

Additionally, because of the basic structure and function differences of a bone conduction speaker and a traditional air conduction speaker, the formulas above are only suitable for bone conduction speakers. Whereas in traditional air conduction speakers, the air in the air housing can be treated as a whole, which is not sensitive to positions, and this is different intrinsically with a bone conduction speaker, therefore the above formulas are not suitable to an air conduction speaker.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
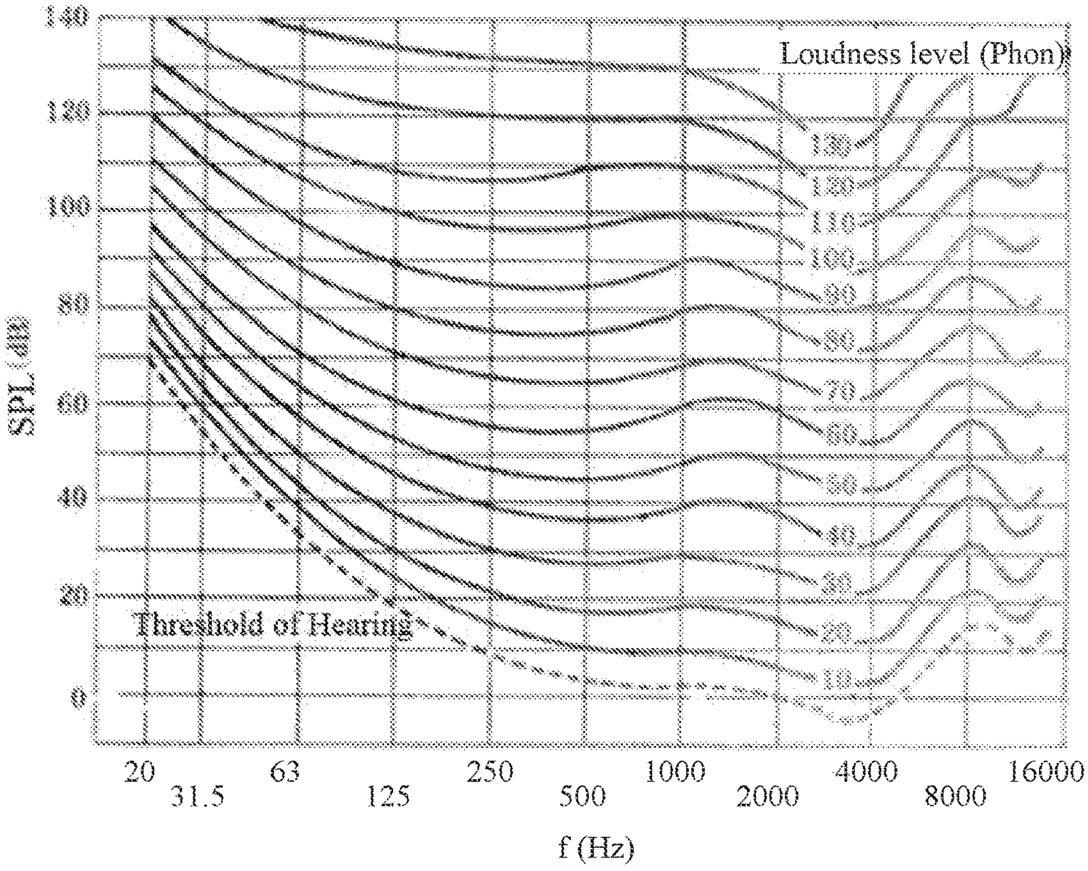
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz-4000 Hz, or 1000 Hz-4000 Hz, or 1000 Hz-3500 Hz, or 1000 Hz-3000 Hz, or 1500 Hz-3000 Hz. The sound leakage within the above-mentioned frequency ranges may be the sound leakage aimed to be reduced with a priority.

Figure 4D:
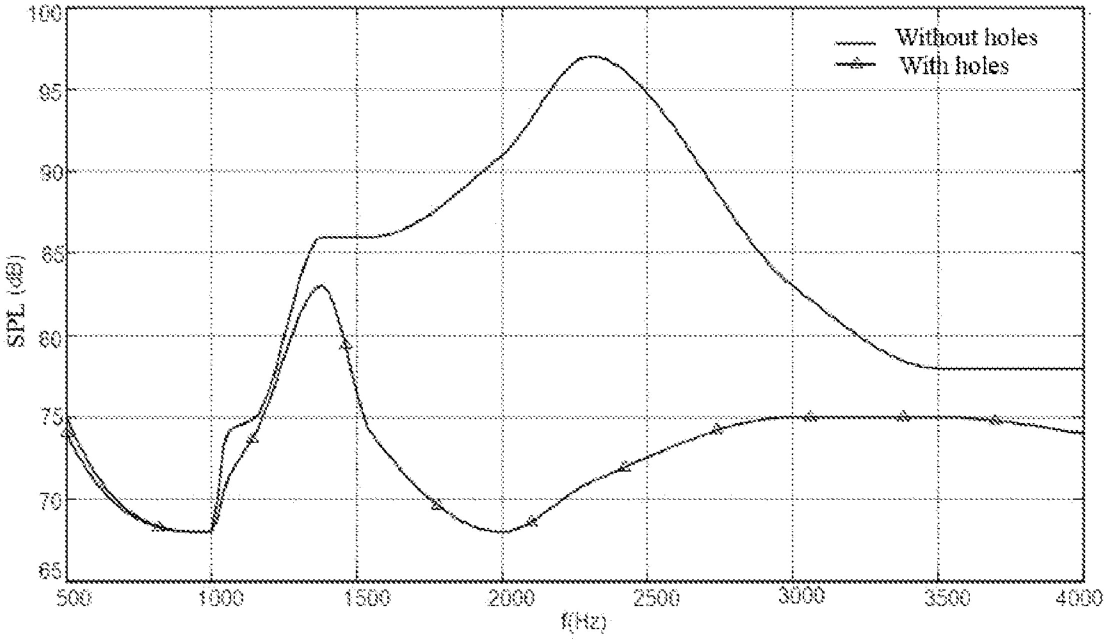
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz-3000 Hz, the sound leakage is reduced by over 10 dB. In the frequency range of 2000 Hz-2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 1000. The portion of the housing may be the sidewall 1100 of the housing 1000 and/or the bottom 1200 of the housing 1000. Merely by way of example, the leaked sound wave may be generated by the bottom 1200 of the housing 1000. The guided sound wave output through the sound guiding hole(s) 30 may interfere with the leaked sound wave generated by the portion of the housing 1000. The interference may enhance or reduce a sound pressure level of the guided sound wave and/or leaked sound wave in the target region.

In some embodiments, the portion of the housing 1000 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 1000 is small, the sound guiding hole may be approximately regarded as a point sound source. In some embodiments, any number or count of sound guiding holes provided on the housing 1000 for outputting sound may be approximated as a single point sound source. Similarly, for simplicity, the portion of the housing 1000 that generates the leaked sound wave may also be approximately regarded as a point sound source. In some embodiments, both the first sound source and the second sound source may approximately be regarded as point sound sources (also referred to as two-point sound sources).

Figure 4E:
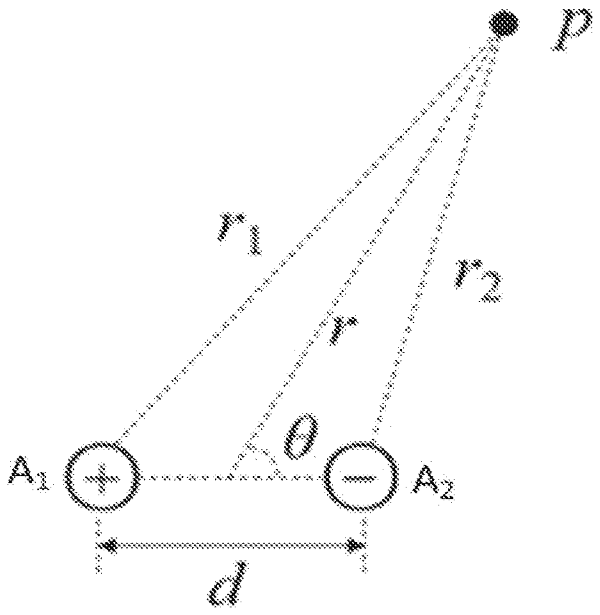
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure p generated by a single point sound source may satisfy Equation (13):

$$p = \frac{j\omega\rho_0}{4\pi r} Q_0 \exp j(\omega t - kr), \tag{13}$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 1000 that generates the leaked sound wave is large (e.g., the portion of the housing 1000 is a vibration surface or a sound radiation surface), the portion of the housing 1000 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 1000. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources. Merely by way of example, the air conduction speaker may include a diaphragm disposed in a cavity formed by a housing of the air conduction speaker. The housing may include a sound outlet configured to transmit a sound generated at a front side of the diaphragm to the human ear and at least one pressure relief hole configured to guide a sound generated at a rear side of the diaphragm out of the housing. The sound outlet and the at least one pressure relief hole, also referred to as sound guiding holes of the air conduction speaker, may be treated as the two-point sound sources. It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 1000 and the sound guiding hole(s) are opposite, that is, an absolute value of the phase difference between the two-point sound sources is 180 degrees, the far-field leakage may be reduced according to the principle of reversed phase cancellation.

In some embodiments, a size (e.g., an area, a depth), a position, etc. of at least one of the two-point sound sources may be adjusted to achieve better sound leakage reduction and/or improve the sound intensity at the ear canal. In some embodiments, the acoustic output device (e.g., the air conduction speaker) may be worn by the user through a suspension structure (e.g., an ear hook 12 illustrated in FIG. 15). For example, the acoustic output device may be implemented as an earphone including the suspension structure. In some embodiments, the earphone may be configured such that when the earphone is in a wearing state, the sound guiding holes (or the two-point sound sources) meet certain conditions, and the earphone may output different sound effects in the near field and the far field. For example, a connection line of the two-point sound sources may be directed to an ear canal (or a hearing position) of the user such that the user can hear a sufficiently loud sound. As another example, the earphone may be configured such that when the earphone is in a wearing state, at least a portion (e.g., an inner side surface IS of the housing 111) of the earphone and the human ear (e.g., the concha cavity 102 illustrated in FIG. 14) may form a cavity structure, one of the sound guiding holes (e.g., the sound outlet) may be in the cavity structure, and another one of the sound guiding holes (e.g., the at least one sound relief hole) may be outside the cavity structure, which may increase listening volume at the listening position and maintain a comparable sound leakage reduction effect. More description regarding the sound guiding holes (e.g., the sound outlet and/or the at least one pressure relief hole) and/or the earphone may be found elsewhere in the present disclosure. See, e.g., FIGS. 14-32 and relevant descriptions thereof.

In some embodiments, the interference between the guided sound wave and the leaked sound wave at a specific frequency may relate to a distance between the sound guiding hole(s) and the portion of the housing 1000. For example, if the sound guiding hole(s) are set at the upper portion of the sidewall of the housing 1000 (as illustrated in FIG. 4A), the distance between the sound guiding hole(s) and the portion of the housing 1000 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
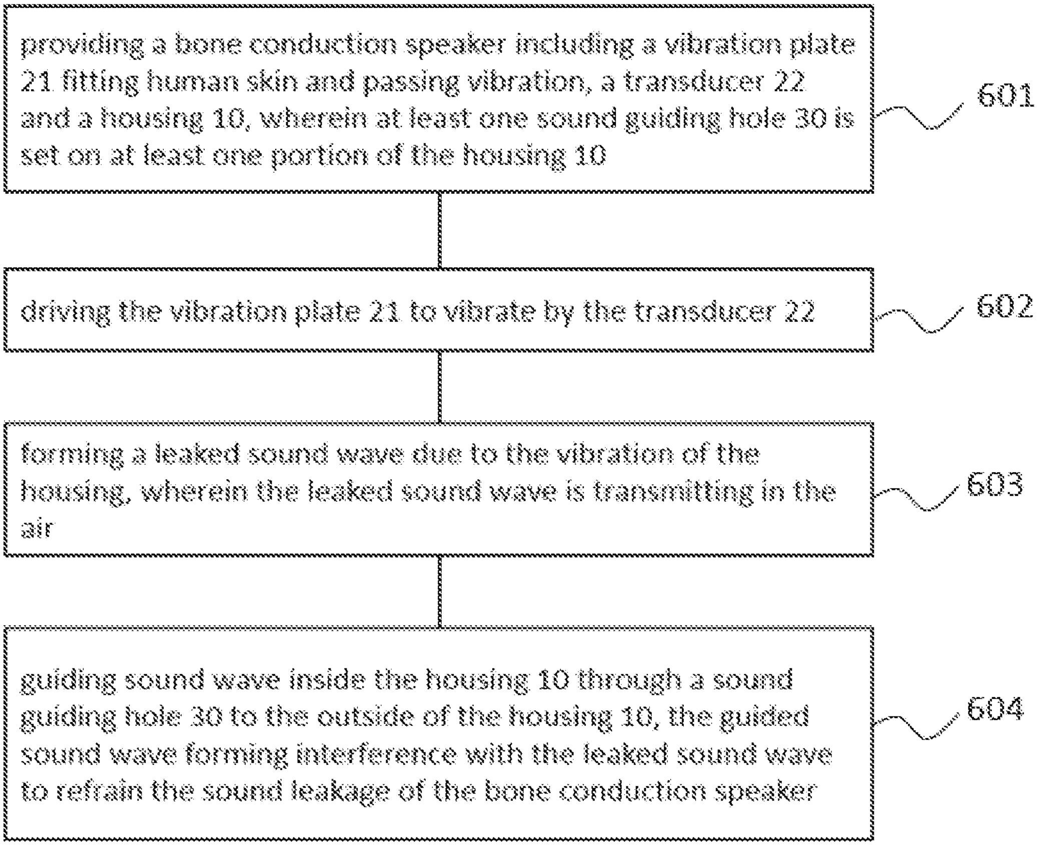
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a vibration board 21 touching human skin and passing vibrations, a transducer 22, and a housing 1000 is provided. At least one sound guiding hole 30 is arranged on the housing 1000. At 602, the vibration board 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 1000. The guided sound wave interferes with the leaked sound wave, reducing the sound leakage of the bone conduction speaker.

The sound guiding holes 30 are preferably set at different positions of the housing 1000.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
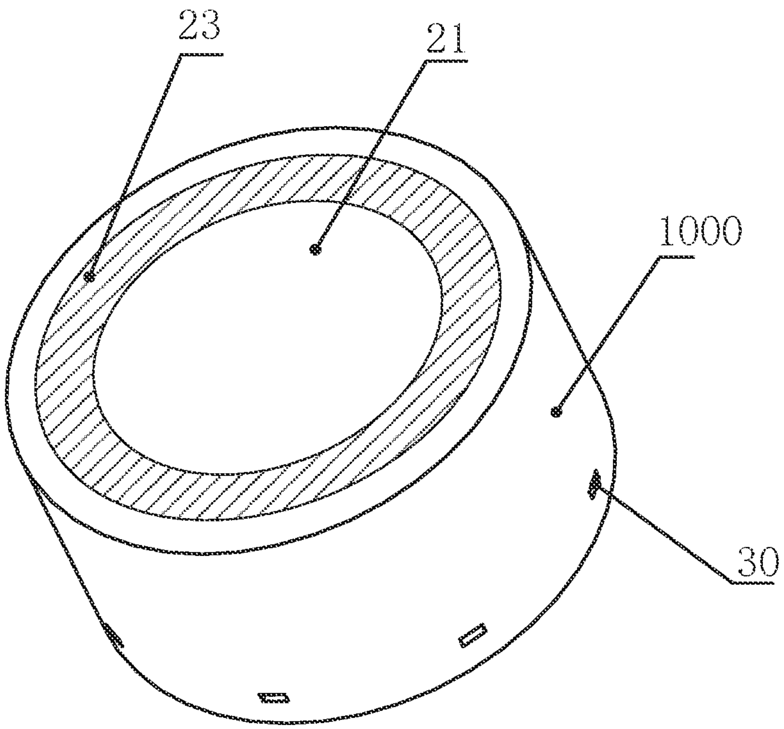
FIGS. 7A and 7B are schematic structures of an exemplary bone conduction speaker according to some embodiments of the present disclosure.
Figure 7B:
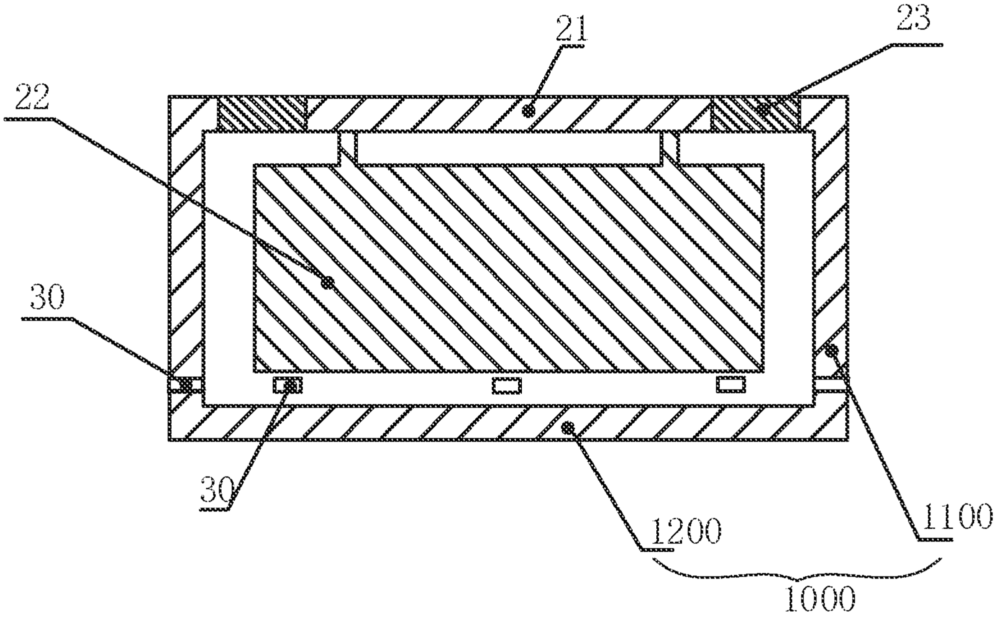

FIGS. 7A and 7B are schematic structures illustrating an exemplary bone conduction speaker according to some embodiments of the present disclosure. The bone conduction speaker may include an open housing 1000, a vibration board 21, and a transducer 22. The housing 1000 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 1000.

In the embodiment, the transducer 22 is preferably implemented based on the principle of electromagnetic transduction. The transducer may include components such as magnetizer, voice coil, and etc., and the components may located inside the housing and may generate synchronous vibrations with a same frequency.

Figure 7C:
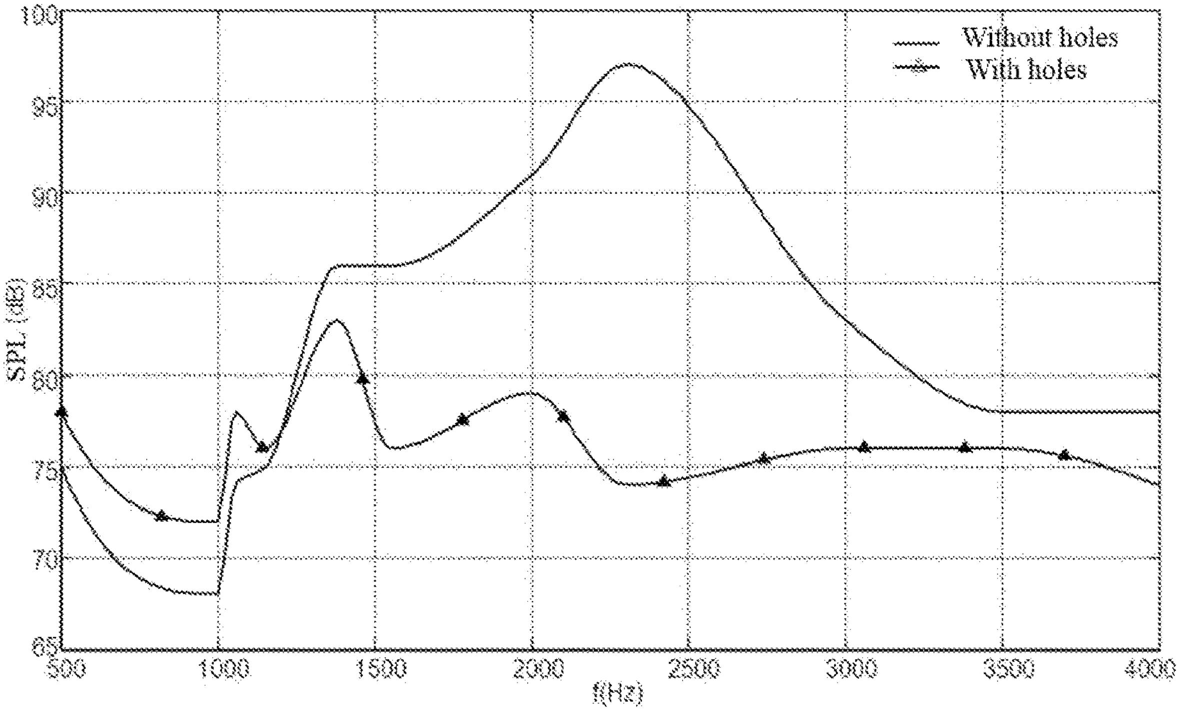
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz-4000 Hz, the sound leakage is reduced by more than 5 dB, and in the frequency range of 2250 Hz-2500 Hz, the sound leakage is reduced by more than 20 dB.

In some embodiments, the sound guiding hole(s) at the lower portion of the sidewall of the housing 1000 may also be approximately regarded as a point sound source. In some embodiments, the sound guiding hole(s) at the lower portion of the sidewall of the housing 1000 and the portion of the housing 1000 that generates the leaked sound wave may constitute two-point sound sources. The two-point sound sources may be formed such that the guided sound wave output from the sound guiding hole(s) at the lower portion of the sidewall of the housing 1000 may interfere with the leaked sound wave generated by the portion of the housing 1000. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 1000. For example, if the sound guiding hole(s) are set at the lower portion of the sidewall of the housing 1000 (as illustrated in FIG. 7A), the distance between the sound guiding hole(s) and the portion of the housing 1000 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
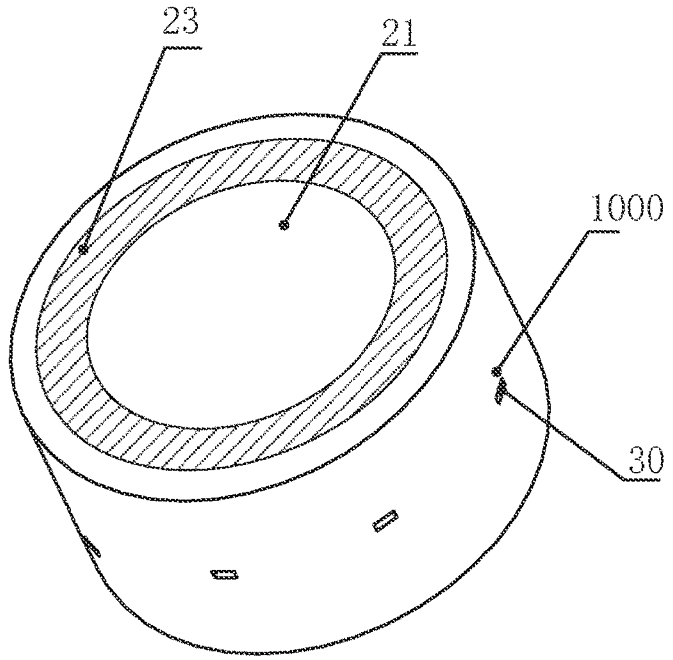
FIGS. 8A and 8B are schematic structure of an exemplary bone conduction speaker according to some embodiments of the present disclosure.
Figure 8B:
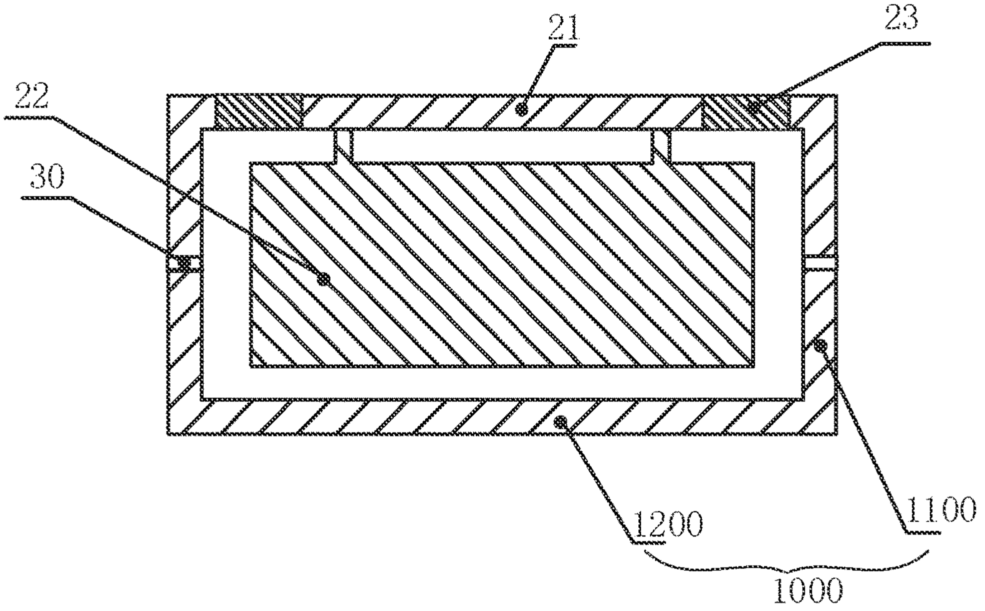

FIGS. 8A and 8B are schematic structures illustrating an exemplary bone conduction speaker according to some embodiments of the present disclosure. The bone conduction speaker may include an open housing 1000, a vibration board 21, and a transducer 22. The housing 1000 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 1000.

In the embodiment, the transducer 22 may be implemented preferably based on the principle of electromagnetic transduction. The transducer 22 may include components such as magnetizer, voice coil, etc., which may be placed inside the housing and may generate synchronous vibrations with the same frequency.

Figure 8C:
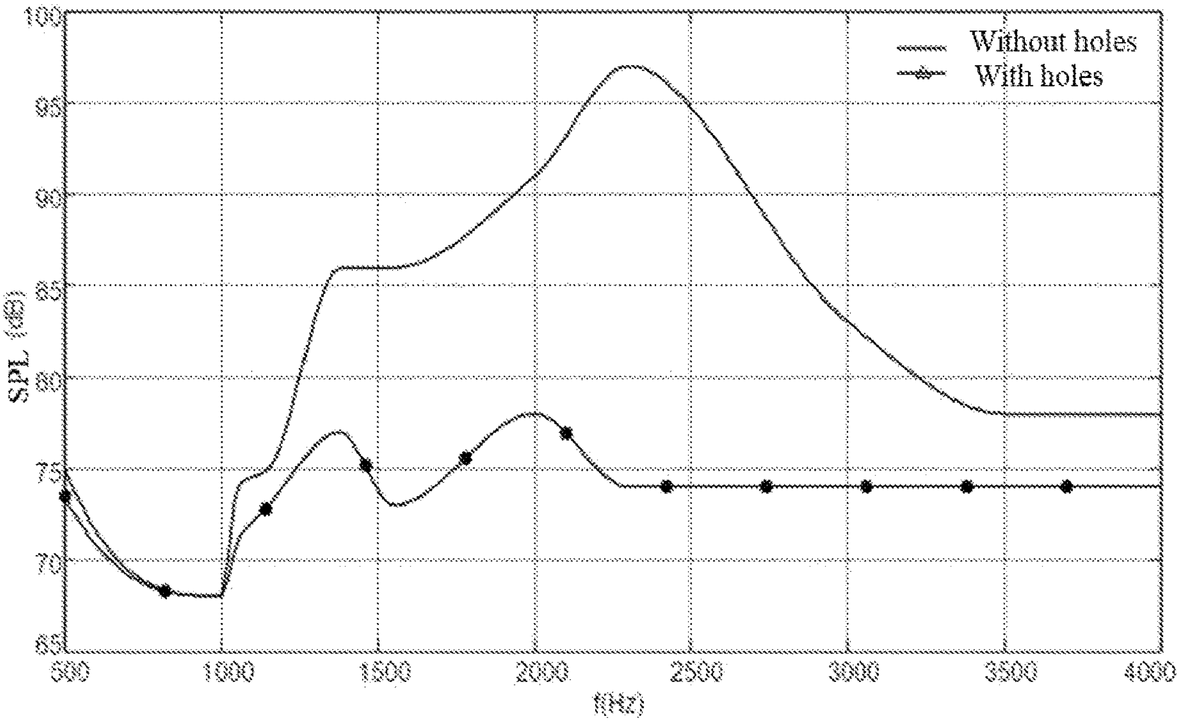
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz-4000 Hz, the effectiveness of reducing sound leakage is great. For example, in the frequency range of 1400 Hz-2900 Hz, the sound leakage is reduced by more than 10 dB; in the frequency range of 2200 Hz-2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
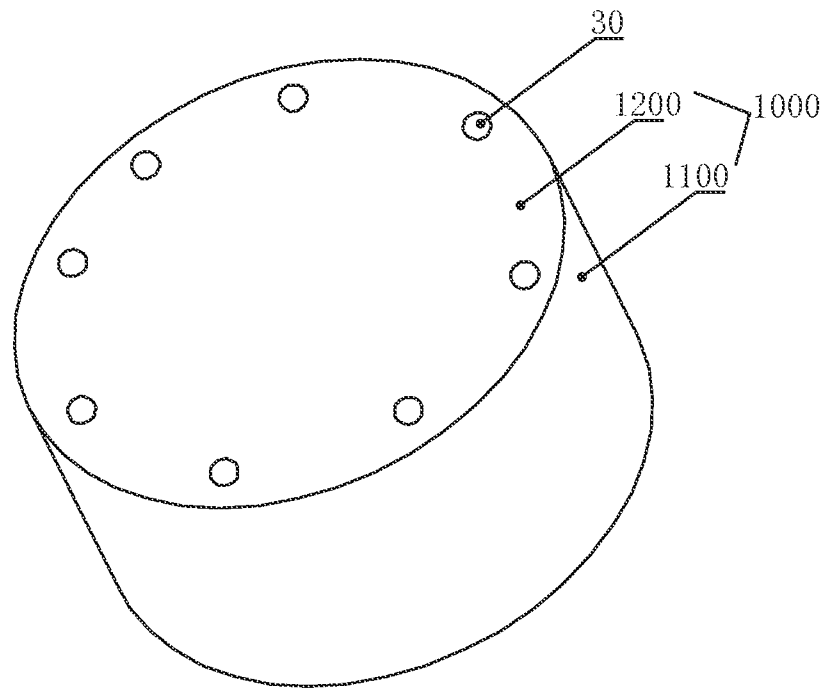
FIGS. 9A and 9B are schematic structures of an exemplary bone conduction speaker according to some embodiments of the present disclosure.
Figure 9B:
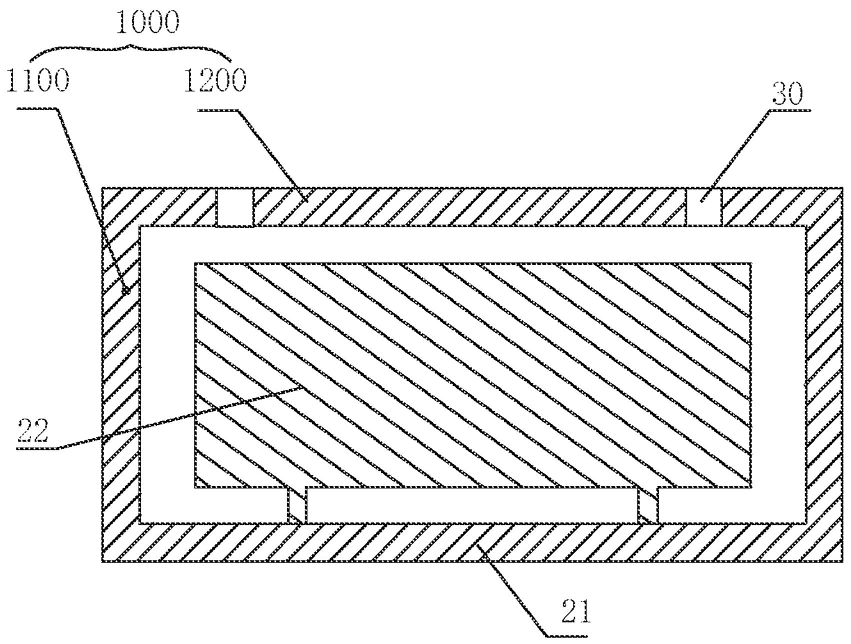

FIGS. 9A and 9B are schematic structures of an exemplary bone conduction speaker according to some embodiments of the present disclosure. The bone conduction speaker may include an open housing 1000, a vibration board 21 and a transducer 22. The housing 1000 is cylindrical, with a sidewall and a bottom. One or more perforative sound guiding holes 30 may be along the circumference of the bottom. In some embodiments, there may be 8 sound guiding holes arranged evenly of unevenly in one or more circles on the bottom of the housing 1000. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
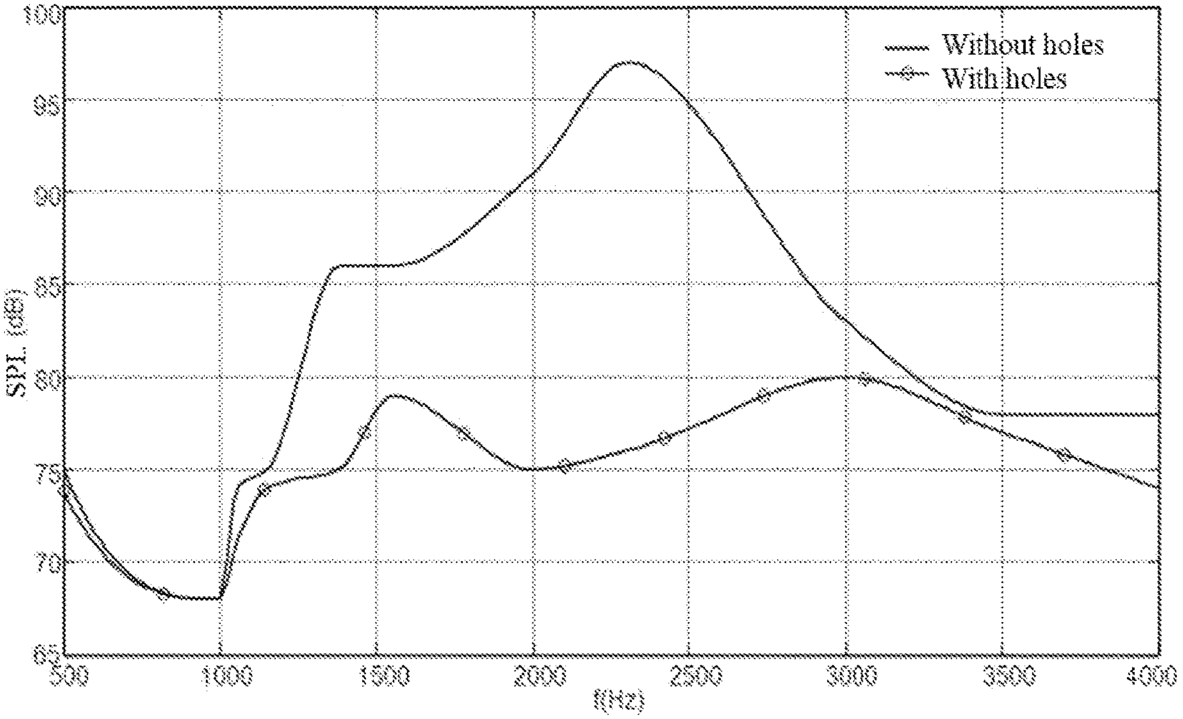
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz-3000 Hz, the effectiveness of reducing sound leakage is outstanding. For example, in the frequency range of 1700 Hz-2700 Hz, the sound leakage is reduced by more than 10 dB; in the frequency range of 2200 Hz-2400 Hz, the sound leakage is reduced by more than 20 dB.

Embodiment Six

Figure 10A:
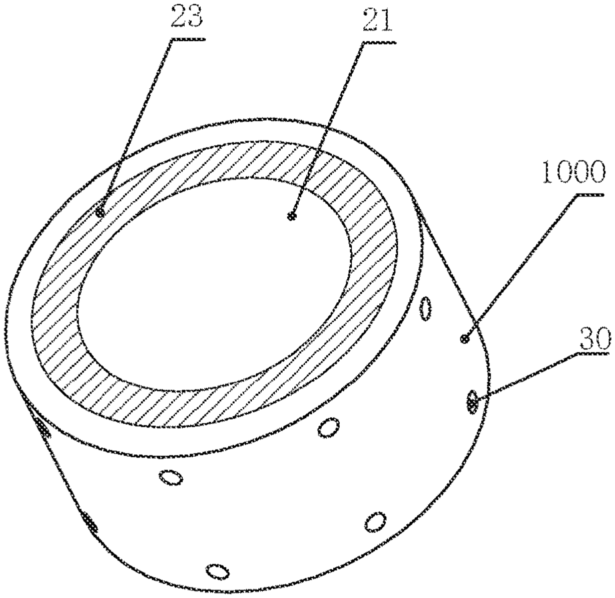
FIGS. 10A and 10B are schematic structures of an exemplary bone conduction speaker according to some embodiments of the present disclosure.
Figure 10B:
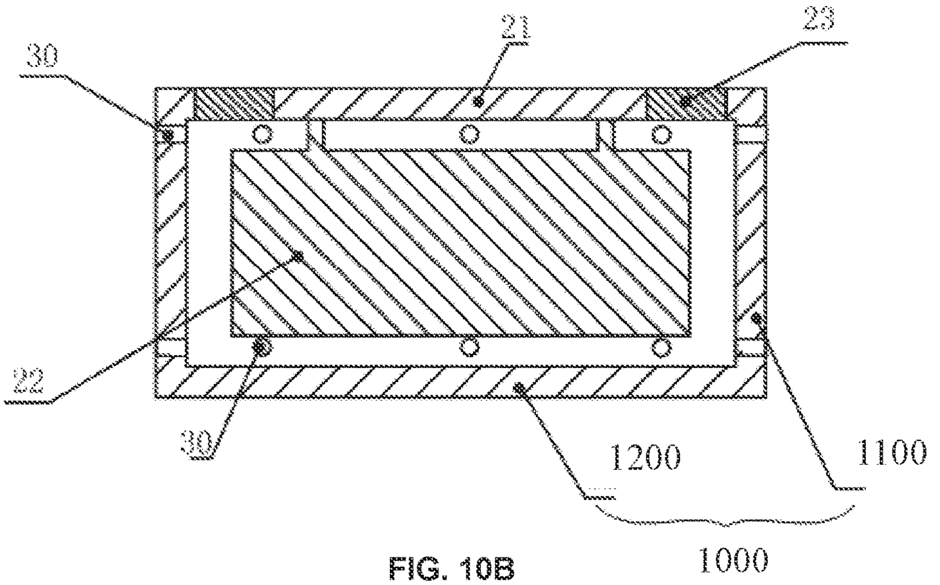

FIGS. 10A and 10B are schematic structures of an exemplary bone conduction speaker according to some embodiments of the present disclosure. The bone conduction speaker may include an open housing 1000, a vibration board 21 and a transducer 22. One or more perforative sound guiding holes 30 may be arranged on both upper and lower portions of the sidewall of the housing 1000. The sound guiding holes 30 may be arranged evenly or unevenly in one or more circles on the upper and lower portions of the sidewall of the housing 1000. In some embodiments, the quantity of sound guiding holes 30 in every circle may be 8, and the upper portion sound guiding holes and the lower portion sound guiding holes may be symmetrical about the central cross section of the housing 1000. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
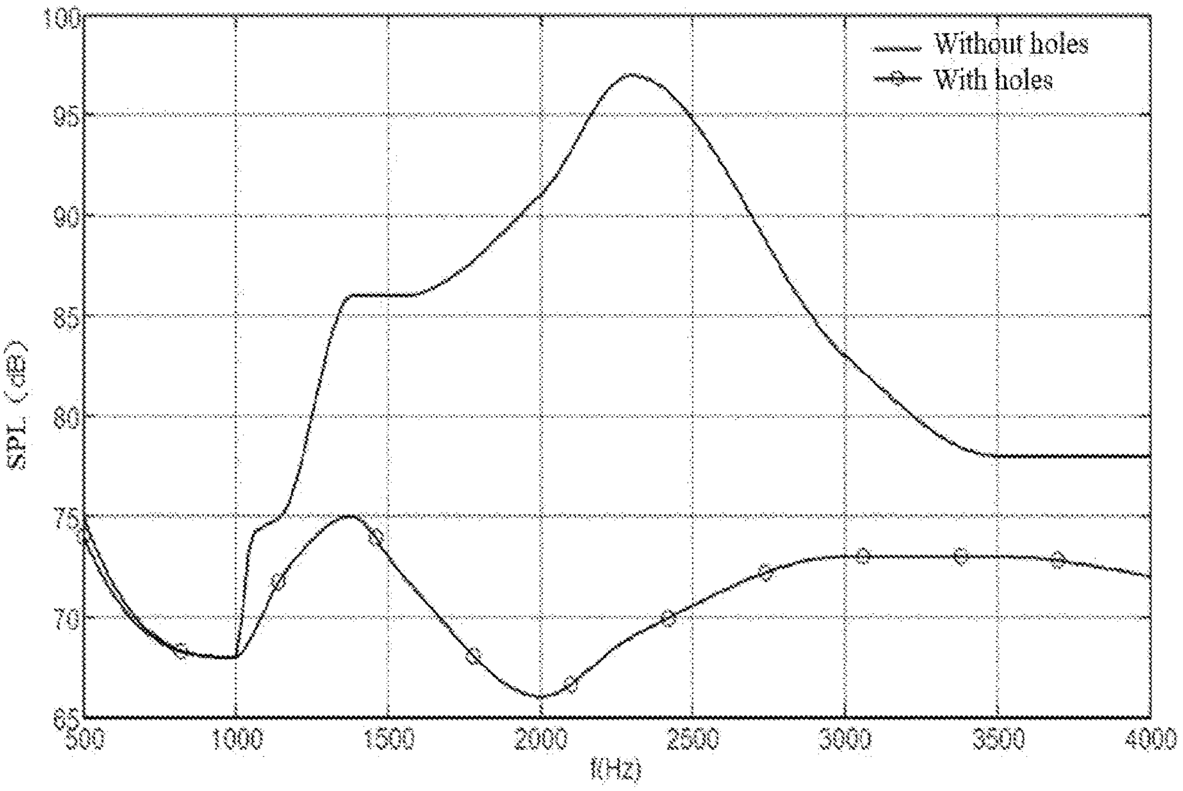
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz-4000 Hz, the effectiveness of reducing sound leakage is outstanding. For example, in the frequency range of 1600 Hz-2700 Hz, the sound leakage is reduced by more than 15 dB; in the frequency range of 2000 Hz-2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 1000 (also referred to as first hole(s)) may be approximately regarded as a point sound source. In some embodiments, the first hole(s) and the portion of the housing 1000 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 1000 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 1000 (also referred to as second hole(s)) may also be approximately regarded as another point sound source. Similarly, the second hole(s) and the portion of the housing 1000 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 1000 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
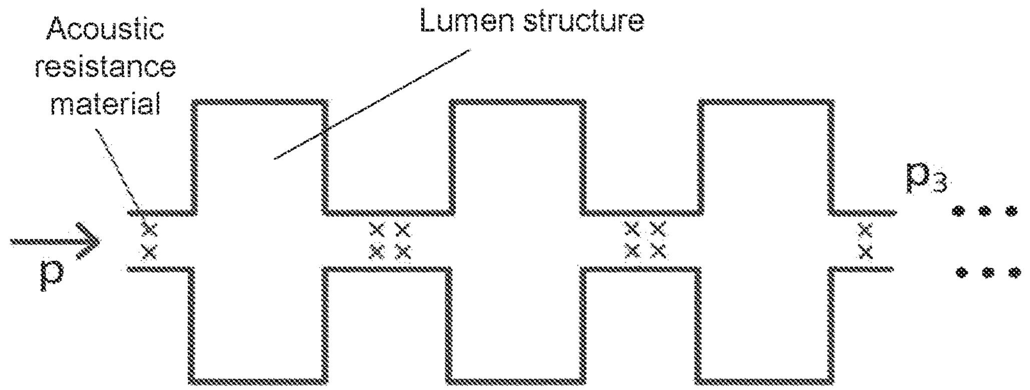
FIG. 10D is a schematic diagram illustrating an acoustic route according to some embodiments of the present disclosure.
Figure 10E:
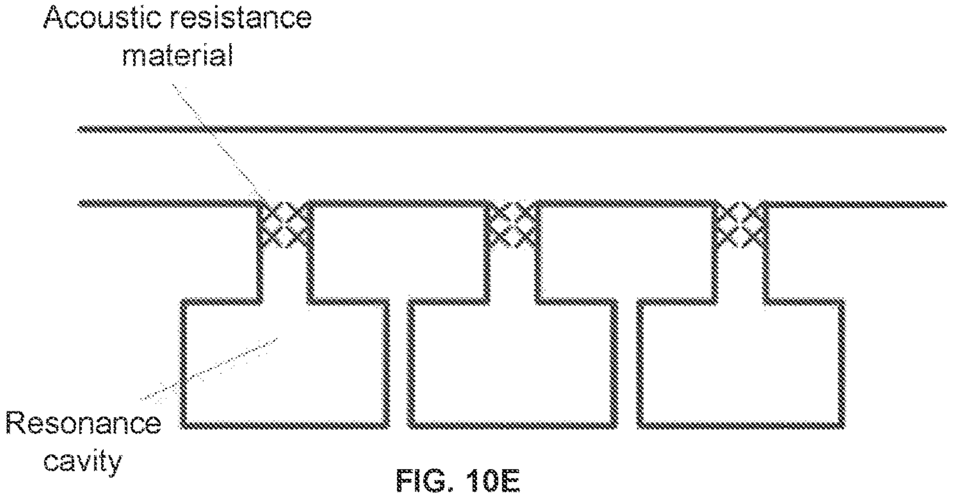
FIG. 10E is a schematic diagram illustrating another acoustic route according to some embodiments of the present disclosure.
Figure 10F:
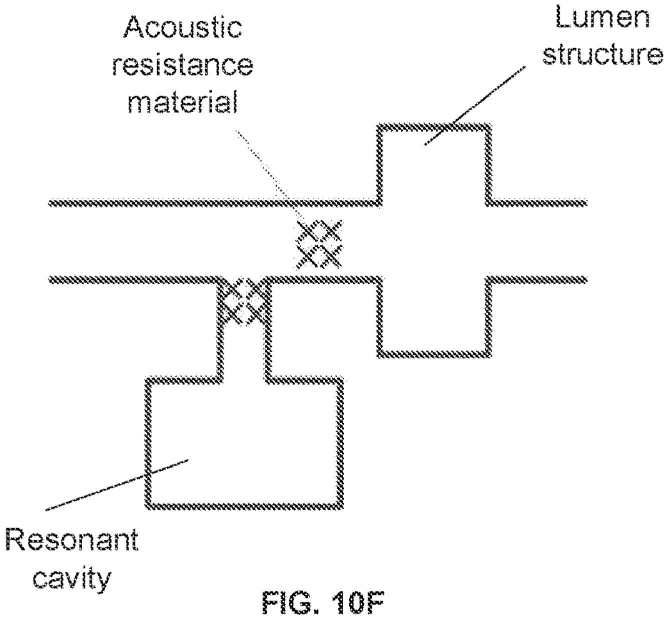
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5 MKS Rayleigh to 500 MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 1000. In some embodiments, the portion of the housing that generates the leaked sound wave may be the bottom of the housing 1000. The first hole(s) may have a larger distance to the portion of the housing 1000 than the second hole(s). In some embodiments, the frequency of the first guided sound wave output from the first hole(s) (e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 1000 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 1000 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 1000. For example, the leaked sound wave of the first frequency may be generated by the sidewall of the housing 1000, the leaked sound wave of the second frequency may be generated by the bottom of the housing 1000. As another example, the leaked sound wave of the first frequency may be generated by the bottom of the housing 1000, the leaked sound wave of the second frequency may be generated by the sidewall of the housing 1000. In some embodiments, the frequency of the leaked sound wave generated by the portion of the housing 1000 may relate to parameters including the mass, the damping, the stiffness, etc., of the different portion of the housing 1000, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 1000, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
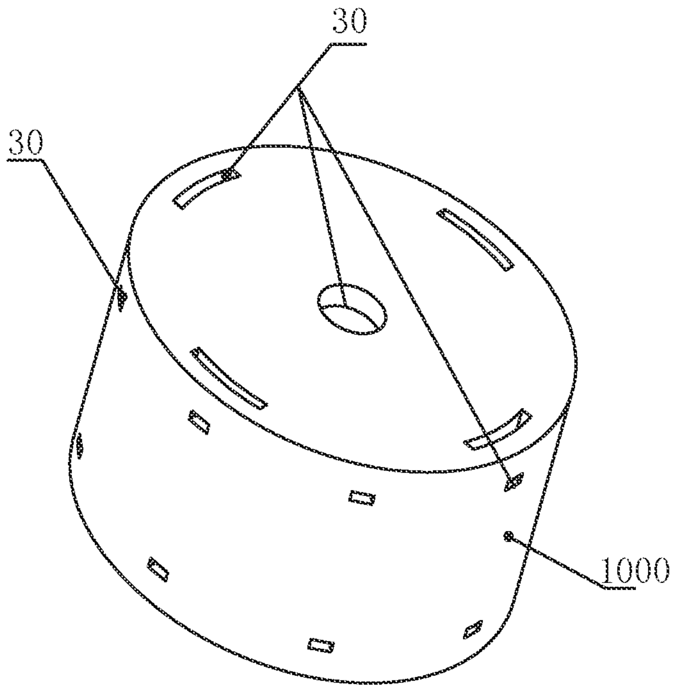
FIGS. 11A and 11B are schematic structures of an exemplary bone conduction speaker according to some embodiments of the present disclosure.
Figure 11B:
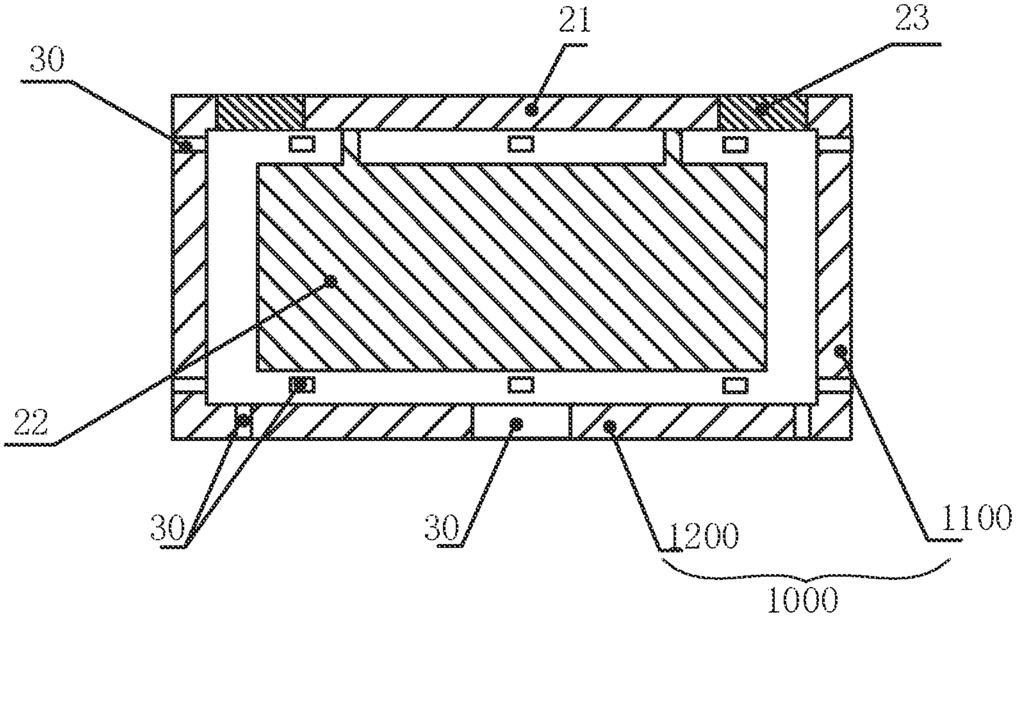

FIGS. 11A and 11B are schematic structures illustrating a bone conduction speaker according to some embodiments of the present disclosure. The bone conduction speaker may include an open housing 1000, a vibration board 21 and a transducer 22. One or more perforative sound guiding holes 30 may be set on upper and lower portions of the sidewall of the housing 1000 and on the bottom of the housing 1000. The sound guiding holes 30 on the sidewall are arranged evenly or unevenly in one or more circles on the upper and lower portions of the sidewall of the housing 1000. In some embodiments, the quantity of sound guiding holes 30 in every circle may be 8, and the upper portion sound guiding holes and the lower portion sound guiding holes may be symmetrical about the central cross section of the housing 1000. In some embodiments, the shape of the sound guiding hole 30 may be rectangular. There may be four sound guiding holds 30 on the bottom of the housing 1000. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
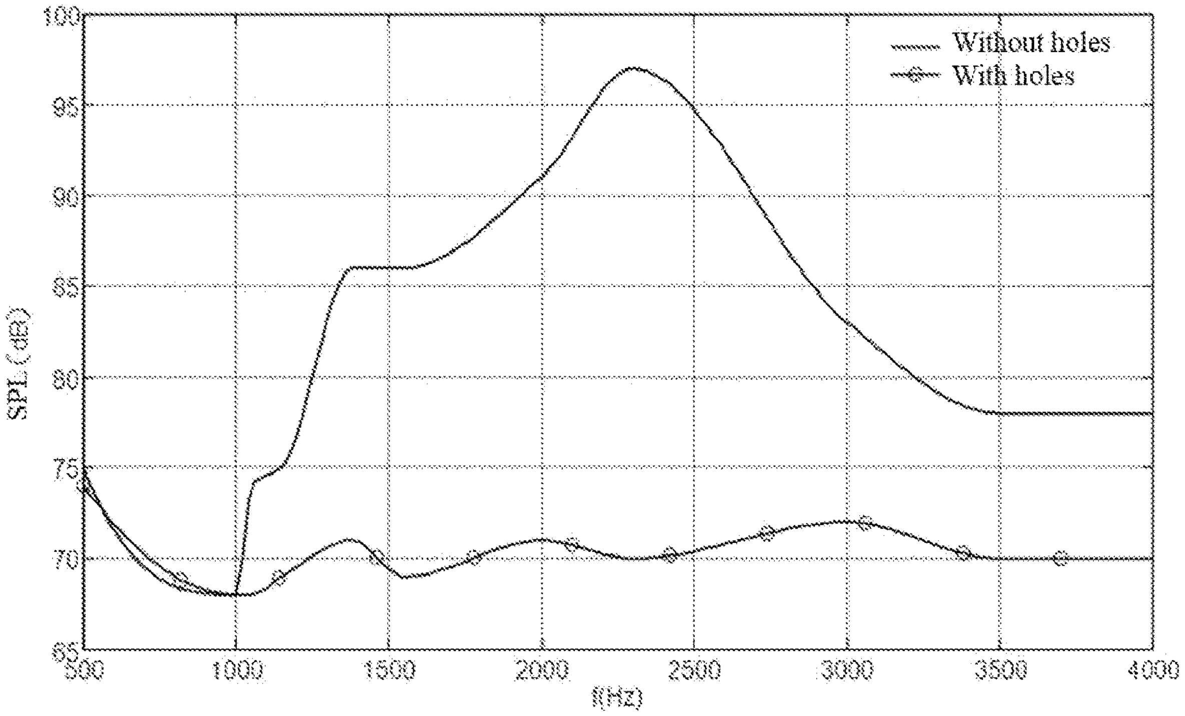
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz-4000 Hz, the effectiveness of reducing sound leakage is outstanding. For example, in the frequency range of 1300 Hz-3000 Hz, the sound leakage is reduced by more than 10 dB; in the frequency range of 2000 Hz-2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz-1700 Hz and 2500 Hz-4000 Hz, this scheme has a better effect of reduced sound leakage than embodiment six.

Embodiment Eight

Figure 12A:
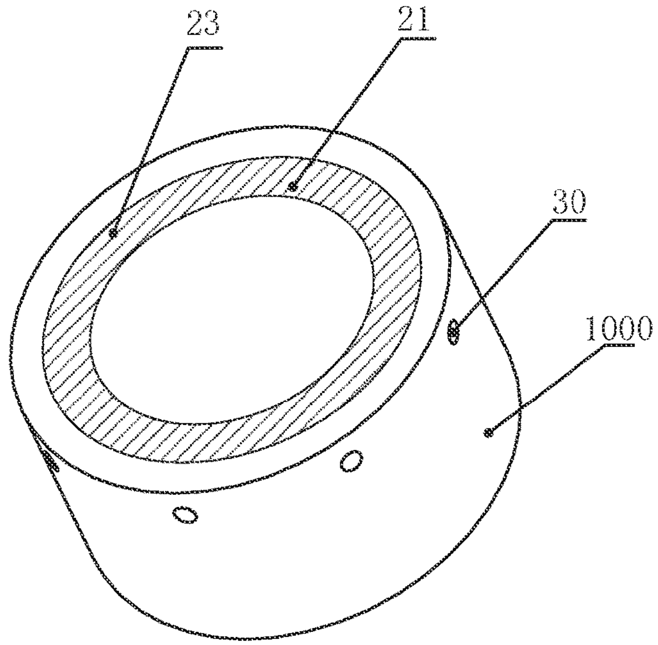
FIGS. 12A and 12B are schematic structures of an exemplary bone conduction speaker according to some embodiments of the present disclosure.
Figure 12B:
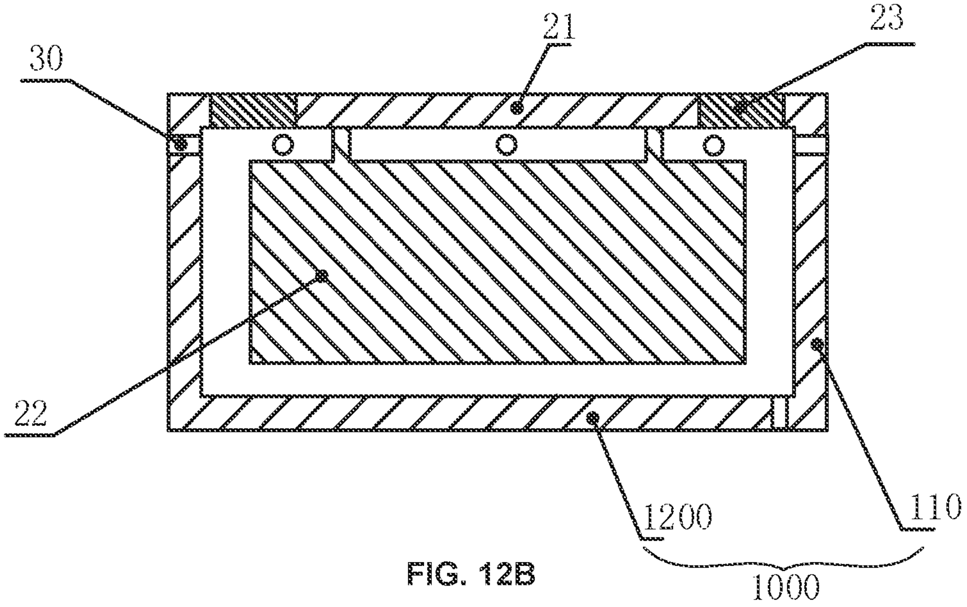

FIGS. 12A and 12B are schematic structures illustrating a bone conduction speaker according to some embodiments of the present disclosure. The bone conduction speaker may include an open housing 1000, a vibration board 21 and a transducer 22. A perforative sound guiding hole 30 may be set on the upper portion of the sidewall of the housing 1000. One or more sound guiding holes may be arranged evenly or unevenly in one or more circles on the upper portion of the sidewall of the housing 1000. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
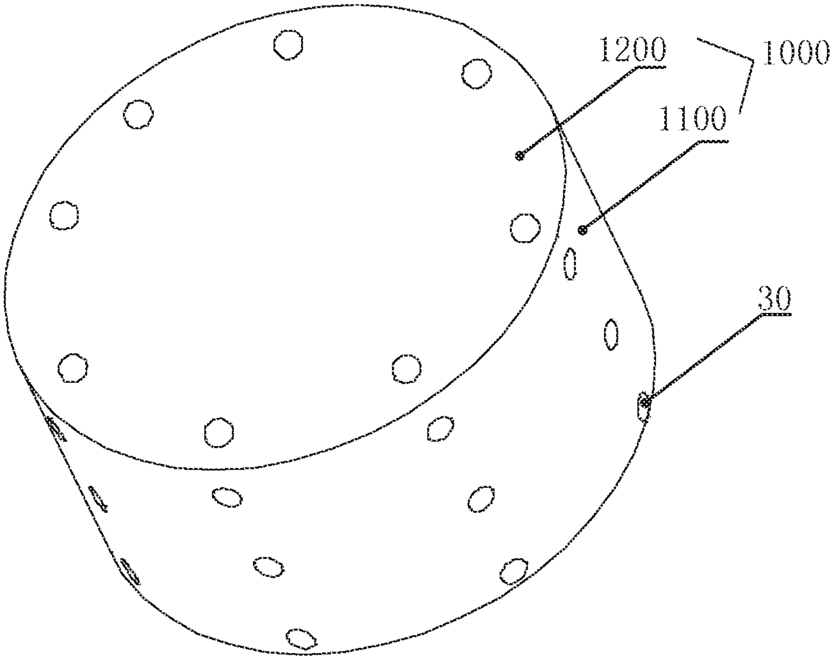
FIGS. 13A and 13B are schematic structures of an exemplary bone conduction speaker according to some embodiments of the present disclosure.
Figure 13B:
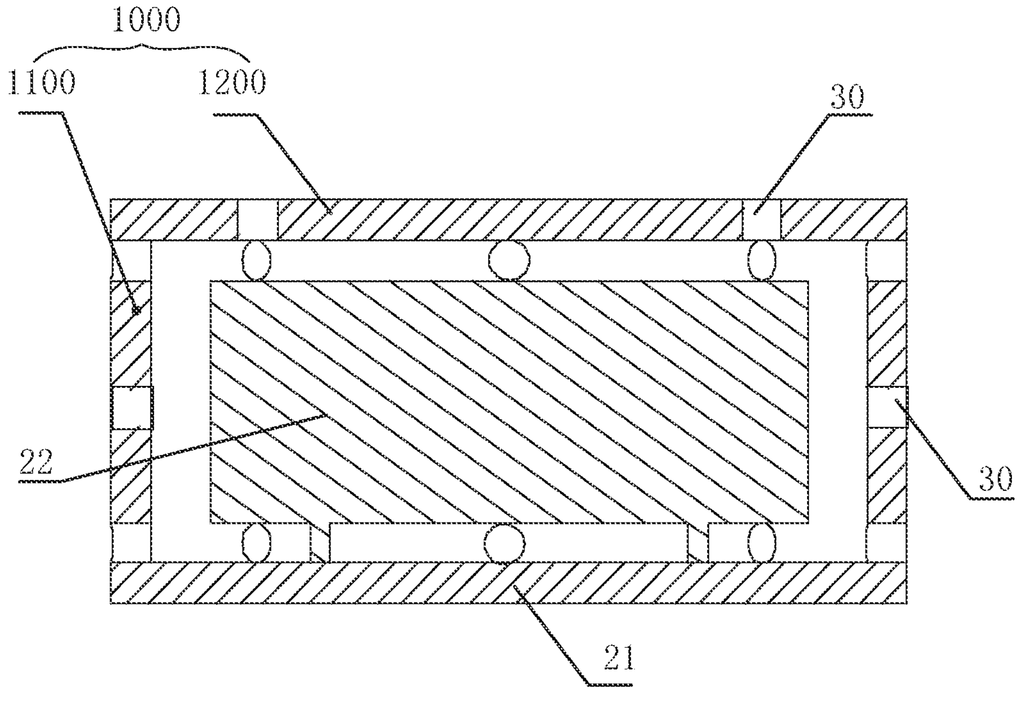

FIGS. 13A and 13B are schematic structures illustrating a bone conduction speaker according to some embodiments of the present disclosure. The bone conduction speaker may include an open housing 1000, a vibration board 21 and a transducer 22.

The difference between this embodiment and the above-described embodiment three is that to reduce sound leakage to greater extent, the sound guiding holes 30 may be arranged on the upper, central and lower portions of the sidewall 1100. The sound guiding holes 30 are arranged evenly or unevenly in one or more circles. Different circles are formed by the sound guiding holes 30, one of which is set along the circumference of the bottom 1200 of the housing 1000. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

Figure 14:
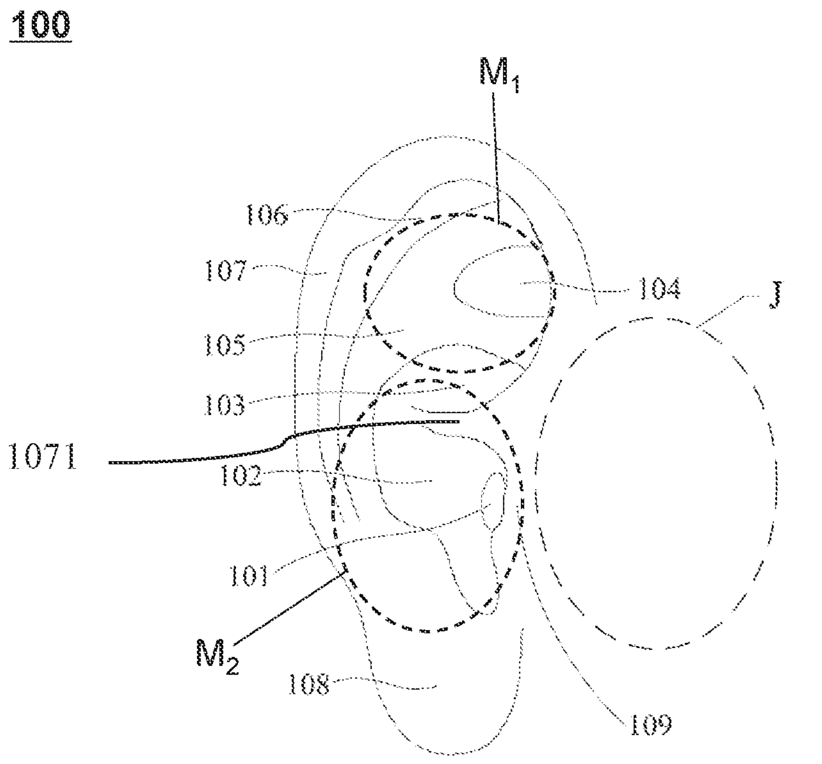
FIG. 14 is a schematic diagram illustrating an exemplary ear according to some embodiments of the present disclosure.

FIG. 14 is a schematic diagram illustrating an exemplary ear according to some embodiments of the present disclosure. Referring to FIG. 14, the ear 100 (which may also be referred to as an auricle) may include an external ear canal 101, a concha cavity 102, a concha boat 103, a triangular fossa 104, an antihelix 105, a scapha 106, a helix 107, an earlobe 108, a tragus 109, and a helix foot 1071. In some embodiments, one or more parts of the ear 100 may be used to support an acoustic device (e.g., an acoustic output device such as an earphone, a speaker, etc.) to achieve stable wearing of the acoustic device. In some embodiments, parts of the ear 100 such as the external ear canal 101, the concha cavity 102, the concha boat 103, the triangular fossa 104, etc., have a certain depth and volume in the three-dimensional space, which may be used to achieve the wearing requirements of the acoustic device. For example, the acoustic device (e.g., an in-ear earphone) may be worn in the external ear canal 101. In some embodiments, the wearing of the acoustic device may be achieved with the aid of other parts of the ear 100 other than the external ear canal 101. For example, the wearing of the acoustic device may be achieved with the aid of the concha boat 103, the triangular fossa 104, the antihelix 105, the scapha 106, the helix 107, or a combination thereof. In some embodiments, the earlobe 108 and other parts of the user's ear may also be used to improve the comfort and reliability of the acoustic device in wearing. By utilizing parts of the ear 100 other than the external ear canal 101 for the wearing of the acoustic device and the transmission of sound, the external ear canal 101 of the user may be "liberated." When the user wears the acoustic device, the acoustic device does not block the external ear canal 101 (or the ear canal or ear canal opening) of the user, and the user may receive both sounds from the acoustic device and sound from the environment (e.g., horn sounds, car bells, surrounding voices, traffic commands, etc.), thereby reducing the probability of traffic accidents. In the present disclosure, an acoustic device that, when worn by the user, does not block the external ear canal 101 (or the ear canal or ear canal opening) of the user may be referred to as an earphone. In some embodiments, the acoustic device may be designed to adapt to the ear 100 according to the configuration of the ear 100 to enable a sound production component of the acoustic device to be worn at various positions of the ear. For example, when the acoustic device is an earphone, the earphone may include a suspension structure (e.g., an ear hook) and a sound production component. The sound production component is physically connected to the suspension structure, which may be adapted to the shape of the ear to place the whole or part of the structure of the sound production component at a front side of the tragus 109 (e.g., the region J enclosed by the dotted line in FIG. 14). As another example, the whole or part of the structure of the sound production component may be in contact with an upper portion of the external ear canal 101 (e.g., where one or more parts such as the concha boat 103, the triangular fossa 104, the antihelix 105, the scapha 106, the helix 107, the helix foot 1071, etc., are located) while the user is wearing the earphone. As another example, when the user wears the earphone, the whole or part of the structure of the sound production component may be located within a cavity formed by one or more parts of the ear 100 (e.g., the concha cavity 102, the concha boat 103, the triangular fossa 104, etc.) (e.g., the region M1 enclosed by the dotted line in FIG. 14 containing at least the concha boat 103, the triangular fossa 104 and the region M2 containing at least the concha cavity 102).

Different users may have individual differences, resulting in different shapes, dimensions, etc., of ears. For ease of description and understanding, if not otherwise specified, the present disclosure primarily uses a "standard" shape and dimension ear model as a reference and further describes the wearing manners of the acoustic device in different embodiments on the ear model. For example, a simulator (e.g., GRAS 45BC KEMAR) containing a head and (left and right) ears produced based on standards of ANSI: 53.36, 53.25 and IEC: 60318-7, may be used as a reference for wearing the acoustic device to present a scenario in which most users wear the acoustic device normally. Merely by way of example, the reference ear may have the following relevant features: a projection of an auricle on a sagittal plane in a vertical axis direction may be in a range of 49.5 mm-74.3 mm, and a projection of the auricle on the sagittal plane in a sagittal axis direction may be in a range of 36.6 mm-55 mm. Thus, in the present disclosure, the descriptions such as "worn by the user," "in the wearing state," and "in the wearing state" may refer to the acoustic device described in the present disclosure being worn on the ear of the aforementioned simulator. Of course, considering the individual differences of different users, structures, shapes, dimensions, thicknesses, etc., of one or more parts of the ear 100 may be somewhat different. In order to meet the needs of different users, the acoustic device may be designed differently, and these differential designs may be manifested as feature parameters of one or more parts of the acoustic device (e.g., a sound production component, an ear hook, etc., in the following descriptions) may have different ranges of values, thus adapting to different ears.

It should be noted that in the fields of medicine, anatomy, or the like, three basic sections including a sagittal plane, a coronal plane, and a horizontal plane of the human body may be defined, respectively, and three basic axes including a sagittal axis, a coronal axis, and a vertical axis may also be defined. As used herein, the sagittal plane may refer to a section perpendicular to the ground along a front and rear direction of the body, which divides the human body into left and right parts. The coronal plane may refer to a section perpendicular to the ground along a left and right direction of the body, which divides the human body into front and rear parts. The horizontal plane may refer to a section parallel to the ground along an up-and-down direction of the body, which divides the human body into upper and lower parts. Correspondingly, the sagittal axis may refer to an axis along the front-and-rear direction of the body and perpendicular to the coronal plane. The coronal axis may refer to an axis along the left-and-right direction of the body and perpendicular to the sagittal plane. The vertical axis may refer to an axis along the up-and-down direction of the body and perpendicular to the horizontal plane. Further, the "front side of the ear" as described in the present disclosure is a concept relative to the "rear side of the ear," where the former refers to a side of the ear away from the head and the latter refers to a side of the ear facing the head. In this case, observing the ear of the above simulator in a direction along the coronal axis of the human body, a schematic diagram illustrating the front side of the ear as shown in FIG. 14 is obtained.

Figure 15:
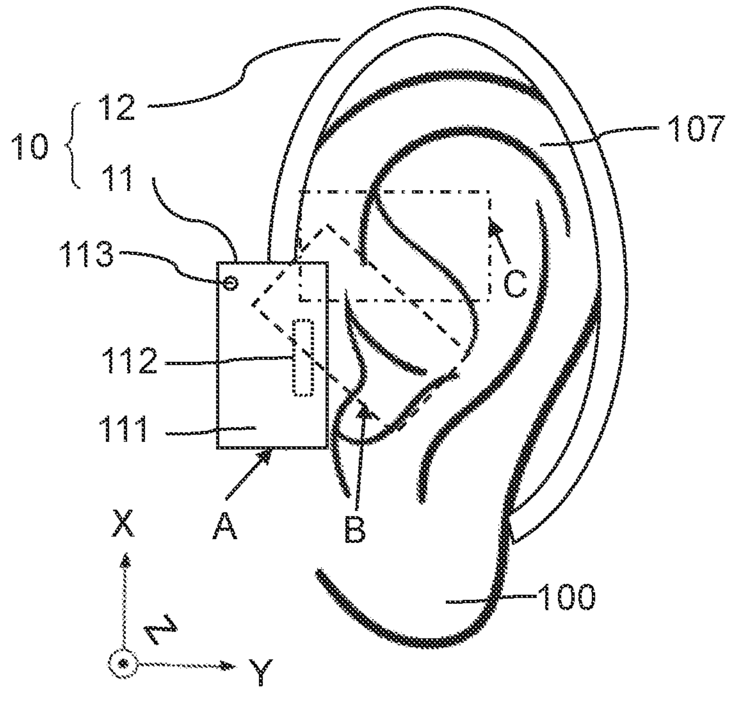
FIG. 15 is a structural diagram illustrating an exemplary earphone according to some embodiments of the present disclosure.

FIG. 15 is a structural diagram illustrating an exemplary earphone according to some embodiments of the present disclosure.

In some embodiments, the earphone 10 may include, but is not limited to, an air conduction earphone, a bone air conduction earphone, etc. In some embodiments, the open earphone 10 may be combined with products such as glasses, a headset, a head-mounted display device, an AR/VR headset, etc. In some embodiments, the speaker of the present disclosure may be implemented as the earphone 10 or a portion (e.g., the sound production component 11) thereof. The "speaker" and the "earphone" (or the "sound production component") can be used interchangeably.

As shown in FIG. 15, the earphone 10 may include a sound production component 11 and an ear hook 12.

The sound production component 11 may be worn on the user's body, and the sound production component 11 may generate sound which is input into the ear canal of the user. In some embodiments, the sound production component 11 may include a transducer (e.g., a transducer 116 shown in FIG. 31, the transducer 20, the transducer 22, etc.) and a housing 111 configured to accommodate the transducer. The housing 111 may be connected to the ear hook 12. The transducer is used to convert an excitation signal (e.g., an electrical signal) into a corresponding mechanical vibration to produce sound. In some embodiments, a sound outlet 112 is provided on a side of the housing toward the ear, and the sound outlet 112 is used to transmit the sound generated by the transducer out of the housing 111 and into the ear canal so that the user can hear the sound. In some embodiments, the transducer (e.g., a diaphragm) may divide the housing 111 to form a front cavity (e.g., a front cavity 114 shown in FIG. 31) and a rear cavity of the earphone, and the sound outlet 112 may communicate with the front cavity and transmit the sound generated by the front cavity out of the housing 111 and into the ear canal. In some embodiments, a portion of the sound exported through the sound outlet 112 may be transmitted to the ear canal thereby allowing the user to hear the sound, and another portion thereof may be transmitted with the sound reflected by the ear canal through a gap between the sound production component 11 and the ear (e.g., a portion of the concha cavity not covered by the sound production component 11) to the outside of the earphone 10 and the ear, thereby creating a first leakage sound in the far-field. At the same time, one or more pressure relief holes 113 are generally provided on other sides of the housing 111 (e.g., a side away from or back from the user's ear canal). The pressure relief hole(s) 113 is further away from the ear canal than the sound outlet 112, and the sound transmitted by the pressure relief hole 113 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other so that the aforementioned first leakage sound and the aforementioned second leakage sound can cancel each other out in the far-field, which is conducive to reducing the leakage of the earphone 10 in the far-field. In some embodiments, at least two pressure relief holes 113 may be provided on the side surfaces of the housing 111 except for the side surface of the housing 111 toward the auricle. By setting at least two pressure relief holes 113, not only can the sound generated by the rear cavity be exported to the housing 111, but also a high-pressure region of the sound field in the rear cavity can be destroyed, so as to make a wavelength of a standing wave in the rear cavity shorter, and thus making a resonance frequency of the sound exported from the pressure relief hole(s) 113 to the outside of the housing 111 as high as possible, such as greater than 4 kHz. At this time, the sound exported by the sound outlet 112 and the sound exported by the pressure relief hole(s) 113 can maintain good consistency in a wider frequency range, and thus an effect of interference cancellation of the two in the far field is a better, thereby obtaining a better sound leakage reduction effect. For the sake of description, some embodiments of the present disclosure are illustrated exemplarily with one pressure relief hole provided on the sound production component 11. In short, when the user wears the earphone 10, he/she mainly hears the sound transmitted to the ear canal via the sound outlet 112, and the pressure relief hole(s) 113 is provided mainly to balance the pressure in the rear cavity, so that the vibration can be fully achieved at low frequency and large amplitude, which makes the sound have sound quality such as bass dive and treble penetration as much as possible, and reduces the leakage of sound into the environment through the sound outlet 112. In some embodiments, the sound outlet 112 and the pressure relief hole(s) 113 may also be referred to as sound guiding holes (e.g., the sound guiding holes 30 on the housing 10 of the speaker). For more information about the sound production component 11, please refer to other places of the present disclosure, such as FIG. 20, FIG. 27, FIG. 31, etc., and their descriptions.

One end of the ear hook 12 may be connected to the sound production component 11 and the other end of the ear hook 12 extends along a junction between the user's ear and head. In some embodiments, the ear hook 12 may be an arc-shaped structure that is adapted to the user's auricle, so that the ear hook 12 can be hung on the user's auricle. For example, the ear hook 12 may have an arc-shaped structure adapted to the junction of the user's head and ear, so that the ear hook 12 can be hung between the user's ear and head. In some embodiments, the ear hook 12 may also be a clamping structure adapted to the user's auricle, so that the ear hook 12 can be clamped at the user's auricle. Exemplarily, the ear hook 12 may include a hook portion (e.g., the first portion 121 shown in FIG. 20) and a connection portion (e.g., the second portion 122 shown in FIG. 20) that are connected in sequence. The connection portion connects the hook portion to the sound production component 11 so that the earphone 10 is curved in the three-dimensional space when it is in a non-wearing state (i.e., in a natural state). In other words, in the three-dimensional space, the hook portion, the connection portion, and the sound production component 11 are not co-planar. In such cases, when the earphone 10 is in the wearing state, the hook portion may be primarily for hanging between a rear side of the user's ear and the head, and the sound production component 11 may be primarily for contacting a front side of the user's ear, thereby allowing the sound production component 11 and the hook portion to cooperate to clamp the ear. Exemplarily, the connection portion may extend from the head toward an outside of the head and cooperate with the hook portion to provide a compression force on the front side of the ear for the sound production component 11. The sound production component 11 may specifically be pressed against an area where a part such as the concha cavity 102, the concha boat 103, the triangular fossa 104, the antihelix 105, etc., is located under the compression force so that the outer ear canal 101 of the ear is not obscured when the earphone 10 is in the wearing state.

In some embodiments, in order to improve the stability of the earphone 10 in the wearing state, the earphone 10 may be provided in any one of the following ways or a combination thereof. First, at least a portion of the ear hook 12 is provided as a mimic structure that fits against at least one of the rear side of the ear 100 and the head to increase a contact area of the ear hook 12 with the ear 100 and/or the head, thereby increasing the resistance of the earphone 10 to fall off from the ear 100. Second, at least a portion of the ear hook 12 is provided with an elastic structure so that it has a certain degree of deformation in the wearing state to increase a positive pressure of the ear hook 12 on the ear and/or the head, thereby increasing the resistance of the earphone 10 to fall off from the ear. Third, the ear hook 12 is at least partially set to lean against the head in the wearing state, so that it forms a reaction force to press the ear to enable the sound production component 11 to be pressed on the front side of the ear, thereby increasing the resistance of the earphone 10 to fall off from the ear. Fourth, the sound production component 11 and the ear hook 12 are set to clamp a region where the helix is located, a region where the concha cavity is located, etc., from the front and rear sides of the ear in the wearing state, so as to increase the resistance of the earphone 10 to fall off from the ear. Fifth, the sound production component 11 or an auxiliary structure connected thereto is set to extend at least partially into cavities such as the concha cavity, the concha boat, the triangular fossa, and the scapha, so as to increase the resistance of the earphone 10 to falling off from the ear.

In some embodiments, the ear hook 12 may include, but is not limited to, an ear hook, an elastic band, etc., allowing the earphone 10 to be better fixed to the user and prevent the user from dropping it during use. In some embodiments, the earphone 10 may not include the ear hook 12, and the sound production component 11 may be placed in the vicinity of the user's ear 100 using a hanging or clamping manner.

In some embodiments, the sound production component 11 may be, for example, circular, elliptical, runway-shaped, polygonal, U-shaped, V-shaped, semi-circular, or other regular or irregular shapes so that the sound production component 11 may be hung directly at the user's ear 100. In some embodiments, the sound production component 11 may have a long-axis direction X and a short-axis direction Y that are perpendicular to the thickness direction Z and orthogonal to each other. The long-axis direction X may be defined as a direction having the largest extension dimension in a shape of a two-dimensional projection plane (e.g., a projection of the sound production component 11 in a plane on which its outer side surface is located, or a projection on a sagittal plane) of the sound production component 11. For example, when the projection shape is rectangular or approximately rectangular, the long-axis direction is a length direction of the rectangle or approximately rectangle. The short-axis direction Y may be defined as a direction perpendicular to the long-axis direction X in the shape of the projection of the sound production component 11 on the sagittal plane. For example, when the projection shape is rectangular or approximately rectangular, the short-axis direction is a width direction of the rectangle or approximately rectangle. The thickness direction Z may be defined as a direction perpendicular to the two-dimensional projection plane, for example, in the same direction as a coronal axis, both pointing to the left-and-right side of the body.

In some embodiments, when the user wears the earphone 10, the sound production component 11 may be placed at a position near but not blocking the external ear canal 101 of the user. In some embodiments, the projection of the earphone 10 on the sagittal plane may not cover the user's ear canal while in the wearing state. For example, the projection of the sound production component 11 on the sagittal plane may fall on the left and right sides of the head and be located at the front side of the helix foot in the sagittal axis of the body (e.g., at the position shown in dashed box A in FIG. 15). In this case, the sound production component 11 is located at the front side of the helix foot of the user, the long-axis of the sound production component 11 may be in a vertical or approximately vertical position, the projection of the short-axis direction Y on the sagittal plane is in the same direction as the sagittal axis, the projection of the long-axis direction X on the sagittal plane is in the same direction as a vertical axis, and the thickness direction Z is perpendicular to the sagittal plane. As another example, the projection of the sound production component 11 on the sagittal plane may fall on the antihelix 105 (e.g., at the position shown in the dashed box C in FIG. 15). In this case, the sound production component 11 is at least partially located at the antihelix 105, the long-axis of the sound production component 11 is horizontal or approximately horizontal, the projection of the long-axis direction X of the sound production component 11 on the sagittal plane is in the same direction as the sagittal axis, the projection of the short-axis direction Y on the sagittal plane is in the same direction as the vertical axis and the thickness direction Z is perpendicular to the sagittal plane. In this way, it is possible to avoid the sound production component 11 from blocking the ear canal, thereby freeing the user's ears. It is also possible to increase the contact area between the sound production component 11 and the ear 100, thus improving the wearing comfort of the earphone 10.

In some embodiments, in the wearing state, the projection of the earphone 10 on the sagittal plane may also cover or at least partially cover the user's ear canal, for example, the projection of the sound production component 11 on the sagittal plane may fall within the concha cavity 102 (e.g., at the position shown in the dashed box B in FIG. 15) and be in contact with the helix foot 1071 and/or the helix 107. At this point, the sound production component 11 is at least partially located in the concha cavity 102; the sound production component 11 is in an inclined state; the projection of the short-axis direction Y of the sound production component 11 on the sagittal plane may have an angle with the direction of the sagittal axis, i.e., the short-axis direction Y is also set at a corresponding inclination; the projection of the long-axis direction X on the sagittal plane may have an angle with the direction of the sagittal axis, i.e., the long-axis direction X is also set at an inclination; and the thickness direction Z is perpendicular to the sagittal plane. At this point, since the concha cavity 102 has a certain volume and depth, the earphone 10 has a certain distance between the inner side surface IS and the concha cavity. The ear canal may be communicated with the outside world through the gap between the inner side surface IS and the concha cavity, thus freeing both ears of the user. At the same time, the sound production component 11 and the concha cavity may cooperate to form an auxiliary cavity (e.g., a cavity structure as mentioned later) that is communicated with the ear canal. In some embodiments, the sound outlet 112 may be at least partially located in the aforementioned auxiliary cavity, and the sound exported from the sound outlet 112 is limited by the aforementioned auxiliary cavity, i.e., the aforementioned auxiliary cavity is able to gather the sound, allowing the sound to propagate more into the ear canal, thereby improving the volume and quality of the sound heard by the user in the near-field, and improving the acoustic effect of the earphone 10.

The description of the above-mentioned open earphone 10 is for the purpose of illustration only, and is not intended to limit the scope of the present disclosure. Those skilled in the art can make various changes and modifications based on the description of this present disclosure. For example, the earphone 10 may also include a battery assembly, a Bluetooth assembly, etc., or a combination thereof. The battery assembly may be used to power the earphone 10. The Bluetooth assembly may be used to wirelessly connect the earphone 10 to other devices (e.g., a cell phone, a computer, etc.). These variations and modifications remain within the scope of protection of the present disclosure.

Figure 16:
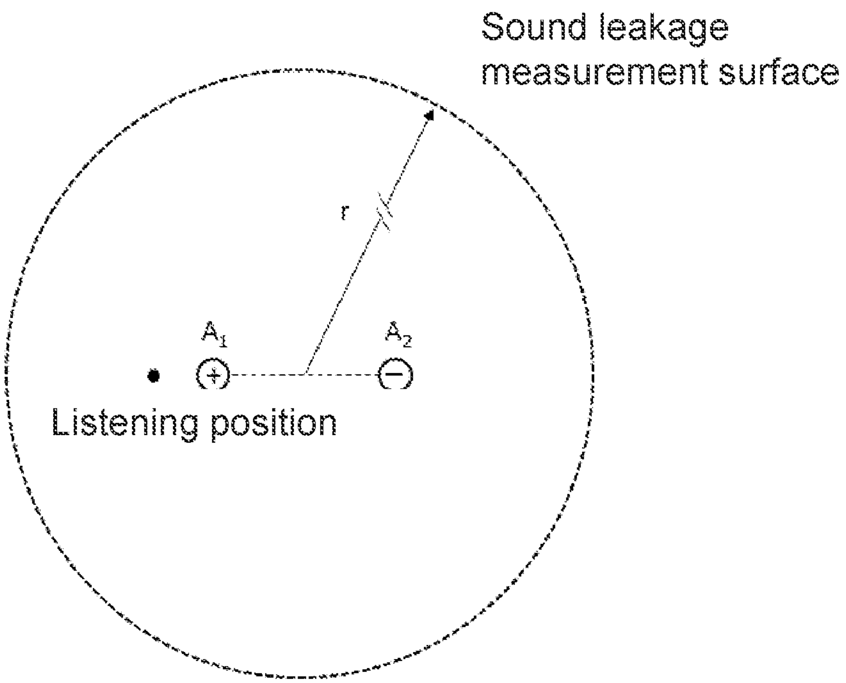
FIG. 16 is a schematic diagram illustrating two-point sound sources and a listening position according to some embodiments of the present disclosure.

FIG. 16 is a schematic diagram illustrating two-point sound sources and a listening position according to some embodiments of the present disclosure. In some embodiments, referring to FIG. 16, a sound may be transmitted to the outside of the earphone 10 via the sound outlet 112, which may be treated as a monopole sound source (or a single point sound source) A, and it can produce a first sound. A sound may be transmitted to the outside of the earphone 10 via the pressure relief hole 113, which may be treated as a monopole sound source (or a single point sound source) B, and it can produce a second sound. The second sound may be in opposite or approximately opposite phase to the first sound, so that the first sound and the second sound can cancel each other out in the far-field, i.e., forming an "acoustic dipole" to reduce sound leakage. In some embodiments, in the wearing state, a line connecting the two monopole sound sources may be pointed toward the ear canal (noted as a "listening position") so that the user can hear a sufficiently loud sound. In this case, a sound pressure level at the listening position (denoted as Pear) may be used to characterize the intensity of the sound heard by the user (i.e., a near-field listening sound pressure). Further, the magnitude of the sound pressure (denoted as $P_{far}$) on a sphere centered at the user's listening position (or on a sphere with a center of the dipole sound source (e.g., A and B as shown in FIG. 16) and a radius of r) may be counted and may be used to characterize the intensity of sound leakage radiated to the far-field by the earphone 10 (i.e., a far-field leakage sound pressure). $P_{far}$ may be obtained in various statistical ways, for example, by taking an average value of the sound pressure at each point of the sphere, or by taking the sound pressure distribution at each point of the sphere for area integration, etc.

It should be known that the measurement method for sound leakage in the present disclosure is only an exemplary illustration of the principle and effect, and is not limited. The method for measuring and calculating sound leakage may also be reasonably adjusted according to actual conditions. For example, a center of the dipole sound source may be used as a center of a circle, and sound pressure amplitudes of two or more points evenly sampled according to a certain spatial angle in the far-field may be averaged. In some embodiments, the measurement method for listening sound may be to select a position near the point sound source as the listening position, and the sound pressure amplitude measured at that listening position is used as a value of the listening sound. In some embodiments, the listening position may or may not be on the connection line between the two-point sound sources. The measurement and calculation of the listening sound may also be reasonably adjusted according to actual conditions, for example, taking the sound pressure amplitude of other points or more than one point in the near-field for averaging. As another example, with a point sound source may be used as a center of a circle, and sound pressure amplitudes of two or more points evenly sampled according to a certain spatial angle in the near-field may be averaged. In some embodiments, a distance between the near-field listening position and a point sound source is much smaller than a distance between the point sound source and the far-field leakage sound measurement sphere.

Obviously, the sound pressure Pear transmitted by the earphone 10 to the user's ear should be large enough to increase the listening effect; and the sound pressure $P_{far}$ in the far-field should be small enough to increase the sound leakage reduction effect. Therefore, a sound leakage index α may be taken as an index for evaluating the sound leakage reduction capability of the earphone 10:

$$\alpha = \frac{|P_{far}|^2}{|P_{ear}|^2}. \tag{14}$$

According to equation (14), it can be seen that the smaller the leakage index is, the stronger the sound leakage reduction ability of the earphone is, and in the case of the same near-field listening volume at the listening position, the smaller the far-field leakage sound is.

Figure 17:
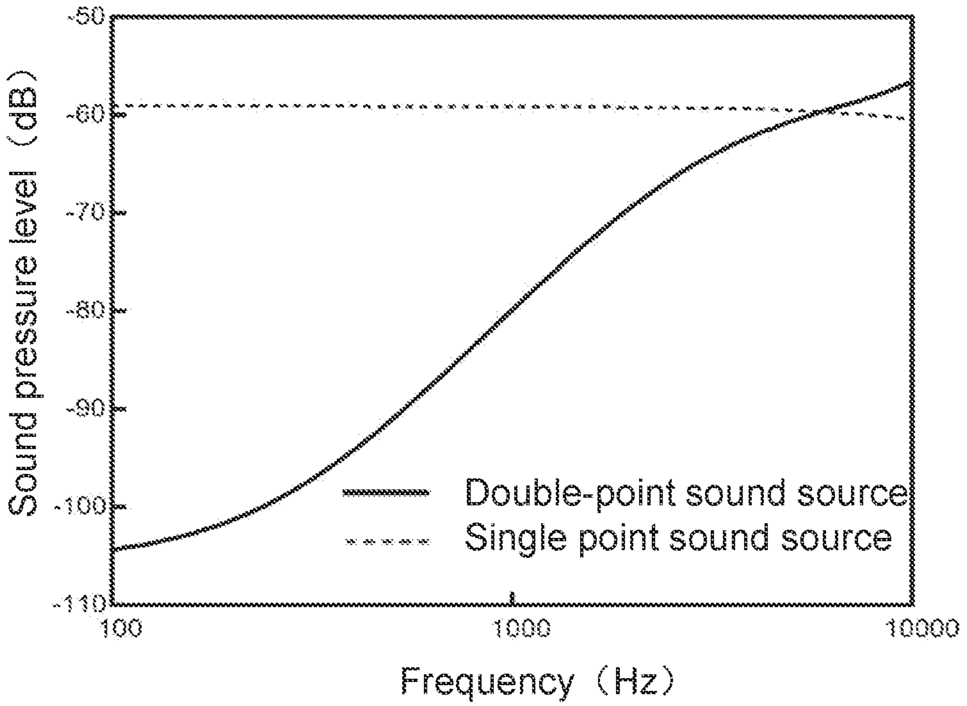
FIG. 17 is a comparison diagram of sound leakage indexes at different frequencies of a single-point sound source and a double-point sound source according to some embodiments of the present disclosure.

FIG. 17 is a comparison diagram of sound leakage indexes at different frequencies of a single point sound source and two-point sound sources according to some embodiments of the present disclosure. The double-point sound source (also known as a dipole sound source) in FIG. 17 may be a typical double-point sound source, i.e., a distance between two point sound sources is fixed, and the two-point sound sources have the same amplitude and the opposite phases. It should be understood that the typical double-point sound source is only for the principle and effect description, and parameters of each point sound source can be adjusted according to the actual needs to make it different from the typical double-point sound source. As shown in FIG. 17, when the distance is fixed, the sound leakage generated by the double-point sound source increases with the increase of frequency, and the sound leakage reduction ability decreases with the increase of frequency. When the frequency is greater than a certain frequency value (for example, about 8000 Hz as shown in FIG. 17), the sound leakage is greater than that of a single-point sound source, and this frequency (for example, 8000 Hz) is an upper frequency at which the double-point sound source can reduce the sound leakage.

In some embodiments, to improve the acoustic output of the earphone 10, i.e., to increase the sound intensity in the near-field listening position while reducing the volume of the far-field leakage sound, a baffle may be provided between the sound outlet 112 and the pressure relief hole 113.

Figure 18:
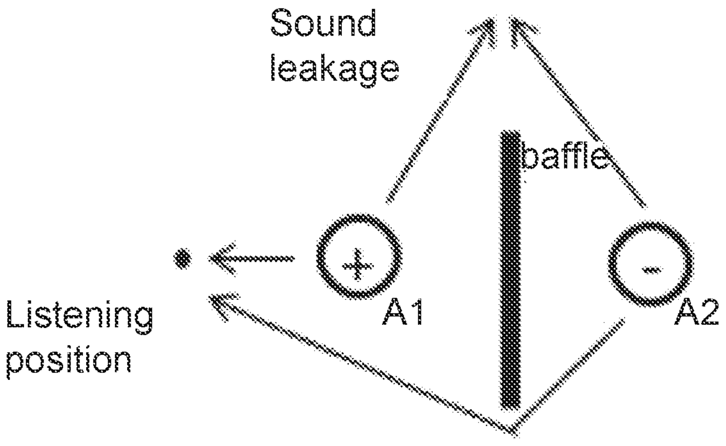
FIG. 18 is a schematic diagram illustrating an exemplary distribution of a baffle provided between two sound sources of a dipole sound source according to some embodiments of the present disclosure.

FIG. 18 is a schematic diagram illustrating an exemplary distribution of a baffle provided between two sound sources of a dipole sound source according to some embodiments of the present disclosure. As shown in FIG. 18, when a baffle is provided between a point sound source A1 and a point sound source A2, in the near-field, a sound wave of the point sound source A2 needs to bypass the baffle to interfere with a sound wave of the point sound source A1 at the listening position, which is equivalent to an increase in a sound path from the point sound source A2 to the listening position. Therefore, assuming that the point sound source A1 and the point sound source A2 have the same amplitude, the amplitude difference between the sound waves of the point sound source A1 and the point sound source A2 at the listening position increases compared to the case without the baffle, thus reducing the degree of cancellation of the two sounds at the listening position and making the volume at the listening position increase. In the far-field, since the sound waves generated by the point sound source A1 and the point sound source A2 can interfere without bypassing the baffle in a large spatial area (similar to the case without the baffle), the sound leakage in the far-field does not increase significantly compared to the case without the baffle. Therefore, a baffle structure around one of the point sound sources A1 and A2 may significantly increase the volume of the near-field listening position without significantly increasing the volume of the far-field leakage sound.

Figure 19:
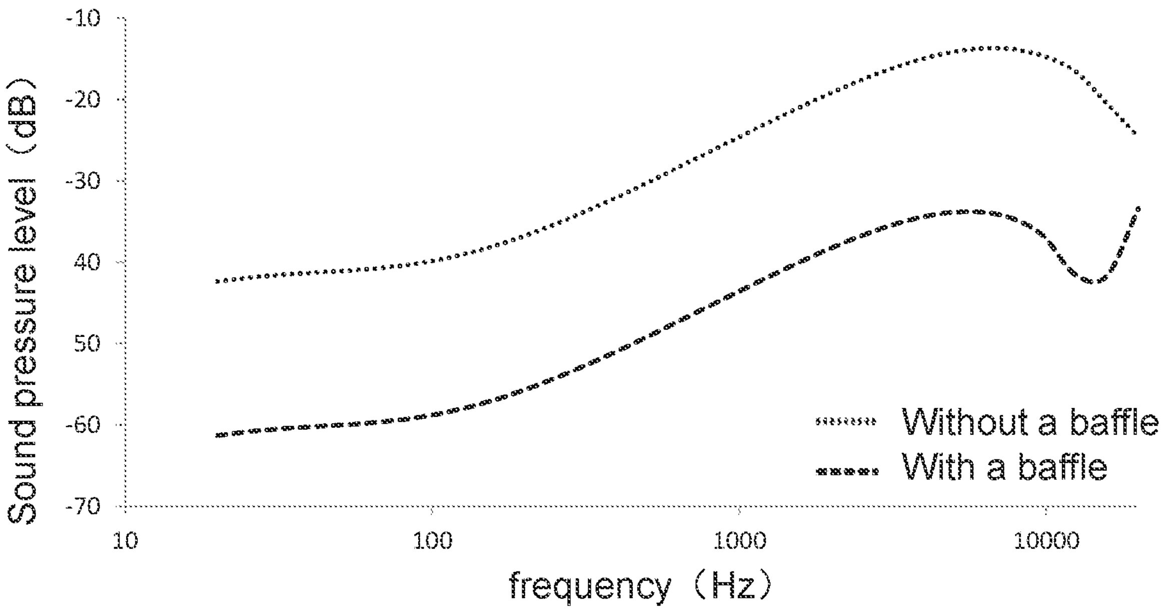
FIG. 19 is a diagram illustrating sound leakage indexes with and without a baffle between two sound sources of a dipole sound source according to some embodiments of the present disclosure.

FIG. 19 is a diagram illustrating sound leakage indexes with and without a baffle between two sound sources of a dipole sound source according to some embodiments of the present disclosure. After adding the baffle between the two point sound sources, in the near-field, it is equivalent to increasing the distance between the two point sound sources, the volume of the listening position in the near-field is equivalent to being generated by the double-point sound source at a greater distance, the listening volume in the near-field is significantly increased compared to the case without the baffle; in the far-field, a sound field of the double-point sound source is less affected by the baffle, and the resulting sound leakage is equivalent to being generated by the double-point sound source at a smaller distance. Therefore, as shown in FIG. 19, after adding the baffle, the leakage index is much smaller than that without the baffle, i.e., at the same listening volume, the sound leakage in the far-field is smaller than that in the case without the baffle, and the sound leakage reduction ability is obviously enhanced.

Figure 20:
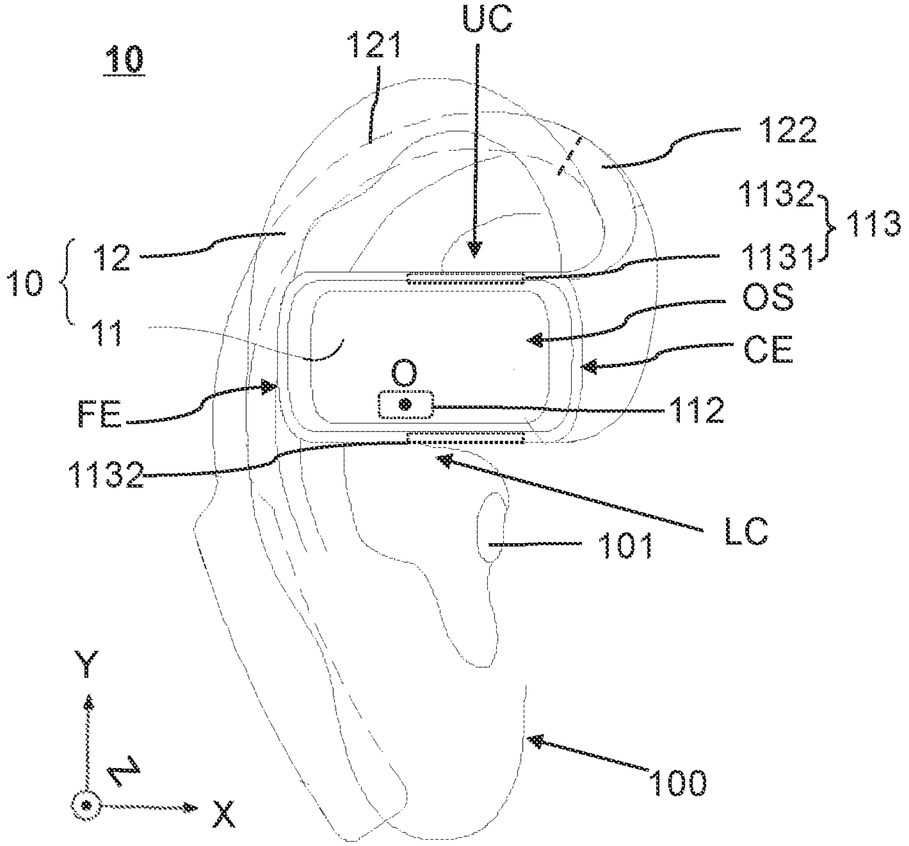
FIG. 20 is a schematic diagram illustrating an exemplary wearing state of an open earphone according to some embodiments of the present disclosure.
Figure 21:
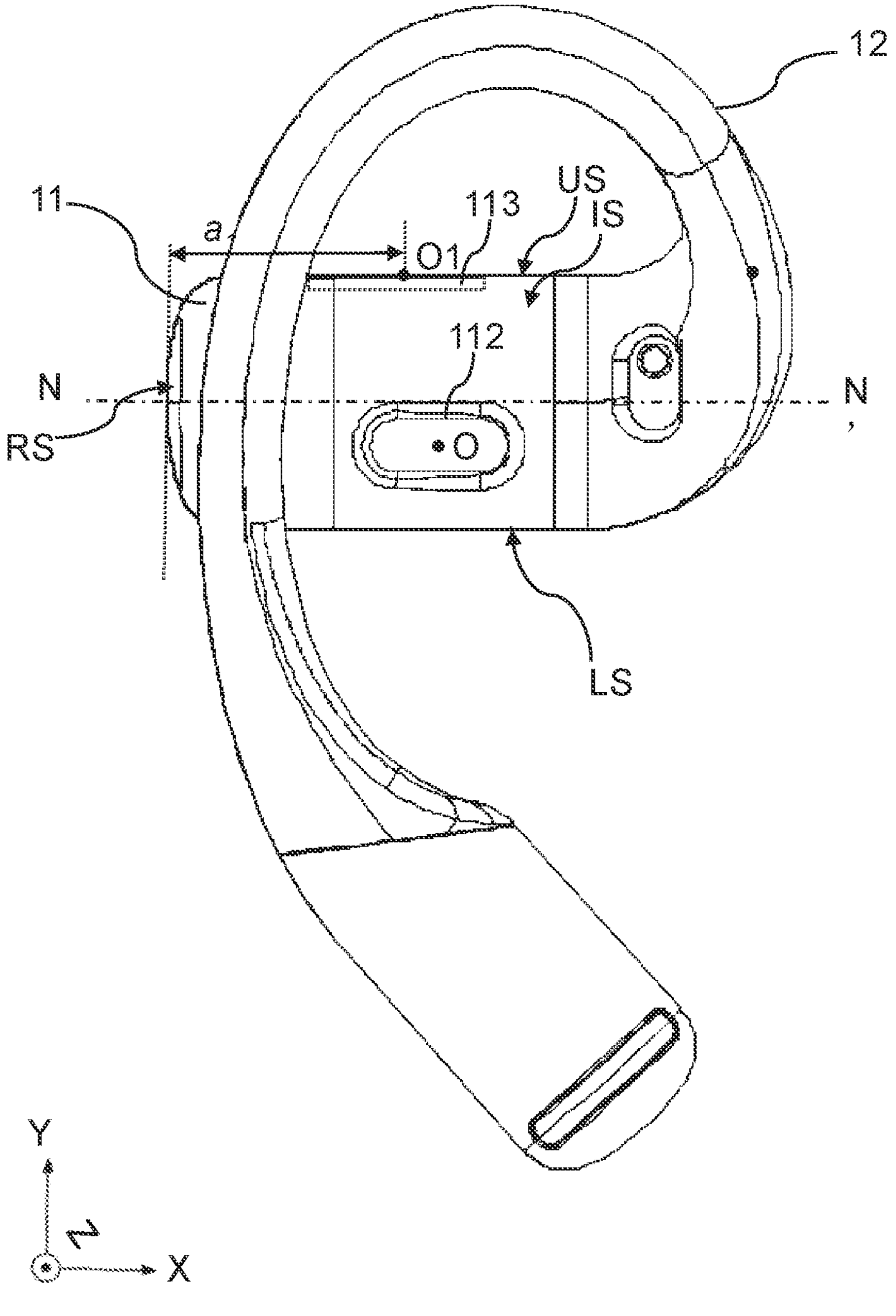
FIG. 21 is a schematic diagram illustrating a structure of a side of the earphone shown in FIG. 20 facing the ear.
Figure 22:
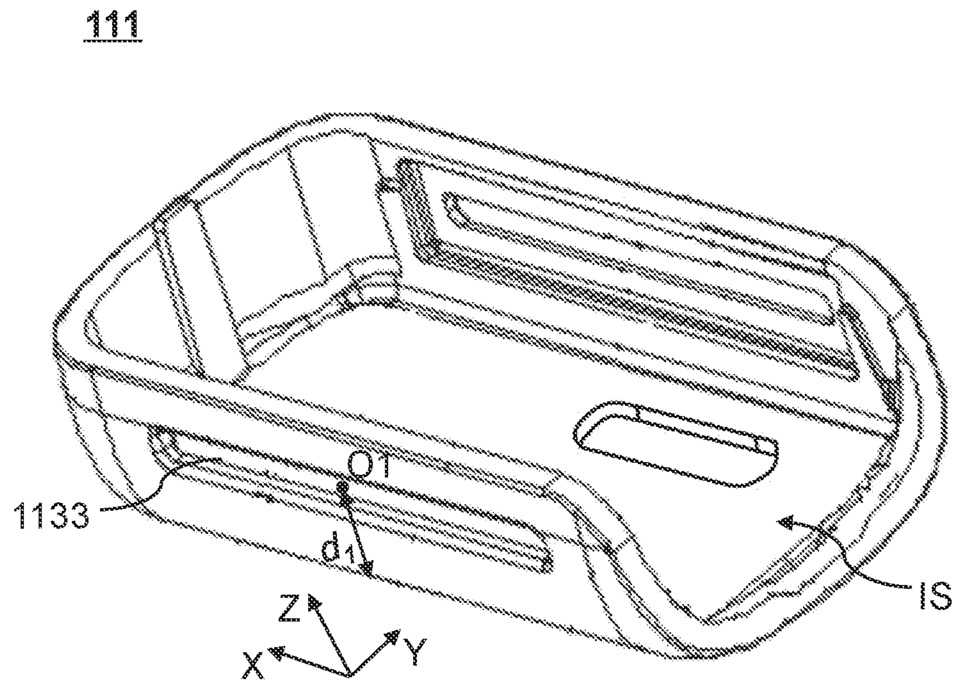
FIG. 22 is a schematic diagram illustrating a structure of a housing of the earphone shown in FIG. 20.

FIG. 20 is a schematic diagram illustrating an exemplary wearing state of an open earphone according to some embodiments of the present disclosure. FIG. 21 is a schematic diagram illustrating a structure of a side of the earphone shown in FIG. 20 facing the ear. FIG. 22 is a schematic diagram illustrating a structure of a housing of the earphone shown in FIG. 20.

As shown in FIG. 20, the ear hook 12 is an arc-shaped structure that fits at the junction of the user's head and the ear 100. The sound production component 11 (or the housing 111 of the sound production component 11) may have a connection end CE connected to the ear hook 12 and a free end FE not connected to the ear hook 12. When the earphone 10 is in the wearing state, a first portion 121 of the ear hook 12 (e.g., the hook portion of the ear hook 12) is positioned between the user's ear (e.g., the helix 107) and the head, and a second portion 122 of the ear hook 12 (e.g., the connection portion of the ear hook) extends toward a side of the auricle away from the head and connects to the connection end CE of the sound production component 11 to hold the sound production component 11 at a position near the ear canal but without blocking the ear canal.

Referring to FIGS. 20 and 21, the sound production component 11 may have an inner side surface IS (also called an inner side surface of the housing 111) facing the ear along the thickness direction Z in the wearing state, an outer side surface OS (also called an outer side surface of the housing 111) away from the ear, and a connection surface connecting the inner side surface IS and the outer side surface OS. It should be noted that in the wearing state, when viewed along a direction in which the coronal axis (i.e., the thickness direction Z), the sound production component 11 may be provided in a shape of a circle, an oval, a rounded square, a rounded rectangle, etc. When the sound production component 11 is provided in the shape of a circle, an ellipse, etc., the above-mentioned connection surface may refer to an arc-shaped side surface of the sound production component 11; and when the sound production component 11 is set in the shape of a rounded square, a rounded rectangle, etc., the above-mentioned connection surface may include a lower side surface LS (also referred to as a lower side surface of the housing 111), an upper side surface US (also referred to as an upper side surface of the housing 111), and a rear side surface RS (also referred to as a rear side surface of the housing 111) as mentioned later. The upper side surface US and the lower side surface LS may refer to a side of the sound production component 11 in the wearing state along the short-axis direction Y away from the external ear canal 101 and a side of the sound production component 11 in the wearing state along the short-axis direction Y facing to the external ear canal 101, respectively; and the rear side surface RS may refer to a side of the sound production component 11 in the wearing state along the length direction X toward the back of the head. For the sake of description, the present disclosure is exemplarily illustrated with the sound production component 11 set in a rounded rectangle. The length of the sound production component 11 in the long-axis direction X may be greater than the width of the sound production component 11 in the short-axis direction Y. In some embodiments, the rear side surface RS of the earphone may be curved in order to improve the aesthetics and wearing comfort of the earphone.

The sound production component 11 may be provided with a transducer that can convert an electrical signal into a corresponding mechanical vibration to produce sound. The transducer (e.g., a diaphragm) may divide the housing 111 to form a front cavity and a rear cavity of the earphone. The sound produced in the front and rear cavities is in opposite phase. The inner side surface IS is provided with a sound outlet 112 communicated with the front cavity to transmit the sound generated in the front cavity out of the housing 111 and into the ear canal so that the user can hear the sound. Other sides of the housing 111 (e.g., the outer side surface OS, the upper side surface US, or the lower side surface LS, etc.) may be provided with one or more pressure relief holes 113 communicated with the rear cavity for guiding the sound generated in the rear cavity output of the housing 111 to interfere with the sound leaked from the sound outlet 112 in the far-field. In some embodiments, the pressure relief holes 113 are further away from the ear canal than the sound outlet 112 so as to weaken the inverse phase cancellation between the sound output via the pressure relief holes 113 and the sound output via the sound outlet 112 at the listening position (e.g., the ear canal), thereby improving the sound volume at the listening position.

For the sake of description, some embodiments of the present disclosure are illustrated exemplarily with only one pressure relief hole provided on the sound production component 11 (e.g., the pressure relief hole 113 provided on the US illustrated in FIG. 21). It should be noted that, the sound production component 11 with the only one pressure relief hole 113 is merely an example, and in some embodiments, the count and/or the position of the pressure relief hole can be adjusted.

In some embodiments, in order to prevent the sounds output by the pressure relief hole 113 affecting the volume of the sound output from the sound outlet 112 at the listening position, the pressure relief hole 113 should be located as far away from the sound outlet 112 as possible.

In some embodiments, as shown in FIG. 20, when the earphone 10 is in the wearing state, the long-axis direction X of the sound production component 11 may be set horizontally or approximately horizontally (similar to position C shown in FIG. 15). In such cases, the sound production component 11 is located at least partially at the antihelix 105, and the free end FE of the sound production component 11 may be oriented toward the back of the head. With the sound production component 11 in a horizontal or approximately horizontal state, the projection of the long-axis direction X of the sound production component 11 on the sagittal plane may be in the same direction as the sagittal axis, the projection of the short-axis direction Y on the sagittal plane may be in the same direction as the vertical axis, and the thickness direction Z is perpendicular to the sagittal plane.

In some embodiments, in order to improve the fit between the earphone 10 and the ear 100 and improve the stability of the earphone 10 in the wearing state, the inner side surface IS of the housing 111 may be pressed onto the surface of the ear 100 (e.g., the antihelix 105) to increase the resistance of the earphone 10 falling off the ear 100.

In some embodiments, referring to FIGS. 20 and 21, when the earphone 10 is pressed onto the ear 100, in order to keep the sound outlet 112 on the inner side surface IS from being obstructed by ear tissues, the projection of the sound outlet 112 on the sagittal plane may partially or fully coincide with the projection of an inner concave structure (e.g., the concha boat 103) of the ear on the sagittal plane. In some embodiments, since the concha boat 103 is communicated with the concha cavity 102 and the ear canal is located in the concha cavity 102, when at least a portion of the projection of the sound outlet 112 on the sagittal plane is located within the concha boat 103, the sound output from the sound outlet 112 may reach the ear canal unobstructed, resulting in a higher volume received by the ear canal. In some embodiments, a long-axis dimension of the sound production component 11 may not be too long. If the long-axis dimension of the sound production component 11 is too long, the projection of the free end FE on the sagittal plane may exceed the projection of the ear on the sagittal plane, thereby affecting the fitting effect of the sound production component 11 to the ear. Therefore, the long-axis dimension of the sound production component 11 may be designed so that the projection of the free end FE on the sagittal plane does not exceed the projection of the helix 107 on the sagittal plane.

It should be known that since the sound outlet 112 and the pressure relief hole 113 are provided on the housing 111 and each side wall of the housing 111 has a certain thickness, the sound outlet 112 and the pressure relief hole 113 are both holes with a certain depth. At this time, the sound outlet 112 and the pressure relief hole 113 may both have an inner opening and an outer opening. For ease of description, in the present disclosure, the center O of the sound outlet 112 described above and below may refer to the centroid of the outer opening of the sound outlet 112, and the center of the pressure relief hole 113 described above and below may refer to the centroid of the outer opening of the pressure relief hole 113. For the purposes of description, in the present disclosure, the areas of the sound outlet 112 and the pressure relief hole 113 may refer to areas of the outer openings of the sound outlet 112 and the pressure relief hole 113 (e.g., the area of the outer opening of the sound outlet 112 on the inner side surface IS). It should be known that in some other embodiments, the areas of the sound outlet 112 and the pressure relief hole 113 may also be referred to other cross-sectional areas of the sound outlet 112 and the pressure relief hole 113, for example, the area of the inner opening of the sound outlet 112 and/or the pressure relief hole 113, or an average of the area of the inner opening and the area of the outer opening of the sound outlet 112 and/or the pressure relief hole 113, etc.

In some embodiments, the sound outlet 112 communicated with the front cavity may be considered as the point sound source A1 shown in FIG. 18, the pressure relief hole 113 (e.g., the first pressure relief hole 1131) communicated with the rear cavity may be considered as the point sound source A2 shown in FIG. 18, and the ear canal may be considered as the listening position shown in FIG. 18. At least part of the housing of the sound production component 11 and/or at least part of the auricle may be considered as the baffle shown in FIG. 18 to increase a difference between sound paths from the sound outlet 112 and the pressure relief hole 113 to the ear canal, so as to increase the sound intensity at the ear canal while maintaining the far-field sound leakage reduction effect. When the earphone 10 adopts the structure shown in FIG. 20, i.e., when at least a portion of the housing 111 is located at the antihelix 105, in terms of the listening effect, a sound wave of the sound outlet 112 may reach the ear canal directly. In this case, the sound outlet 112 may be provided at a position on the inner side surface IS near the lower side surface LS, and at least one pressure relief hole may be provided at a position away from the sound outlet 112, for example, the first pressure relief hole 1131 may be provided at a position on the outer side OS or the upper side surface US away from the sound outlet 112. A sound wave of the first pressure relief hole 1131 needs to bypass the exterior of the sound production component 11 to interfere with the sound wave of the sound outlet 112 at the ear canal. In addition, an upper convex and lower concave structure on the auricle (e.g., the antihelix, the tragus etc., in its propagation path) increases the sound path of the sound transmitted from the first pressure relief hole 113 to the ear canal. Thus, the sound production component 11 itself and/or at least part of the auricle is equivalent to a baffle between the sound outlet 112 and the first pressure relief hole 1131. The baffle increases the sound path from the first pressure relief hole 1131 to the ear canal and reduces the intensity of the sound waves from the first pressure relief hole 1131 in the ear canal, thereby reducing the cancellation degree between the two sounds emitted from the sound outlet 112 and the first pressure relief hole 1131 in the ear canal, resulting in an increase in the volume in the ear canal. In terms of the sound leakage effect, since the sound waves generated by both the sound outlet 112 and the pressure relief hole 113 can interfere without bypassing the sound production component 11 itself in a relatively large spatial area (similar to the case without a baffle), the sound leakage is not increased significantly. Therefore, by setting the sound outlet 112, and the pressure relief hole 113 at suitable positions, it is possible to significantly increase the volume in the ear canal without a significant increase in the leakage sound volume.

In some embodiments, referring to FIG. 22, in order to increase the sound path from the pressure relief hole 113 to the ear canal, the dimension of the earphone 10 in the thickness direction Z may be increased, thereby increasing the sound production efficiency (i.e., the listening volume at the listening position) of the earphone 10. Further, the pressure relief hole 113 may be provided away from the inner side surface IS, thereby further increasing the sound path from the pressure relief hole 113 to the ear canal and increasing the sound production efficiency of the earphone 10. In addition, the overall dimension of the sound production component 11 is limited to not be too large (e.g., the size of the sound production component 11 in the Z-direction cannot be too large), otherwise the overall mass of the earphone 10 may increase, thereby affecting the wearing comfort of the user. In some embodiments, a distance $d_1$ from the center O1 of the pressure relief hole 113 to the inner side surface IS is in a range of 4.24 mm to 7.96 mm. In some embodiments, the distance $d_1$ from the center O1 of the pressure relief hole 113 to the inner side surface IS is in a range of 4.43 mm to 7.96 mm. In some embodiments, the distance $d_1$ from the center O1 of the pressure relief hole 113 to the inner side surface IS is in a range of 5.43 mm to 6.96 mm. In some embodiments, in the wearing state, in order to ensure that the projection of the pressure relief hole 113 on the horizontal plane is less or does not coincident with the projection of the ear 100 on the horizontal plane to achieve the goal that the sound output from the pressure relief hole 113 can be more radiated outwardly rather than being transmitted to the ear canal or reflected via a portion of the structure of the ear 100 (e.g., the auricle), the pressure relief hole 113 may be provided away from the inner side surface IS. By setting in this way, the sound path from the pressure relief hole 113 to the ear canal may be further increased, thereby improving the sound production efficiency of the earphone 10. In some embodiments, the distance $d_1$ from the center O1 of the pressure relief hole 113 to the inner side surface IS is in a range of 5.63 mm to 7.96 mm. In some embodiments, the distance $d_1$ from the center O1 of the pressure relief hole 113 to the inner side surface IS is in a range of 6.25 mm to 7.56 mm.

The description of the earphone 10 described above is only for the purpose of illustration, and is not intended to limit the scope of the present disclosure. For those skilled in the art, various variations and modifications can be made according to the description of the present disclosure. These variations and modifications are still within the scope of protection of the present disclosure.

Figure 23:
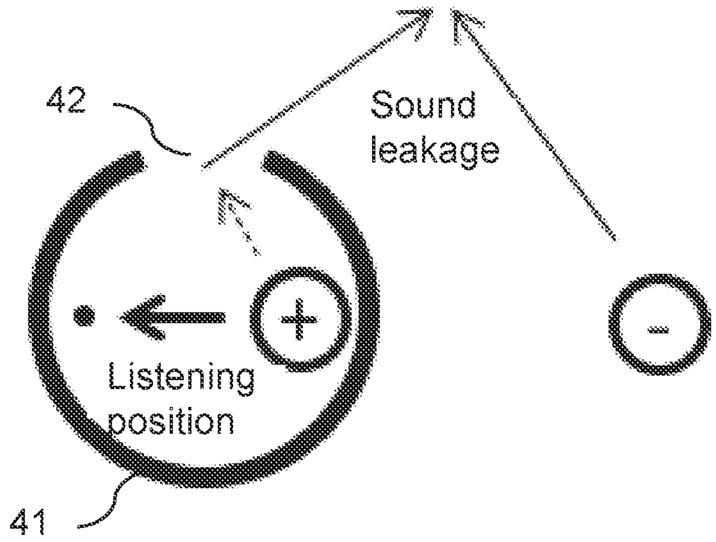
FIG. 23 is a distribution schematic diagram of a cavity structure arranged around one sound source of a dipole sound source according to some embodiments of the present disclosure.

In some embodiments, in order to increase the listening volume, particularly at low and middle frequencies, while still retaining the effect of far-field leakage sound cancellation, a cavity structure may be constructed around one of the sources of the double-point sound source. FIG. 23 is a distribution schematic diagram of a cavity structure arranged around one sound source of a dipole sound source according to some embodiments of the present disclosure.

As shown in FIG. 23, the cavity structure 41 is provided between the dipole sound source such that one sound source of the dipole sound source and the listening position is inside the cavity structure 41 and the other sound source is outside the cavity structure 41. A sound derived from the sound source inside the cavity structure 41 is limited by the cavity structure 41, i.e., the cavity structure 41 is able to gather the sound so that the sound can propagate more to the listening position, thereby improving the volume and quality of the sound at the listening position. In the present disclosure, the "cavity structure" can be understood as a semi-enclosed structure enclosed by a side wall of the sound production component 11 together with the concha cavity structure, which is such that the interior is not completely sealed off from the external environment, but has a leaking structure 42 (e.g., an opening, a slit, a pipe, etc.) that is acoustically communicated with the external environment. Exemplary leaking structures may include, but are not limited to, an opening, a slit, a pipe, etc., or any combination thereof.

In some embodiments, the cavity structure 41 may contain a listening position and at least one sound source. Here, "contain" may mean that at least one of the listening position and the sound source is inside the cavity, or it may mean that at least one of the listening position and the sound source is at an edge inside the cavity. In some embodiments, the listening position may be an opening of the ear canal or an acoustic reference point of the ear.

Figure 24A:
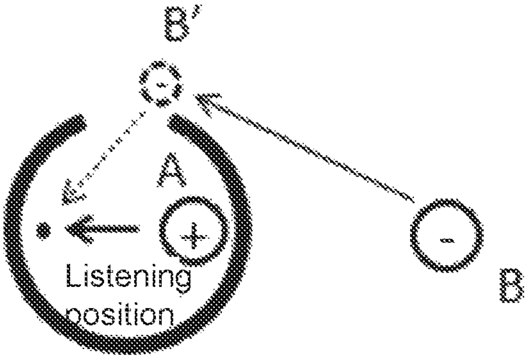
FIG. 24A is a schematic diagram illustrating a listening principle of a dipole sound source structure and a cavity structure constructed around one sound source of the dipole sound source according to some embodiments of the present disclosure.
Figure 24B:
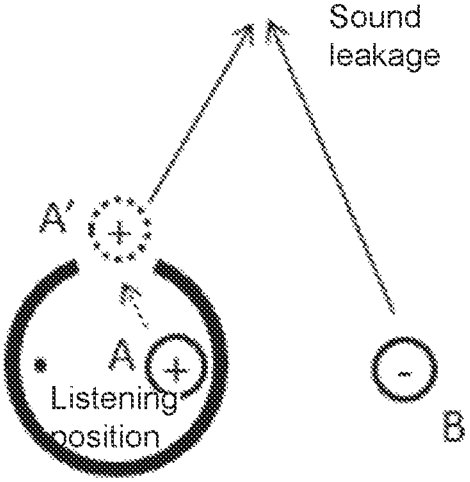
FIG. 24B is a schematic diagram illustrating a sound leakage principle of a dipole sound source structure and a cavity structure constructed around one sound source of the dipole sound source according to some embodiments of the present disclosure.

FIG. 24A is a schematic diagram illustrating a listening principle of a dipole sound source structure and a cavity structure constructed around one sound source of the dipole sound source according to some embodiments of the present disclosure. FIG. 24B is a schematic diagram illustrating a sound leakage principle of a dipole sound source structure and a cavity structure constructed around one sound source of the dipole sound source according to some embodiments of the present disclosure.

For the near-field listening sound, as a dipole with a cavity structure is constructed around one of the sound sources shown in FIG. 24A, and since one sound source A of the sound sources is wrapped by the cavity structure, most of the sound radiated from the sound source A may reach the listening position by a direct emission or reflection manner. In contrast, in the absence of the cavity structure, most of the sound radiated from the sound source does not reach the listening position. Therefore, the cavity structure makes it possible to significantly increase the volume of sound reaching the listening position. At the same time, only a small portion of an inversion sound radiated from an inversion source B outside the cavity structure enters the cavity structure through a leaking structure of the cavity structure. This is equivalent to the creation of a secondary sound source B' at the leaking structure, whose intensity is significantly smaller than that of the sound source B and also significantly smaller than that of the sound source A. The sound generated by the secondary sound source B' has a weak inversion cancellation effect on the sound source A in the cavity, so that the listening volume at the listening position is significantly increased.

For the sound leakage, as shown in FIG. 24B, the sound source A radiates a sound to the outside through the leaking structure of the cavity is equivalent to generating a secondary sound source A' at the leaking structure. Since almost all the sound radiated by the sound source A is output from the leaking structure, and a structural scale of the cavity is much smaller than a spatial scale for evaluating the sound leakage (the difference is at least one order of magnitude), therefore the intensity of the secondary sound source A' can be considered as comparable to that of the sound source A. For the external space, the cancellation effect between sounds produced by the secondary sound source A' and the sound source B is comparable to the cancellation effect between sounds produced by the sound source A and the sound source B. That is, the cavity structure still maintains a comparable sound leakage reduction effect.

It should be understood that the above leaking structure with one opening is only an example, and the leaking structure of the cavity structure may contain one or more openings, which may also achieve a superior listening index, wherein the listening index may refer to the reciprocal of the leakage index $\alpha$ by $1/\alpha$. Taking the structure with two openings as an example, the cases of equal opening and equal opening ratio are analyzed separately below. Taking the structure with only one opening as a comparison, the "equal opening" here means setting two openings each with the same dimension as the opening in the structure with only one opening, and the "equal opening ratio" means setting two openings, a total area of which is the same area as that of the structure with only one opening. The equal opening is equivalent to doubling the opening dimension corresponding to the structure with only one opening (i.e., a ratio of an opening area S of the leaking structure on the cavity structure to an area S0 of the cavity structure subject to a direct action of the contained sound source), and the overall listening index is reduced as described before. In the case of the equal opening ratio, even though S/S0 is the same as that of the structure with only one opening, the distances from the two openings to the external sound source are different, thus resulting in different listening indexes.

Figure 25A:
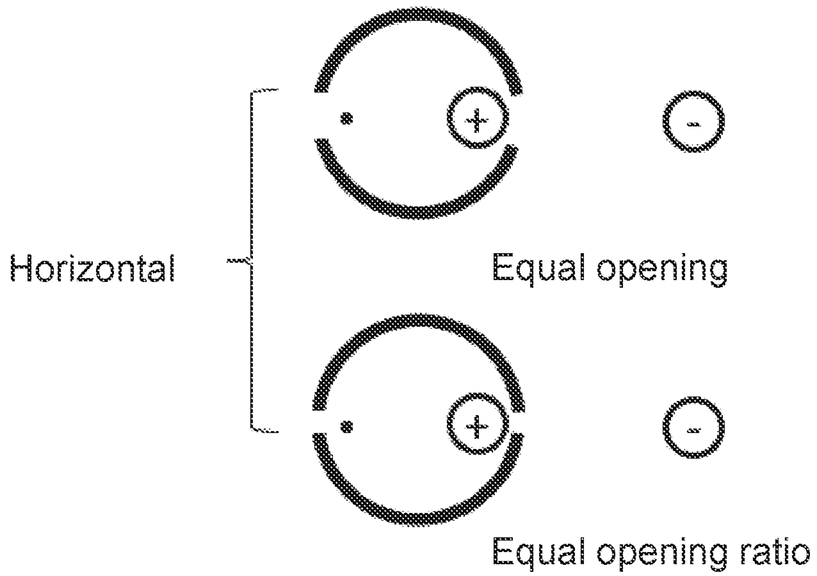
FIG. 25A is a schematic diagram illustrating a cavity structure with two horizontal openings according to some embodiments of the present disclosure.
Figure 25B:
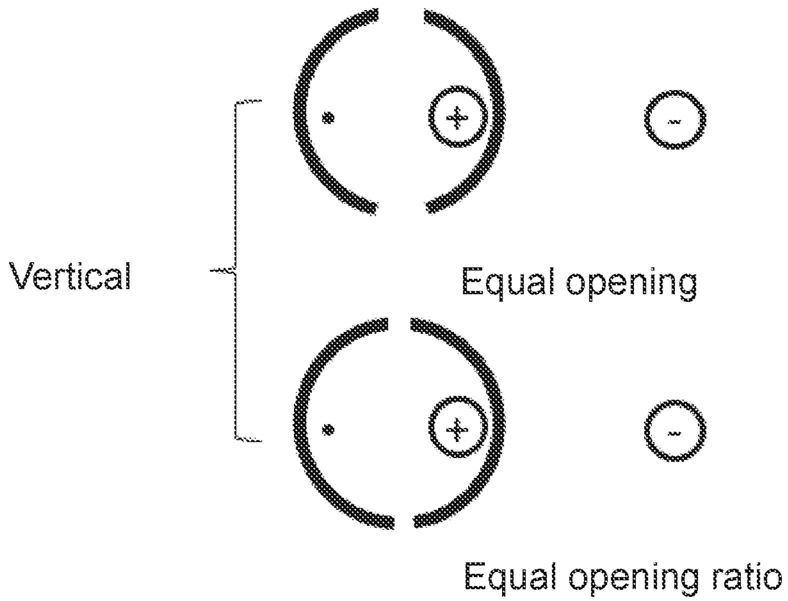
FIG. 25B is a schematic diagram illustrating a cavity structure with two vertical openings according to some embodiments of the present disclosure.

FIG. 25A is a schematic diagram illustrating a cavity structure with two horizontal openings according to some embodiments of the present disclosure. FIG. 25B is a schematic diagram illustrating a cavity structure with two vertical openings according to some embodiments of the present disclosure. As shown in FIG. 25A, when the two openings are parallel to a connection line of the two sound sources (i.e., two horizontal openings), the distances from the two openings to the external sound sources are the maximum and minimum, respectively; as shown in FIG. 25B, when the connection line is perpendicular (i.e., two vertical openings), the distances from the two openings to the external sound sources are equal and a middle value is obtained.

Figure 26:
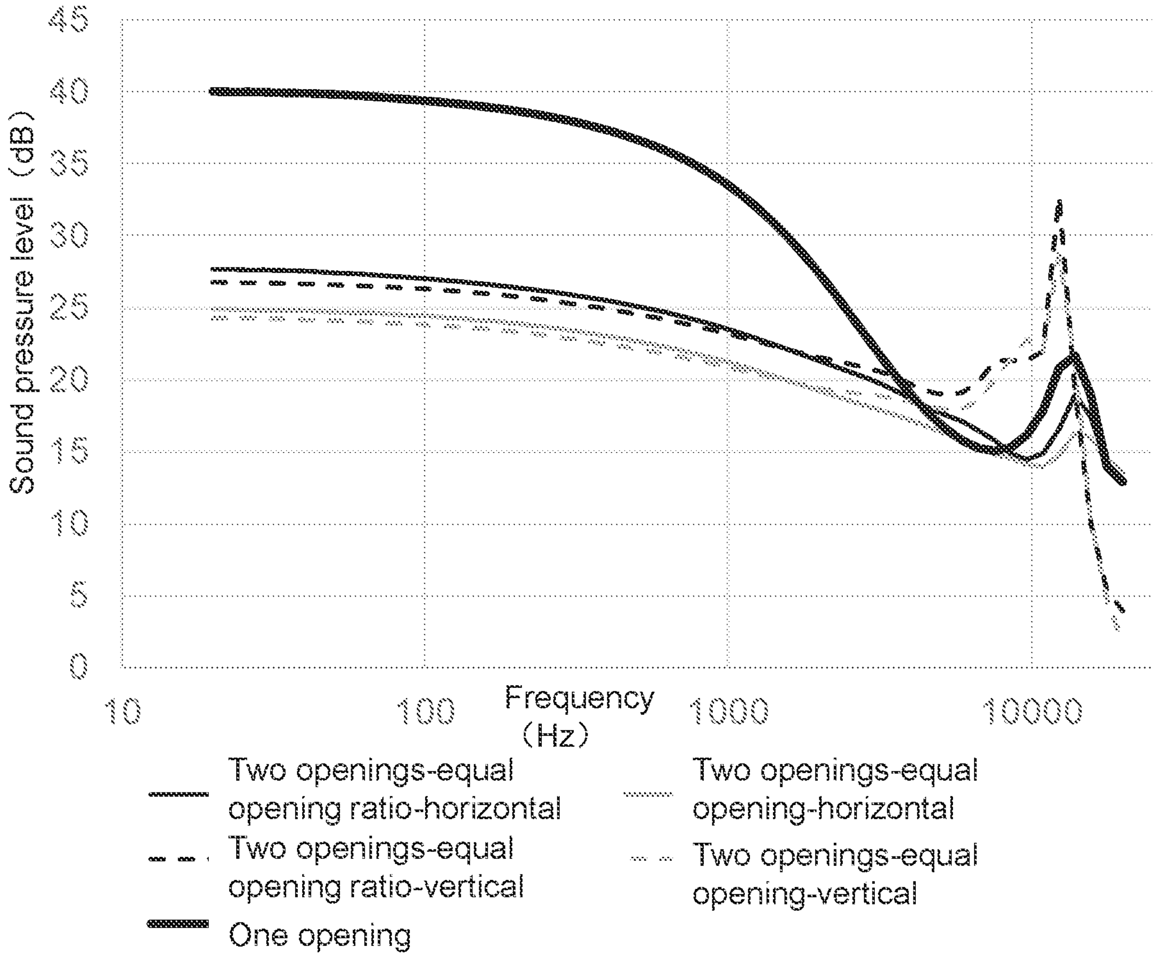
FIG. 26 is a listening index curve comparison diagram of a cavity structure with two openings and a cavity structure with one opening according to some embodiments of the present disclosure.

FIG. 26 is a listening index curve comparison diagram of a cavity structure with two openings and a cavity structure with one opening according to some embodiments of the present disclosure. As shown in FIG. 26, compared to the cavity structure with one opening, the overall listening index of the cavity structure with the equal opening decreases. For the cavity structure with the equal opening ratio, the distances from the two openings to the external sound source are different, thus also resulting in different listening indexes. Referring to FIG. 25A, FIG. 25B, and FIG. 26, it can be seen that regardless of whether the opening is horizontal or vertical, the listening index of the leaking structure with the equal opening ratio is higher than that of the leaking structure with the equal opening. This is because the relative opening dimension S/S0 of the leaking structure with the equal opening ratio is twice smaller compared to that of the leaking structure with the equal opening, so the listening index is larger. Referring to FIG. 25A, FIG. 25B, and FIG. 26, it can also be seen that regardless of the leaking structure with the equal opening or the leaking structure with the equal opening ratio, the listening index of the leaking structure with horizontal openings is larger. This is because a distance from one of the openings in the leaking structure with horizontal openings to an external sound source is smaller than a distance between the two sound sources, so that the formed secondary sound source and the external sound source are closer to each other than the original two sound sources, and therefore the listening index is higher, thereby improving the sound leakage reduction effect. Therefore, in order to improve the sound leakage reduction effect, it is possible to make a distance from at least one of the openings to the external sound source smaller than the distance between the two sound sources.

In addition, as shown in FIG. 26, the cavity structure with two openings can better increase the resonance frequency of the air sound within the cavity structure compared to the cavity structure with one opening, resulting in a better listening index for the entire device in a high frequency band (e.g., sounds with frequencies near 10,000 Hz) compared to a cavity structure with only one opening. The high frequency band is a more sensitive frequency band for the human ear and therefore has a greater need for sound leakage reduction. Therefore, in order to improve the sound leakage reduction effect in the high frequency band, a cavity structure with more than one opening may be chosen.

Figure 27:
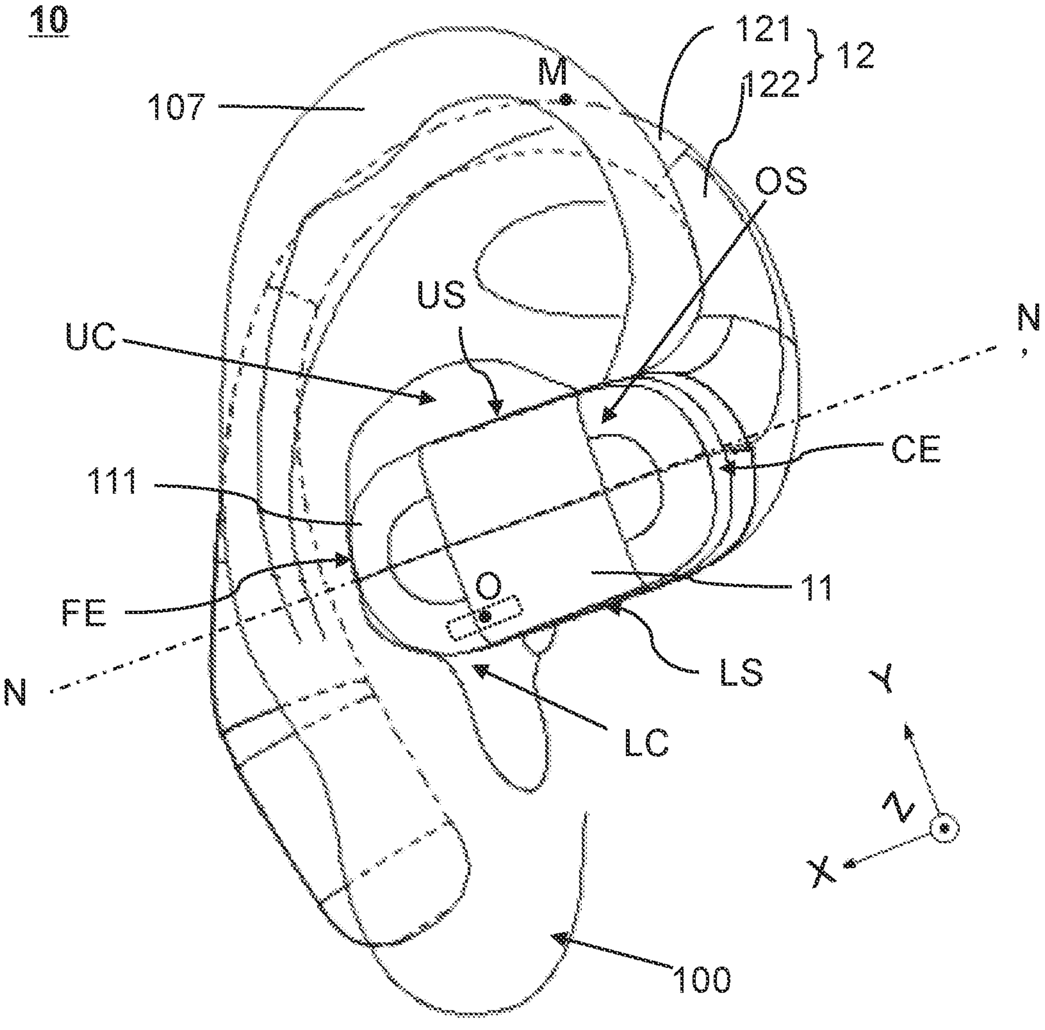
FIG. 27 is a schematic diagram illustrating an exemplary wearing state of an open earphone according to some embodiments of the present disclosure.
Figure 28:
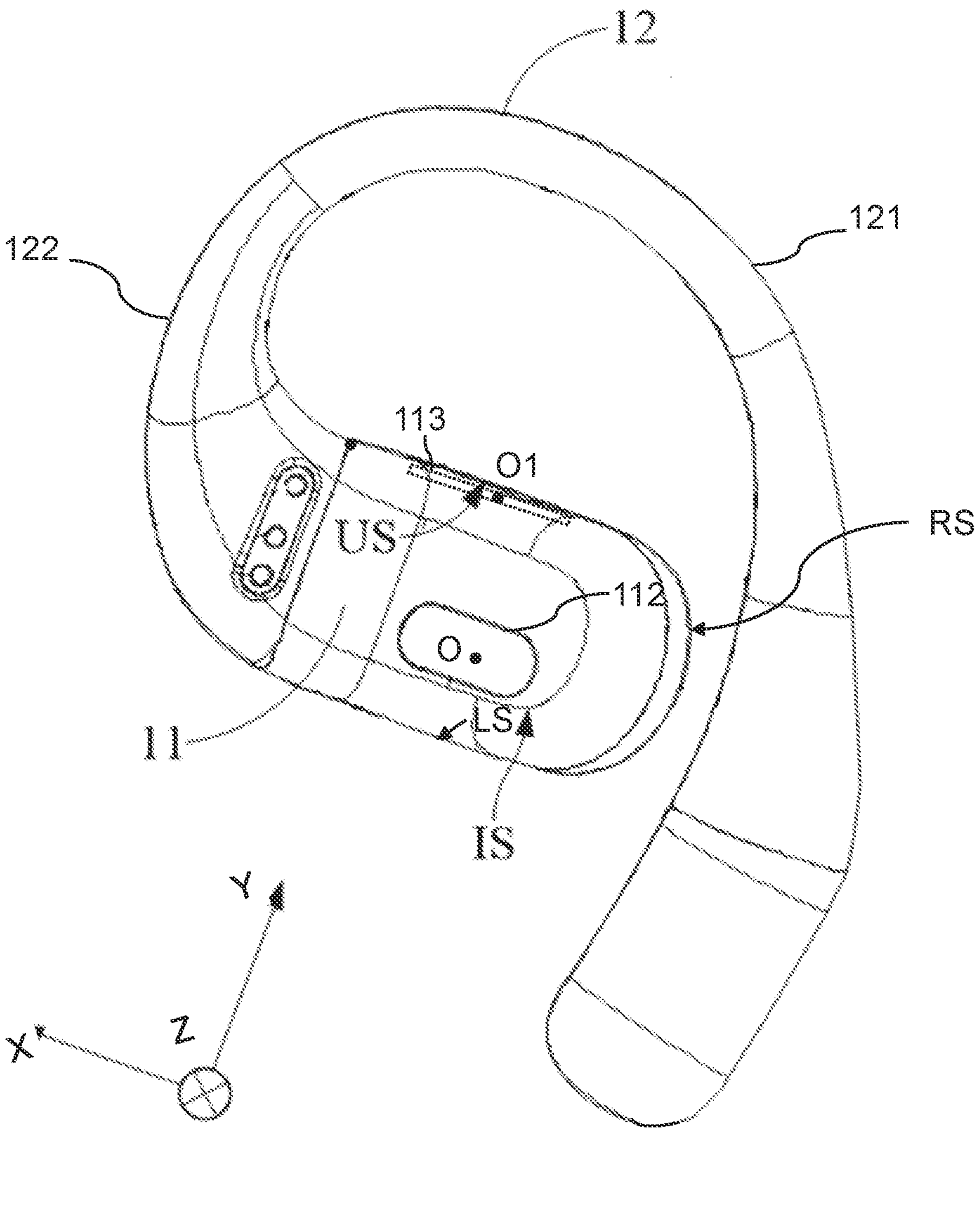
FIG. 28 is a schematic diagram illustrating a structure of a side of the earphone shown in FIG. 14 facing the ear.

FIG. 27 is a schematic diagram illustrating an exemplary wearing state of an open earphone according to some embodiments of the present disclosure. FIG. 28 is a schematic diagram illustrating a structure of a side of the earphone shown in FIG. 27 facing the ear.

The earphone 10 shown in FIG. 27 is similar in configuration to the earphone 10 shown in FIG. 20, for example, the ear hook 12 is an arc structure that fits into a junction of the user's head and the ear 100. The sound production component 11 (or the housing 111 of the sound production component 11) may have a connection end CE connected to the ear hook 12 and a free end FE not connected to the ear hook 12. When the earphone 10 is in the wearing state, a first portion 121 of the ear hook 12 (e.g., the hook portion of the ear hook 12) is hung between the user's ear (e.g., the helix 107) and the head. A second portion 122 of the ear hook 12 (e.g., the connection portion of the ear hook) extends toward a side of the auricle away from the head and connects to the connection end CE of the sound production component 11 to place the sound production component 11 at a position near but not blocking the ear canal. The earphone 10 shown in FIG. 27 has a similar structure to the earphone 10 shown in FIG. 20, and its main difference is that the sound production component 11 is inclined, and the housing 111 of the sound production component 11 is at least partially inserted into the concha cavity 102, for example, the free end FE of the sound production component 11 may extend into the concha cavity 102. The ear hook 12 and the sound production component 11 of such a structure are better adapted to the ear 100 of the user, and can increase the resistance of the earphone 10 to fall off from the ear 100, thus increasing the wearing stability of the earphone 10.

In some embodiments, in the wearing state, when viewed along the thickness direction Z, the connection end CE of the sound production component 11 is closer to the top of the head compared to the free end FE, so as to facilitate the free end FE to extend into the concha cavity. Based on this, an angle between the long-axis direction X and a direction where the sagittal axis of the human body is located may be between 15° and 60°. If the aforementioned angle is too small, it is easy to cause the free end FE to be unable to extend into the concha cavity, and make the sound outlet 112 on the sound production component 11 too far away from the ear canal; if the aforementioned angle is too large, it is also easy to cause the sound production component 11 to fail to extend into the concha cavity, and make the ear canal be blocked by the sound production component 11. In other words, such setting not only allows the sound production component 11 to extend into the concha cavity, but also allows the sound outlet 112 on the sound production component 11 to have a suitable distance from the ear canal, so that the user can hear more sounds produced by the sound production component 11 under the condition that the ear canal is not blocked.

In some embodiments, the sound production component 11 and the ear hook 12 may jointly clamp the aforementioned ear region from both front and rear sides of the ear region corresponding to the concha cavity, thereby increasing the resistance of the earphone 10 to dropping from the ear and improving the stability of the earphone 10 in the wearing state. For example, the free end FE of the sound production component 11 is pressed and held in the concha cavity in the thickness direction Z. As another example, the free end FE is pressed against the concha cavity in the long-axis direction X and in the short-axis direction Y.

In some embodiments, both ends of the second portion 122 of the ear hook 12 may be connected to the first portion 121 of the ear hook 12 and the connection end CE of the sound production component 11, respectively (as shown in FIG. 28). In some embodiments, the second portion 122 of the ear hook 12 may have a lowest point P and a highest point Q along the short-axis direction Y of the sound production component 11. When the earphone 10 is in the wearing state, in order to prevent the pressure relief hole 113 from being obscured by an ear structure (e.g., the helix or the tragus), a distance h1 between the center of the pressure relief hole 113 and the lowest point P along the long-axis direction X of the sound production component 11 may be 5.28 mm to 7.92 mm. In some embodiments, in order to enable the earphone to fit to the user's ear when the user wears the earphone 10, a distance h2 between the center of the pressure relief hole 113 and the highest point Q along the long-axis direction X of the sound production component 11 may be 8.68 mm-13.02 mm. In some embodiments, when the user wears the earphone, a distance between the center of the pressure relief hole 113 and any point on the second portion 122 of the ear hook 12 along the long-axis direction X of the sound production component 11 is in a range of 5.28 mm to 14 mm. In some embodiments, the distance between the center of the pressure relief hole 113 and any point on the second portion 122 of the ear hook along the long-axis direction X of the sound production component 11 is in a range of 5.28 mm to 13.02 mm. In some embodiments, the distance between the center of the pressure relief hole 113 and any point on the second portion 122 of the ear hook along the long-axis direction X of the sound production component 11 is in a range of 6.58 mm to 12.02 mm. In some embodiments, the distance between the center of the pressure relief hole 113 and any point on the second portion 122 of the ear hook along the long-axis direction X of the sound production component 11 is in a range of 7.58 mm to 10.02 mm. In some embodiments, the distance between the center of the pressure relief hole 113 and any point on the second portion 122 of the ear hook along the long-axis direction X of the sound production component 11 is in a range of 8.58 mm to 9.02 mm.

As shown in FIG. 27, when the user wears the earphone 10, by setting the housing 111 of the sound production component 11 to be at least partially inserted into the concha cavity 102, a cavity enclosed by the inner side surface IS of the sound production component 11 and the concha cavity 102 together may be regarded as the cavity structure 41 as shown in FIG. 23. A gap formed between the inner side surface IS and the concha cavity (e.g., a first leaking structure UC formed between the inner side surface IS and the concha cavity close to the top of the head, and a second leaking structure LC formed between the inner side surface IS and the ear close to the ear canal) may be regarded as the leaking structure 42 as shown in FIG. 23. The sound outlet 112 provided on the inner side surface IS may be regarded as a point sound source inside the cavity structure 41 as shown in FIG. 23, and the pressure relief hole 113 provided on the other side surfaces (e.g., the upper side surface US or the lower side surface LS) of the sound production component 11 may be regarded as a point sound source outside the cavity structure 41 as shown in FIG. 23. Thus, according to the relevant depictions of FIG. 23-FIG. 26, when the earphone 10 is in the wearing state in a manner in which it is at least partially inserted into the concha cavity, i.e., when it is worn in the manner shown in FIG. 27, in terms of the listening effect, most of the sound radiated from the sound outlet 112 may reach the ear canal by the direct emission or reflection manner, which may result in a significant increase in the volume of the sound reaching the ear canal, especially the listening volume of the low and middle frequencies. At the same time, only a relatively small portion of the inversion sound radiated from the pressure relief hole 113 may enter the concha cavity through the slit (the first leaking structure UC and the second leaking structure LC), which has a weak inversion cancellation effect with the sound outlet 112, thereby making the listening volume of the ear canal significantly improved. In terms of the sound leakage effect, the sound outlet 112 may output sound to the outside world through the slit and the sound may cancel out the sound generated by the pressure relief hole 113 in the far-field, thus ensuring the sound leakage reduction effect.

In some embodiments, in order to avoid the sound waves from the pressure relief hole 113 from cancelling out in the near field with the sound waves from the sound outlet 112 and affecting the user's listening quality, a distance between the pressure relief hole 113 and the sound outlet 112 cannot be too small. In some embodiments, a distance between the center O1 of the pressure relief hole 113 and the center O of the sound outlet 112 may be in a range of 4 mm-15.11 mm. In some embodiments, the distance between the center O1 of the pressure relief hole 113 and the center O of the sound outlet 112 may be in a range of 4 mm-15 mm. In some embodiments, the distance between the center O1 of the pressure relief hole 113 and the center O of the sound outlet 112 may be in a range of 5.12 mm-15.11 mm. In some embodiments, the distance between the center O1 of the pressure relief hole 113 and the center O of the sound outlet 112 may be in a range of 5 mm-14 mm. In some embodiments, the distance between the center O1 of the pressure relief hole 113 and the center O of the sound outlet 112 may be in a range of 6 mm-13 mm. In some embodiments, the distance between the center O1 of the pressure relief hole 113 and the center O of the sound outlet 112 may be in a range of 7 mm-12 mm. In some embodiments, the distance between the center O1 of the pressure relief hole 113 and the center O of the sound outlet 112 may be in a range of 8 mm-10 mm.

Figure 29:
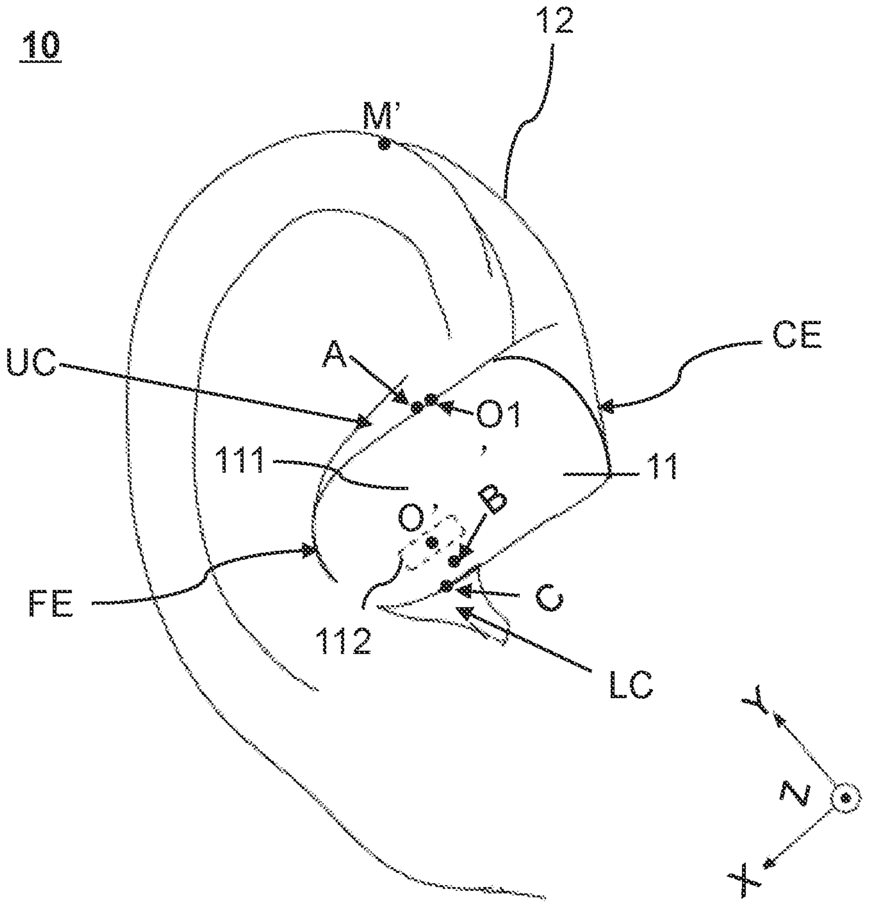
FIG. 29 is a schematic diagram illustrating a projection of an open earphone on a sagittal plane when the earphone is in a wearing state according to some embodiments of the present disclosure.

FIG. 29 is a schematic diagram illustrating a projection of an open earphone on a sagittal plane when the earphone is in a wearing state according to some embodiments of the present disclosure.

In some embodiments, referring to FIG. 27 and FIG. 29, in order to make the sound production component 11 stably worn on the user's ear, and to facilitate the construction of the cavity structure as shown in FIG. 23, and to make the cavity structure have at least two leaking structures, the free end FE may be pressed against the concha cavity in the long-axis direction X and the short-axis direction Y. At this time, the inner side surface IS of the sound production component 11 is inclined with respect to the sagittal plane, and at this time at least a first leaking structure UC close to the top of the head (i.e., a gap between the concha cavity and the upper boundary of the inner side surface IS) and a second leaking structure LC close to the ear canal (i.e., a gap between the concha cavity and the lower boundary of the inner side surface IS) exist between the inner side surface IS of the sound production component and the concha cavity. As a result, the listening volume, especially in the low and middle frequencies, can be increased, while still retaining the far-field sound leakage cancellation effect, thus enhancing the acoustic output performance of the earphone 10.

In some embodiments, when the earphone 10 is worn in the manner shown in FIG. 27, the first leaking structure UC and the second leaking structure LC formed between the inner side surface IS of the sound production component and the concha cavity have a certain scale in the long-axis direction X and in the thickness direction Z. In some embodiments, in order to facilitate understanding of the position of the first leaking structure UC and the second leaking structure LC, when the earphone 10 is in the wearing state, a midpoint of two points formed by intersecting the upper/lower boundary of the inner side surface IS with the ear (e.g., a side wall of the concha cavity, a helix foot), respectively, may be taken as a position reference point of the first leaking structure UC/the second leaking structure LC. In some embodiments, in order to facilitate understanding of the position of the first leaking structure UC and the second leaking structure LC, when the earphone 10 is in the wearing state, the midpoint of the upper boundary of the inner side surface IS may be taken as a position reference point of the first leaking structure UC, and a trisection point of the lower boundary of the inner side surface IS close to the free end FE (hereinafter referred to as a ⅓ point of the lower boundary of the inner side surface IS) as a position reference point of the second leaking structure LC.

It should be noted that when the junction between the inner side surface IS and the upper side surface US and/or the lower side surface LS is curved, a midpoint of an upper boundary of the inner side surface IS of the sound production component 11 may be selected by the following exemplary method. A projection contour of the sound production component 11 along the thickness direction Z may be determined; two first positioning points on the sound production component 11 that have the maximum vertical distance along the long-axis direction X from a short-axis center plane of the magnetic circuit assembly (e.g., the magnetic circuit assembly 1164 described below) of the transducer and are closest to the upper side surface US may be determined; a projection contour of the sound production component 11 between the two first positioning points may be determined as a projection line of the upper boundary of the inner side surface IS; a line segment on the sound production component 11 that is closest to the inner side surface IS and whose projection coincides exactly with the projection line of the upper boundary of the inner side surface IS may be determined as the upper boundary of the inner side surface IS. In some alternative embodiments, when one or more side surfaces (e.g., the inner side surface IS, the upper side surface US, and/or the lower side surface LS) of the sound production component 11 are curved, an intersection line between a tangent plane parallel to the X-Y plane (a plane formed by the long-axis direction X and the short-axis direction Y) of the inner side surface IS and a tangent plane parallel to the Z-X plane (a plane formed by the thickness direction Z and the long-axis direction X) of the upper side surface US may be determined as the upper boundary of the inner side surface IS. The midpoint of the upper boundary of the inner side surface IS may be an intersection point of the upper boundary of the inner side surface IS and the short-axis center plane of the magnetic circuit assembly. The short-axis center plane of the magnetic circuit assembly is a plane parallel to the short-axis direction Y and the thickness direction Z of the sound production component 11 and passing through a center axis of the magnetic circuit assembly.

Similarly, the ⅓ point of the lower boundary of the inner side surface IS of the sound production component 11 may be selected by the following exemplary method. A projection contour of the sound production component 11 along the thickness direction Z may be determined; two second positioning points on the sound production component 11 that have the maximum vertical distance along the long-axis direction X from the short-axis center plane of the magnetic circuit assembly and are closest to the lower side surface LS may be determined; a projection contour of the sound production component 11 between the two second positioning points may be determined as a projection line of the lower boundary of the inner side surface IS; a line segment on the sound production component 11 that is closest to the inner side surface IS and whose projection coincides exactly with the projection line of the lower boundary of the inner side surface IS may be determined as the lower boundary of the inner side surface IS. In some alternative embodiments, when one or more side surfaces (e.g., the inner side surface IS, the upper side surface US, and/or the lower side surface LS) of the sound production component 11 are curved, an intersection line between a tangent plane parallel to the Y-X plane (a plane formed by the short-axis direction Y and the long-axis direction X) of the inner side surface IS and a tangent plane parallel to the X-Z plane (a plane formed by the thickness direction Z and the long-axis direction X) of the lower side surface LS may be determined as the lower boundary of the inner side surface IS. The ⅓ point of the lower boundary of the inner side surface IS may be an intersection point of the lower boundary of the inner side surface IS with a trisection plane of the magnetic circuit assembly close to the free end FE. The trisection plane of the magnetic circuit assembly close to the free end FE is a plane parallel to the short-axis direction Y and the thickness direction Z of the sound production component 11 and passing through a trisection point of the long-axis of the magnetic circuit assembly close to the free end FE.

Merely by way of example, the present disclosure uses the midpoint of the upper boundary of the inner side surface IS and the ⅓ point of the lower boundary of the inner side surface IS as position reference points of the first leaking structure UC and the second leaking structure LC, respectively. It should be known that the selected midpoint of the upper boundary of the inner side surface IS and the ⅓ point of the lower boundary of the inner side surface IS are only used as exemplary reference points to describe the positions of the first leaking structure UC and the second leaking structure LC. In some embodiments, other reference points may also be selected to describe the positions of the first leaking structure UC and the second leaking structure LC. For example, due to the variability of different users' ears, the first leaking structure UC/the second leaking structure LC formed when the earphone 10 is worn is a gap with a gradually changing width, in this case, the reference position of the first leaking structure UC/the second leaking structure LC may be a position on the upper boundary/the lower boundary of the inner side surface IS near a region with the largest gap width. For example, the ⅓ point of the upper boundary of the inner side surface IS near the free end FE may be used as the position of the first leaking structure UC, and the midpoint of the lower boundary of the inner side surface IS may be used as the position of the second leaking structure LC.

In some embodiments, referring to FIG. 27-FIG. 29, in order to enable the projection of the sound outlet 112 on the sagittal plane when the earphone 10 is in the wearing state to be partially or fully located in the concha cavity region and enhance the sound intensity of the sound outlet 112 in the ear canal (i.e., the listening position), the sound outlet 112 may be set as close to the ear canal as possible. In some embodiments, a distance h from the center O of the sound outlet 112 to the lower side surface LS of the sound production component 11 along the Y-direction is in a range of 4.05 mm to 6.05 mm. In some embodiments, the distance h from the center O of the sound outlet 112 to the lower side surface LS of the sound production component 11 along the Y-direction is in a range of 4.50 mm to 5.85 mm. In some embodiments, the distance h from the center O of the sound outlet 112 to the lower side surface LS of the sound production component 11 along the Y-direction is in a range of 4.80 mm to 5.50 mm. In some embodiments, the distance h from the center O of the sound outlet 112 to the lower side surface LS of the sound production component 11 along the Y-direction is in a range of 5.20 mm to 5.55 mm.

In some embodiments, in order to ensure that the sound production component 11 is at least partially inserted into the concha cavity, the long-axis dimension of the sound production component 11 should not be too long. In order to ensure that the sound production component 11 is at least partially inserted into the concha cavity, a distance from the center O of the sound outlet 112 to the rear side surface RS of the sound production component 11 along the X-direction should not be too small, otherwise it may result in all or part of the area of the sound outlet being obscured due to the abutment of the free end FE against the wall surface of the concha cavity, making the effective area of the sound outlet reduced. Therefore, in some embodiments, a distance from the center O of the sound outlet 112 to the rear side surface RS of the sound production component 11 along the X-direction is in a range of 8.15 mm to 12.25 mm. In some embodiments, the distance from the center O of the sound outlet 112 to the rear side surface RS of the sound production component 11 along the X-direction is in a range of 8.50 mm to 12.00 mm. In some embodiments, the distance from the center O of the sound outlet 112 to the rear side surface RS of the sound production component 11 along the X-direction is in a range of 8.85 mm to 11.65 mm. In some embodiments, the distance from the center O of the sound outlet 112 to the rear side surface RS of the sound production component 11 along the X-direction is in a range of 9.25 mm to 11.15 mm. In some embodiments, the distance from the center O of the sound outlet 112 to the rear side surface RS of the sound production component 11 along the X-direction is in a range of 9.60 mm to 10.80 mm.

In some embodiments, as shown in FIG. 29, the projection of the upper boundary of the inner side surface IS on the sagittal plane may coincide with the projection of the upper side surface US on the sagittal plane, and the projection of the lower boundary of the inner side surface IS on the sagittal plane may coincide with the projection of the lower side surface LS on the sagittal plane. The projection of the position reference point of the first leaking structure UC (i.e., the midpoint of the upper boundary of the inner side surface IS) on the sagittal plane is point A. The projection of the position reference point of the second leaking structure LC (i.e., the ⅓ point of the lower boundary of the inner side surface IS) on the sagittal plane is point C. The projection of the center O of the sound outlet 112 on the sagittal plane is a point O', and the projection of the center O1 of the pressure relief hole 113 on the sagittal plane is a point O1'.

As shown in FIG. 29, in some embodiments, in some embodiments, in the wearing state, the projection of the sound production component 11 of the earphone 10 on the sagittal plane may at least partially cover the ear canal of the user, but the ear canal can communicate with the outside world through the concha cavity to achieve the liberation of both ears of the user. In some embodiments, since the sound outlet 112 outputs sound to the outside world through the first leak structure UC and the second leak structure LC to cancel the sound output from the pressure relief hole 113 out in the far field, and in order to ensure the sound leakage cancellation effect, distances from the sound outlet 112 and pressure relief hole 113 to the first leak structure UC and the second leak structure LC needs to be reasonably designed. In some embodiments, in order to ensure the sound intensity at the ear canal, it is necessary to make the sound outlet 112 closer to the ear canal when the earphone is in the wearing state. Therefore, the sound outlet 112 may be set closer to the lower side surface LS than the upper side surface US, i.e., the sound outlet 112 may be set away from the first leak structure UC. Considering also that the larger the distance between the sound outlet 112 and the first leak structure UC is, the larger the width dimension needed for the sound production component 11 may be. At this time, the larger the volume V of the cavity structure formed between the sound production component 11 and the concha cavity is, accordingly, the smaller the whole listening index (in the full frequency band range) of the earphone 10 may be. This is because due to the influence of the aero-acoustic resonance within the cavity structure, at the resonance frequency of the cavity structure, the cavity structure produces the aero-acoustic resonance and radiates sound whose volume is far greater than the sound of the pressure relief hole, resulting in a significant increase in sound leakage, which in turn makes the listening index significantly smaller around this resonance frequency.

Thus, in some embodiments, under the premise that the sound production component 11 is at least partially inserted into the concha cavity, in order to enable the sound outlet 112 to be set close to the ear canal, and to make the cavity structure have a suitable volume V, so that the sound collection effect in the ear canal is relatively good, the distance between the projection point O' of the center O of the sound outlet 112 on the sagittal plane and the projection point A of the midpoint of the upper boundary of the inner side surface IS on the sagittal plane is in a range of 10.0 mm to 15.2 mm. In some embodiments, the distance between the projection point O' of the center O of the sound outlet 112 on the sagittal plane and the projection point A of the midpoint of the upper boundary of the inner side surface IS on the sagittal plane is in a range of 11.0 mm to 14.2 mm. In some embodiments, the distance between the projection point O' of the center O of the sound outlet 112 on the sagittal plane and the projection point A of the midpoint of the upper boundary of the inner side surface IS on the sagittal plane is in a range of 12.0 mm to 14.7 mm. In some embodiments, the distance between the projection point O' of the center O of the sound outlet 112 on the sagittal plane and the projection point A of the midpoint of the upper boundary of the inner side surface IS on the sagittal plane is in a range of 12.5 mm to 14.2 mm. In some embodiments, the distance between the projection point O' of the center O of the sound outlet 112 on the sagittal plane and the projection point A of the midpoint of the upper boundary of the inner side surface IS on the sagittal plane is in a range of 13.0 mm to 13.7 mm.

In some embodiments, the leakage sound from the sound outlet 112 via the first leak structure UC is equivalent to generating a secondary sound source at the first leak structure UC. In order to ensure the cancellation effect between the sound output from the pressure relief hole 113 and the leakage sound from the sound outlet 112 via the first leak structure UC in the far field, the pressure relief hole 113 may be provided close to the first leak structure UC. In some embodiments, the pressure relief hole 113 may be set closer to the first leak structure UC compared to the sound outlet 112, which means that the distance between the center O of the sound outlet 112 and the midpoint of the upper boundary of the inner side surface IS is greater than the distance between the center O1 of the pressure relief hole 113 and the midpoint of the upper boundary of the inner side surface IS, so as to achieve better sound leakage cancellation while ensuring the sound intensity at the ear canal. In some embodiments, a ratio of a distance between the center O of the sound outlet 112 and the midpoint of the upper boundary of the inner side surface IS to a distance between the center O1 of the pressure relief hole 113 and the midpoint of the upper boundary of the inner side surface IS is in a range of 1.3 to 2.1. In some embodiments, the ratio of the distance between the center O of the sound outlet 112 and the midpoint of the upper boundary of the inner side surface IS to the distance between the center O1 of the pressure relief hole 113 and the midpoint of the upper boundary of the inner side surface IS is in a range of 1.4 to 2.0. In some embodiments, the ratio of the distance between the center O of the sound outlet 112 and the midpoint of the upper boundary of the inner side surface IS to the distance between the center O1 of the pressure relief hole 113 and the midpoint of the upper boundary of the inner side surface IS is in a range of 1.5-1.9. In some embodiments, the ratio of the distance between the center O of the sound outlet 112 and the midpoint of the upper boundary of the inner side surface IS to the distance between the center O1 of the pressure relief hole 113 and the midpoint of the upper boundary of the inner side surface IS is in a range of 1.6-1.8.

In some embodiments, a projection point O1' of the center O1 of the pressure relief hole 113 on the sagittal plane and the projection point A of the midpoint of the upper boundary of the inner side surface IS on the sagittal plane may substantially coincide. In some embodiments, a distance between the projection point O1' of the center O1 of the pressure relief hole 113 on the sagittal plane and the projection point A of the midpoint of the upper boundary of the inner side surface IS on the sagittal plane is not greater than 2 mm. In some embodiments, the distance between the projection point O1' of the center O1 of the pressure relief hole 113 on the sagittal plane and the projection point A of the midpoint of the upper boundary of the inner side surface IS on the sagittal plane is not greater than 1 mm. In some embodiments, the distance between the projection point O1' of the center O1 of the pressure relief hole 113 on the sagittal plane and the projection point A of the midpoint of the upper boundary of the inner side surface IS on the sagittal plane is not greater than 0.5 mm.

In some embodiments, the greater a distance between the projection point O' of the center O of the sound outlet 112 on the sagittal plane and a projection point C of the ⅓ point of the lower boundary of the inner side surface IS on the sagittal plane is, the larger the volume V of the cavity structure is. Therefore, under the premise that the sound production component 11 is at least partially inserted into the concha cavity, in order to enable the sound outlet 112 to be set close to the ear canal, and to make the cavity structure have a suitable volume V, so that the sound collection effect in the ear canal is relatively good, in some embodiments, the distance between the projection point O' of the center O of the sound outlet 112 on the sagittal plane and the projection point C of the ⅓ point of the lower boundary of the inner side surface IS on the sagittal plane is in a range of 3.5 mm to 5.6 mm. In some embodiments, the distance between the projection point O' of the center O of the sound outlet 112 on the sagittal plane and the projection point C of the ⅓ point of the lower boundary of the inner side surface IS on the sagittal plane is in a range of 3.9 mm to 5.2 mm. In some embodiments, the distance between the projection point O' of the center O of the sound outlet 112 on the sagittal plane and the projection point C of the ⅓ point of the lower boundary of the inner side surface IS on the sagittal plane is in a range of 4.3 mm to 4.8 mm. In some embodiments, the distance between the projection point O' of the center O of the sound outlet 112 on the sagittal plane and the projection point C of the ⅓ point of the lower boundary of the inner side surface IS on the sagittal plane is in a range of 4.5 mm to 4.6 mm.

In some embodiments, due to the presence of the tragus near the ear canal opening, the sound outlet 112 is easily obscured by the tragus. In this case, in order to keep the sound outlet 112 as close to the ear canal as possible and unobstructed, the sound outlet 112 should be as far as possible from the center of the ear canal opening. In some embodiments, for purposes of description, a position relationship between a particular position (e.g., the center O of the sound outlet 112) and the center of the ear canal opening may be characterized by a distance between a projection point of that position (e.g., the center O of the sound outlet 112) on the sagittal plane and a centroid of the projection of the ear canal opening on the sagittal plane. For example, in some embodiments, a distance between the projection point O' of the center of the sound outlet 112 on the sagittal plane and the centroid B of the projection of the ear canal opening on the sagittal plane is in a range of 2.2 mm to 3.8 mm. In some embodiments, the distance between the projection point O' of the center of the sound outlet 112 on the sagittal plane and the centroid B of the projection of the ear canal opening on the sagittal plane is in a range of 2.4 mm to 3.6 mm. In some embodiments, the distance between the projection point O' of the center of the sound outlet 112 on the sagittal plane and the centroid B of the projection of the ear canal opening on the sagittal plane is in a range of 2.6 mm to 3.4 mm. In some embodiments, the distance between the projection point O' of the center of the sound outlet 112 on the sagittal plane and the centroid B of the projection of the ear canal opening on the sagittal plane is in a range of 2.8 mm to 3.2 mm. It should be noted that the shape of the projection of the ear canal opening on the sagittal plane may be approximated as an ellipse, and correspondingly, the centroid of the projection of the ear canal opening on the sagittal plane may be a geometric center of the ellipse.

In some embodiments, in order to ensure that the sound production component 11 extends into the concha cavity and that a suitable gap (forming the opening of the cavity structure) exists between the upper boundary of the inner side surface IS and the concha cavity, a distance between the projection point A of the midpoint of the upper boundary of the inner side surface IS on the sagittal plane and the centroid B of the projection of the ear canal opening on the sagittal plane is in a range of 12 mm to 18 mm. In some embodiments, the distance between the projection point A of the midpoint of the upper boundary of the inner side surface IS on the sagittal plane and the centroid B of the projection of the ear canal opening on the sagittal plane is in a range of 14 mm to 16 mm. In some embodiments, the distance between the projection point A of the midpoint of the upper boundary of the inner side surface IS on the sagittal plane and the centroid B of the projection of the ear canal opening on the sagittal plane is in a range of 14.5 mm to 15.5 mm.

In some embodiments, in order to ensure that the sound production component 11 extends into the concha cavity and that a suitable gap (forming the opening of the cavity structure) exists between the upper boundary of the inner side surface IS and the concha cavity, a distance between the projection point O1' of the center O1 of the pressure relief hole 113 on the sagittal plane and the centroid B of the projection of the ear canal opening on the sagittal plane is in a range of 12 mm to 18 mm. In some embodiments, the distance between the projection point O1' of the center O1 of the pressure relief hole 113 on the sagittal plane and the centroid B of the projection of the ear canal opening on the sagittal plane is in a range of 14 mm to 16 mm. In some embodiments, the distance between the projection point O1' of the center O1 of the pressure relief hole 113 on the sagittal plane and the centroid B of the projection of the ear canal opening on the sagittal plane is in a range of 14.5 mm to 15.5 mm.

In some embodiments, in order to ensure that the sound production component 11 extends into the concha cavity and that a suitable gap (forming the opening of the cavity structure) exists between the upper boundary of the inner side surface IS and the concha cavity, a distance between the projection point C of the ⅓ point of the lower boundary of the inner side surface on the sagittal plane and the centroid B of the projection of the ear canal opening on the sagittal plane is in a range of 1.76 mm to 2.64 mm. In some embodiments, the distance between the projection point C of the ⅓ point of the lower boundary of the inner side surface on the sagittal plane and the centroid B of the projection of the ear canal opening on the sagittal plane is in a range of 1.96 mm to 2.44 mm. In some embodiments, the distance between the projection point C of the ⅓ point of the lower boundary of the inner side surface on the sagittal plane and the centroid B of the projection of the ear canal opening on the sagittal plane is in a range of 2.16 mm to 2.24 mm.

In some embodiments, in order to ensure that the sound production component 11 can extend into the concha cavity and that the pressure relief hole 113 is not to be obscured by the ear structure, and to ensure that the sound outlet 112 is as close as possible to the ear canal and not obscured, a ratio of a distance between the center O of the sound outlet 112 and the center of the ear canal opening to the distance between the center O1 of the pressure relief hole 113 and the center of the ear canal opening may be within a suitable range. Accordingly, a ratio of the distance between the projection point O' of the center O of the sound outlet 112 on the sagittal plane and the centroid B of the projection of the ear canal opening on the sagittal plane to the distance between the projection point O1' of the center O1 of the pressure relief hole 113 on the sagittal plane and the centroid B of the projection of the ear canal opening on the sagittal plane may be within a suitable range. In some embodiments, the ratio of the distance between the projection point O' of the center O of the sound outlet 112 on the sagittal plane and the centroid B of the projection of the ear canal opening on the sagittal plane to the distance between the projection point O1' of the center O1 of the pressure relief hole 113 on the sagittal plane and the centroid B of the projection of the ear canal opening on the sagittal plane may be in a range of 0.10 to 0.35. In some embodiments, the ratio of the distance between the projection point O' of the center O of the sound outlet 112 on the sagittal plane and the centroid B of the projection of the ear canal opening on the sagittal plane to the distance between the projection point O1' of the center O1 of the pressure relief hole 113 on the sagittal plane and the centroid B of the projection of the ear canal opening on the sagittal plane may be in a range of 0.15 to 0.28. In some embodiments, the ratio of the distance between the projection point O' of the center O of the sound outlet 112 on the sagittal plane and the centroid B of the projection of the ear canal opening on the sagittal plane to the distance between the projection point O1' of the center O1 of the pressure relief hole 113 on the sagittal plane and the centroid B of the projection of the ear canal opening on the sagittal plane may be in a range of 0.18 to 0.25. In some embodiments, the ratio of the distance between the projection point O' of the center O of the sound outlet 112 on the sagittal plane and the centroid B of the projection of the ear canal opening on the sagittal plane to the distance between the projection point O1' of the center O1 of the pressure relief hole 113 on the sagittal plane and the centroid B of the projection of the ear canal opening on the sagittal plane may be in a range of 0.19 to 0.22.

Referring to FIG. 27-FIG. 29, in some embodiments, under the premise that the sound production component 11 is at least partially inserted into the concha cavity, in order to enable the projection of the sound outlet 112 on the sagittal plane can be partially or fully located within the concha cavity region, when the user wears the earphone 10, a distance between the center O of the sound outlet 112 and an upper vertex M of the ear hook 12 is in a range of 22.5 mm to 34.5 mm. In some embodiments, the upper vertex of the ear hook 12 may be a position on an outer contour of the ear hook having a maximum distance in the vertical axis relative to a specific point at the user's neck when the user wears the open earphone, such as, the vertex M shown in FIG. 27. In some embodiments, the upper vertex of the ear hook 12 may also be a highest point of an inner contour of the ear hook along the user's vertical axis in the wearing state. In some embodiments, when the user wears the earphone 10, the distance between the center O of the sound outlet 112 and the upper vertex M of the ear hook 12 is in a range of 25 mm to 32 mm. In some embodiments, when the user wears the earphone 10, the distance between the center O of the sound outlet 112 and the upper vertex M of the ear hook 12 is in a range of 27.5 mm to 29.5 mm. In some embodiments, when the user wears the earphone 10, the distance between the center O of the sound outlet 112 and the upper vertex M of the ear hook 12 is in a range of 28 mm to 29 mm. In some embodiments, when the user wears the earphone 10, a distance between the projection point O' of the center O of the sound outlet 112 on the sagittal plane and a projection point M' of the upper vertex M of the ear hook 12 on the sagittal plane is in a range of 18 mm to 30 mm. In some embodiments, when the user wears the earphone 10, the distance between the projection point O' of the center O of the sound outlet 112 on the sagittal plane and the projection point M' of the upper vertex M of the ear hook 12 on the sagittal plane is in a range of 20 mm to 25 mm. It should be noted that in the present disclosure, in the wearing state, a distance between the projection point O' of the center O of the sound outlet 112 on the sagittal plane and a specific point (e.g., the projection point M' of the upper vertex M of the ear hook 12 on the sagittal plane) may be determined by the following exemplary method. In the wearing state, multiple components of the earphone 10 (e.g., the sound production component 11, the first portion 121 of the ear hook, and the second portion 122 of the ear hook) may be fixed to a stabilizing member using a fixing member or glue, and then the human head model and the ear structure can be removed. At this point, the earphone 10 stabilized on the stabilizing member is displayed facing the ear side, and its posture is the same as the posture in the wearing state. At this time, the position of the projection point O' of the center O of the sound outlet 112 on the sagittal plane may be determined. Further, the distance between the projection point O' of the center O of the sound outlet 112 on the sagittal plane and that specific point may be determined.

In some embodiments, in order to prevent the pressure relief hole 113 from being obscured when the sound production component 11 extends into the concha cavity, a distance between the center O1 of the pressure relief hole 113 and the upper vertex M of the ear hook 12 should not be too small. In addition, the distance between the center O1 of the pressure relief hole 113 and the upper vertex M of the ear hook 12 should not be too large in the case where the sound production component 11 can at least partially extend into the concha cavity. In some embodiments, the distance between the center O1 of the pressure relief hole 113 and the upper vertex M of the ear hook 12 is in a range of 16.15 mm to 24.25 mm. In some embodiments, the distance between the center O1 of the pressure relief hole 113 and the upper vertex M of the ear hook 12 is in a range of 17.55 mm to 23.25 mm. In some embodiments, the distance between the center O1 of the pressure relief hole 113 and the upper vertex M of the ear hook 12 is in a range of 19.55 mm to 20.55 mm. In some embodiments, a position relationship between the center O1 of the pressure relief hole 113 and the upper vertex M of the ear hook 12 may also be characterized by a distance between the projection point O1' of the center O1 of the pressure relief hole 113 on the sagittal plane and the projection point M' of the upper vertex M of the ear hook 12 on the sagittal plane. For example, in some embodiments, the distance between the projection point O1' of the center O1 of the pressure relief hole 113 on the sagittal plane and the projection point M' of the upper vertex M of the ear hook 12 on the sagittal plane is in a range of 15.83 mm to 23.75 mm. In some embodiments, the distance between the projection point O1' of the center O1 of the pressure relief hole 113 on the sagittal plane and the projection point M' of the upper vertex M of the ear hook 12 on the sagittal plane is in a range of 18 mm-20 mm.

In some embodiments, in the wearing manner as in FIG. 27, a ratio of the distance between the center O of the sound outlet 112 and the upper vertex M of the ear hook 12 to the distance between the center O1 of the pressure relief hole 113 and the upper vertex M of the ear hook 12 is in a range of 1.10 to 1.70. In some embodiments, when the user wears the earphone 10, the ratio of the distance between the center O of the sound outlet 112 and the upper vertex M of the ear hook 12 to the distance between the center O1 of the pressure relief hole 113 and the upper vertex M of the ear hook 12 is in a range of 1.25-1.65. Preferably, the ratio of the distance between the center O of the sound outlet 112 and the upper vertex M of the ear hook 12 to the distance between the center O1 of the pressure relief hole 113 and the upper vertex M of the ear hook 12 is in a range of 1.35-1.55. In some embodiments, a position relationship among the center O of the sound outlet 112, the upper vertex M of the ear hook 12, and the center O1 of the pressure relief hole 113 may also be characterized by a ratio of a distance between the projection point O' of the center O of the sound outlet 112 on the sagittal plane and the projection point M' of the upper vertex M of the ear hook 12 on the sagittal plane to a distance between the center O1 of the pressure relief hole 113 and the upper vertex M of the ear hook 12. For example, in some embodiments, under the wearing manner shown in FIG. 27, the ratio of the distance between the projection point O' of the center O of the sound outlet 112 on the sagittal plane and the projection point M' of the upper vertex M of the ear hook 12 on the sagittal plane to the distance between the center O1 of the pressure relief hole 113 and the upper vertex M of the ear hook 12 is in a range of 1.11-1.71. In some embodiments, the ratio of the distance between the projection point O' of the center O of the sound outlet 112 on the sagittal plane and the projection point M' of the upper vertex M of the ear hook 12 on the sagittal plane to the distance between the center O1 of the pressure relief hole 113 and the upper vertex M of the ear hook 12 is in a range of 1.35-1.50.

The description of the earphone 10 described above is merely for the purpose of illustration, and is not intended to limit the scope of the present disclosure. For those skilled in the art, various variations and modifications can be made according to the description of the present disclosure. These variations and modifications remain within the scope of protection of the present disclosure.

Figure 30:
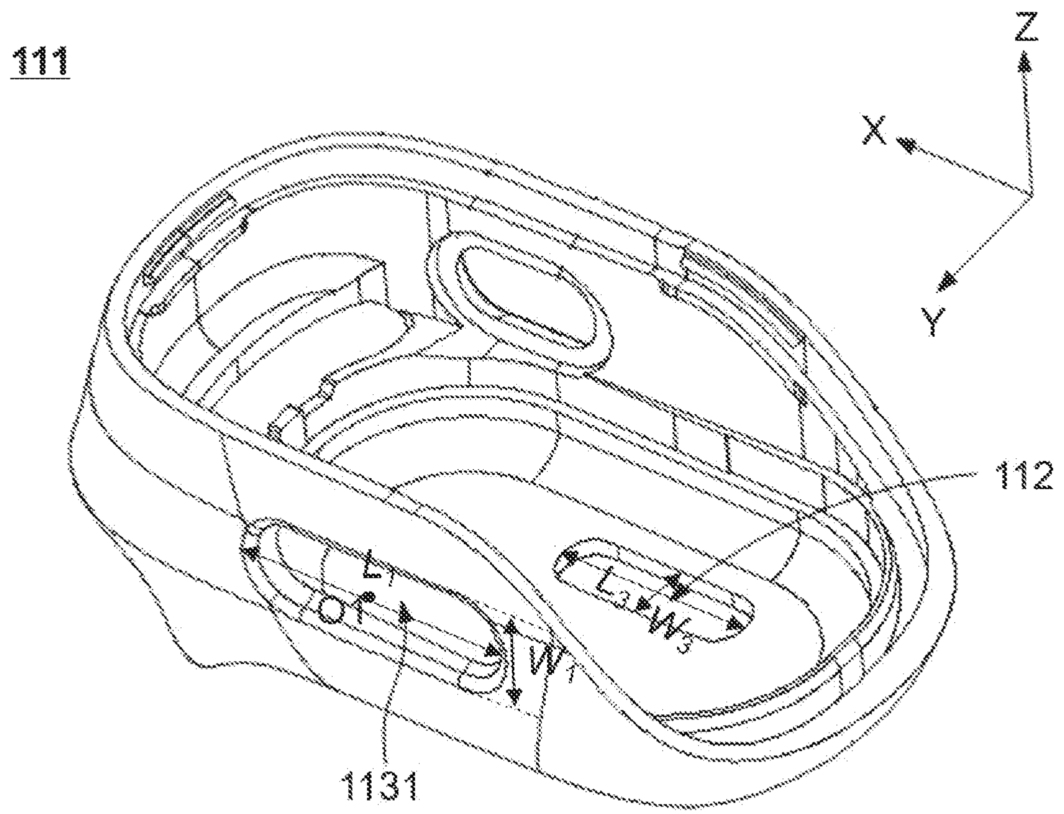
FIG. 30 is a schematic diagram illustrating a structure of a housing for an open earphone according to some embodiments of the present disclosure.

FIG. 30 is a schematic diagram illustrating a structure of a housing for an open earphone according to some embodiments of the present disclosure.

In some embodiments, as shown in FIG. 30, the sound outlet 112 and the pressure relief hole(s) 113 may be of a runway shape, and two ends of the runway shape may be inferiorly curved or semi-circular. In some embodiments, the sound outlet 112 and the pressure relief hole 113 are in a straight cylindrical structure. In some embodiments, in order to facilitate processing and manufacturing and reduce the process difficulty, the sound outlet 112 and the pressure relief hole 113 may all be of a flared structure. For example, the area of the inner opening is smaller than the area of the corresponding outer opening, or the area of the outer opening is smaller than the area of the corresponding inner opening. It should be noted that the shapes of the sound outlet 112 and the pressure relief hole 113 may include, but are not limited to, circular, oval, runway-shaped, etc. For ease of description, the following is an exemplary illustration of a straight cylinder structure in which the sound outlet 112 and the pressure relief hole 113 are set in the runway shape. In this case, a maximum dimension of the sound outlet 112 in the width direction Y is defined as its corresponding short-axis dimension (width), and a maximum dimension of the pressure relief hole 113 in the thickness direction Z is defined as its corresponding short-axis dimension (width); the maximum dimensions of the sound outlet 112 and the pressure relief hole 113 in the long-axis direction X are defined as their corresponding long-axis dimensions (length); a dimension of the sound outlet 112 in the thickness direction Z is defined as its corresponding depth, and a dimension of the pressure relief hole 113 in the width direction Y are defined as its corresponding depths.

In some embodiments, as the area $S_3$ of the outer opening (hereinafter referred to as the area) of the sound outlet 112 increases or the depth $D_3$ of the sound outlet 112 decreases, the resonance frequency $f_1$ of the front cavity of the earphone is shifted to high frequency. During the vibration of the diaphragm, the air in the front cavity is compressed or expanded with the vibration of the diaphragm, and the compressed or expanded air may drive an air column at the sound outlet to move back and forth, which in turn causes the air column to radiate sound outward. In some embodiments, the air column within the sound outlet 112 has a mass, which may correspond to a sound mass of the sound outlet 112. The acoustic mass may be used as a portion of the acoustic impedance, thereby affecting the acoustic output of the sound production component 11. Thus, the dimension of the sound outlet 112 may also have an effect on the sound mass $M_a$ of the sound outlet 112, specifically, the area $S_3$ of the sound outlet 112 increases or the depth $D_3$ decreases of the sound outlet 112, the sound mass $M_a$ of the sound outlet 112 decreases.

In some embodiments, in order to increase the resonance frequency $f_1$ of the front cavity while ensuring the sound mass $M_a$ of the sound outlet 112, the area $S_3$ of the sound outlet 112 needs to have a suitable value range. In addition, if the area $S_3$ of the sound outlet 112 is too large, other aspects such as the appearance and structural strength of the earphone 10 may be affected at a certain extent. Thus, in some embodiments, the area $S_3$ of the sound outlet 112 may be in a range of 2.87 mm 2 to 46.10 $mm^2$. In some embodiments, the area $S_3$ of the sound outlet 112 may be in a range of 2.875 mm 2 to 46 $mm^2$. In some embodiments, the area $S_3$ of the sound outlet 112 may be in a range of 8 mm 2 to 30 $mm^2$. In some embodiments, the area $S_3$ of the sound outlet 112 may be in a range of 10 mm 2 to 26 $mm^2$. Merely by way of example, the area $S_3$ of the sound outlet 112 may be in a range of 11 $mm^2$–15 $mm^2$ (e.g., 11.49 $mm^2$). As another example, the area $S_3$ of the sound outlet 112 may be in a range of 25 $mm^2$–26 $mm^2$ (e.g., 25.29 $mm^2$).

In order to ensure that the front cavity has a sufficiently large resonance frequency, the smaller the depth $D_3$ of the sound outlet 112, the better. However, since the sound outlet 112 is set on the housing 111, the depth $D_3$ of the sound outlet 112 is the same as the thickness of the housing 111. If the thickness of the housing 111 is too small, the structural strength of the earphone 10 may be affected, and the corresponding processing process is more difficult. In some embodiments, the depth $D_3$ of the sound outlet 112 may be in a range of 0.3 mm to 3 mm. In some embodiments, the depth $D_3$ of the sound outlet 112 may be in a range of 0.3 mm-2 mm. In some embodiments, the depth $D_3$ of the sound outlet 112 may be in a range of 0.3 mm-1 mm.

In some embodiments, the area of the sound outlet 112 has a value range of 2.875 $mm^2$-46 $mm^2$, the depth $D_3$ of the sound outlet 112 may have a value range of 0.3 mm-3 mm, and a ratio $S_3/D_3^2$ of the area $S_3$ of the corresponding sound outlet 112 to the square of the depth $D_3$ may have a value range of 0.31-512.2. In some embodiments, the ratio $S_3/D_3^2$ of the area $S_3$ of the sound outlet 112 to the square of the depth $D_3$ may have a value range of 1-400. In some embodiments, the ratio $S_3/D_3^2$ of the area $S_3$ of the sound outlet 112 to the square of the depth $D_3$ may have a value range of 3-300. In some embodiments, the ratio $S_3/D_3^2$ of the area $S_3$ of the sound outlet 112 to the square of the depth $D_3$ may have a value range of 5-200. In some embodiments, the ratio $S_3/D_3^2$ of the area $S_3$ of the sound outlet 112 to the square of the depth $D_3$ may have a value range of 10-50.

In some embodiments, when other structures (e.g., the sound outlet 112, etc.) are fixed, as the area of the pressure relief hole 113 gradually increases, the resonance frequency corresponding to the rear cavity of the earphone 10 gradually shifts toward high frequency and a flat region of the frequency response curve becomes wider. In addition, in practical applications, if the area of the pressure relief hole 113 is too large, it may have a certain impact on the appearance, structural strength, waterproof and dustproof of the earphone 10, etc. Therefore, the area Si of the pressure relief hole 113 should also not be too large. In some embodiments, the area of the pressure relief hole 113 is in a range of 3.78 mm 2-86.21 mm$^2$. In some embodiments, the area of the pressure relief hole 113 is in a range of 3.78 mm 2-22.07 mm$^2$. In some embodiments, the area of the pressure relief hole 113 is in a range of 6.78 mm 2-20.07 mm$^2$.

In some embodiments, since the pressure relief hole 113 and the sound outlet 112 are provided on the housing 111, the depth $D_1$ of the pressure relief hole 113 may be the same as the depth $D_3$ of the sound outlet 112 for ease of processing and design. In some embodiments, the depth $D_1$ of the pressure relief hole 113 may be in a range of 0.3 mm to 3 mm. In some embodiments, the depth $D_1$ of the pressure relief hole 113 may be in a range of 0.3 mm to 2 mm. In some embodiments, the depth $D_1$ of the pressure relief hole 113 may be in a range of 0.3 mm to 1 mm.

In some embodiments, in order to ensure that the second leakage sound formed by the pressure relief hole 113 can better cancel each other out with the first leakage sound formed by the sound outlet 112 in the far field, the resonance frequency $f_2$ of the rear cavity can be close to or equal to the resonance frequency $f_1$ of the front cavity 114. According to equation (15), a ratio $$\frac{f_1}{f_2}$$

of the resonance frequency $f_1$ of the front cavity 114 to the resonance frequency $f_2$ of the rear cavity is:

$$\frac{f_1}{f_2}=\frac{\frac{c}{2\pi}\sqrt{\frac{S_1}{V_1L_1}}}{\frac{c}{2\pi}\sqrt{\frac{S_2}{V_2L_2}}}=\sqrt{\frac{S_1}{V_1L_1}\cdot\frac{V_2L_2}{S_2}}=\sqrt{\frac{S_1}{S_2}\cdot\frac{V_2}{V_1}\cdot\frac{L_2}{L_1}}. \tag{15}$$

According to equation (15), the ratio of the resonance frequency $f_1$ of the front cavity 114 and the resonance frequency $f_2$ of the rear cavity may be related to a ratio of the volumes of the front and rear cavities, a ratio of an opening area of the sound outlet 112 to an opening area of the pressure relief hole 113, and a ratio of a depth of the sound outlet 112 to a depth of the pressure relief hole 113. The other parameters (e.g., the ratio of the opening area of the sound outlet 112 to the opening area of the pressure relief hole 113) may be set based on some of these parameters (e.g., the ratio of the volumes of the front and rear cavities) such that the second leakage sound formed by the pressure relief hole 113 can better cancel each other out with the first leakage sound formed by the sound outlet 112 in the far field, thereby improving the output of the earphone 10.

In some embodiments, in order to make a ratio of the resonance frequencies of the front cavity and the rear cavity in a range of 0.5-1.5, a ratio between a ratio of the area $S_3$ to the depth $D_3$ of the sound outlet 112 and a ratio of a total area of the pressure relief hole 113 to its corresponding depth is in a range of 1.10-1.75. In some embodiments, in order to make the ratio of the resonance frequencies of the front cavity and the rear cavity in a range of 0.7-1.3, the ratio between the ratio of the area $S_3$ to the depth $D_3$ of the sound outlet 112 and the ratio of the total area of the pressure relief hole 113 to its corresponding depth is in a range of 1.25-1.65. In some embodiments, in order to make the ratio of the resonance frequencies of the front cavity and the rear cavity in a range of 0.8-1.2, the ratio between the ratio of the area $S_3$ to the depth $D_3$ of the sound outlet 112 and the ratio of the total area of the pressure relief hole 113 to its corresponding depth is in a range of 1.35-1.55. As used herein, when the pressure relief hole 113 includes one pressure relief hole, the total area of the pressure relief hole 113 refers to an area of the one pressure relief hole, and when the pressure relief hole 113 includes two or more pressure relief holes, the total area of the pressure relief hole 113 refers to a sum of areas of the two or more pressure relief holes.

In some embodiments, the shape of the sound outlet 112 may also have an effect on the acoustic resistance of the sound outlet 112. For example, the narrower the sound outlet 112 is, the higher the acoustic resistance of the sound outlet 112 is, which is not conducive to the acoustic output of the front cavity. Therefore, in order to ensure that the sound outlet 112 produces better low frequency output, and also to improve the sound volume output from the sound outlet 112, a ratio of the long-axis dimension $L_3$ and the short-axis dimension $W_3$ of the sound outlet 112 (or called an aspect ratio of the sound outlet 112) needs to be within a preset appropriate value range. In some embodiments, when the area of the sound outlet 112 is constant, in order to ensure that the frequency response curve of the front cavity is stronger at low frequency, the aspect ratio of the sound outlet 112 may be in a range of 1-10. In some embodiments, the aspect ratio of the sound outlet 112 may be in a range of 2-7. In some embodiments, the aspect ratio of the sound outlet 112 may be in a range of 2-3. In some embodiments, the aspect ratio of the sound outlet 112 may be 2. In some embodiments, in order to make the resonance frequency of the resonance peak of the front cavity as high as possible, the length $L_3$ of the sound outlet 112 may have a relatively large value, but at the same time, in order not to reduce the high frequency output corresponding to the resonance peak of the front cavity and considering the structural stability of the sound production component 11, the length $L_3$ of the sound outlet 112 may not be greater than 17 mm, and the width $W_3$ of the sound outlet 112 may not be greater than 10 mm. In some embodiments, the length $L_3$ of the sound outlet 112 may be in a range of 2 mm-11 mm. In some embodiments, the length $L_3$ of the sound outlet 112 may be in a range of 3 mm-11 mm. In some embodiments, the length $L_3$ of the sound outlet 112 may be in a range of 3 mm-16 mm. In some embodiments, the length $L_3$ of the sound outlet 112 may be in a range of 5 mm-13 mm. In some embodiments, the length $L_3$ of the sound outlet 112 may be in a range of 6 mm-9 mm.

In some embodiments, the width $W_3$ of the sound outlet 112 may be determined based on the length $L_3$ and the aspect ratio. For example, the aspect ratio of the sound outlet 112 may be 2, and the width $W_3$ of the sound outlet 112 may be in a range of 1.5 mm-5.5 mm. The area of the corresponding runway-shaped sound outlet 112 may be in a range of 4.02 mm$^2$-54 mm$^2$. By setting the range of the length $L_3$ of the sound outlet 112, it is possible to increase the range of the flat region of the frequency response curve and thus improve the sound quality of the earphone 10 while taking into account the structural design of the sound production component 11. Merely by way of example, the area of the runway-shaped sound outlet 112 is about 11.5 $mm^2$, and accordingly the length $L_3$ of the sound outlet 112 may be determined to be 5 mm-6 mm, and the width $W_3$ of the sound outlet 112 may be 2.5 mm-3 mm. In the above dimensional range, it can make the earphone 10 in a wide frequency range with a flat frequency response curve and sufficient high frequency output; in addition, the area is taken as relatively small, which is also conducive to the stability of the structure.

In some embodiments, in the case of ensuring that the sound production efficiency of the sound production component 11 is sufficiently high and that it can be at least partially inserted into the concha cavity, the volumes of the front and rear cavities of the sound production component 11 should not be too large or too small. In order to keep a ratio of the resonance frequencies of the front cavity to the rear cavity in a range of 0.3-1.7, a ratio of the area $S_3$ of the sound outlet 112 and the area of the pressure relief hole is between 0.5 and 1.5. In some embodiments, the ratio of the area $S_3$ of the sound outlet 112 and the area of the pressure relief hole is between 0.6 and 1.3. In some embodiments, the ratio of the area $S_3$ of the sound outlet 112 and the area of the pressure relief hole is between 0.65 and 1.25. In some embodiments, the ratio of the area $S_3$ of the sound outlet 112 and the area of the pressure relief hole is between 0.7-1.2.

Figure 31:
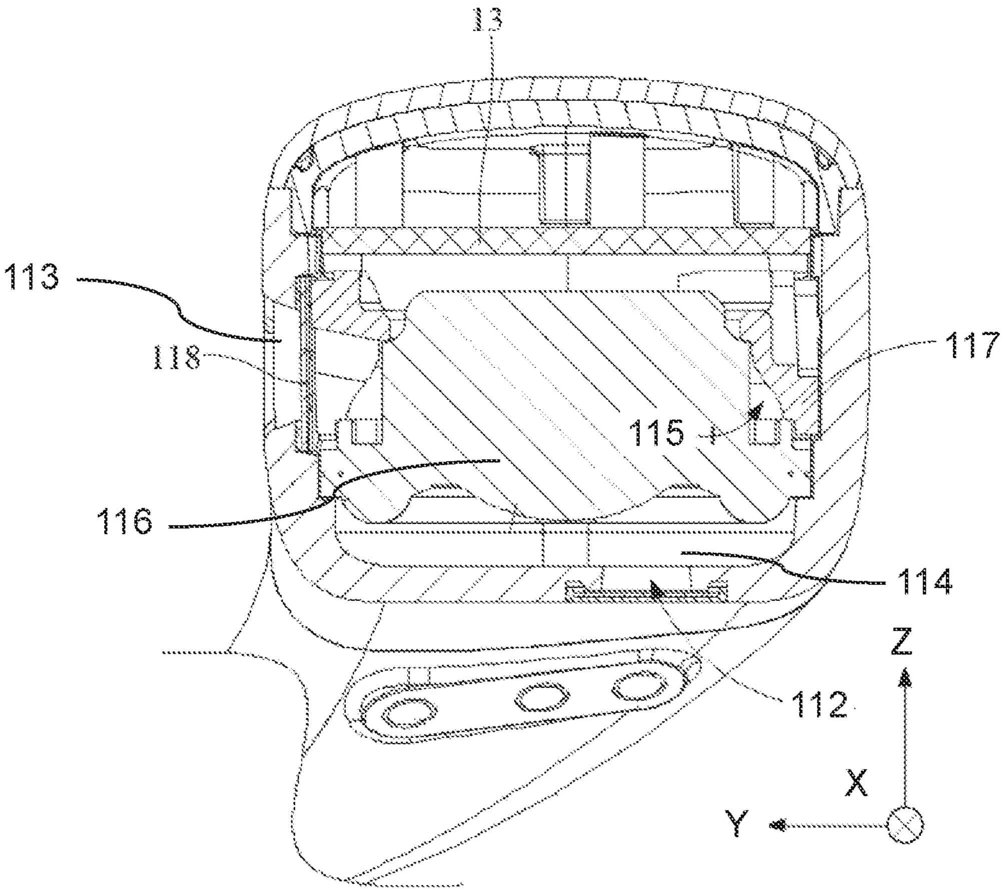
FIG. 31 is a diagram illustrating an exemplary internal structure of a sound production component according to some embodiments of the present disclosure.

FIG. 31 is a diagram illustrating an exemplary internal structure of a sound production component according to some embodiments of the present disclosure.

As shown in FIG. 31, the sound production component 11 may include a housing 111 connected to the ear hook 12 and a transducer 116 disposed in the housing 111. In some embodiments, the sound production component 11 may also include a master control circuit board 13 provided within the housing 111 and a battery (not shown) provided at one end of the ear hook 12 away from the sound production component 11. The battery and the transducer 116 are electrically connected to the master control circuit board 13, respectively, to allow the battery to power the transducer 116 under the control of the master control circuit board 13. Of course, both the battery and the transducer 116 may also be provided within the sound production component 11, and the battery may be closer to the connection end CE while the transducer 116 may be closer to the free end FE.

In some embodiments, the earphone 10 may include an adjustment mechanism connecting the sound production component 11 and the ear hook 12. Different users are able to adjust the relative position of the sound production component 11 on the ear through the adjustment mechanism in the wearing state so that the sound production component 11 is located at a suitable position, thus making the sound production component 11 form a cavity structure with the concha cavity. In addition, due to the presence of the adjustment mechanism, the user is also able to adjust the earphone 10 to wear to a more stable and comfortable position.

Since the concha cavity has a certain volume and depth, after the free end FE is inserted into the concha cavity, there may be a certain distance between the inner side surface IS and the concha cavity of the sound production component 11. In other words, the sound production component 11 and the concha cavity may cooperate to form a cavity structure communicated with the external ear canal in the wearing state. The sound production component 11 (e.g., the inner side surface IS) is provided with the sound outlet 112, and the sound outlet 112 may be at least partially located in the aforementioned cavity structure. In this way, in the wearing state, the sound waves transmitted by the sound outlet 112 are limited by the aforementioned cavity structure, i.e., the aforementioned cavity structure can gather sound waves, so that the sound waves can be better transmitted to the external ear canal, thus improving the volume and sound quality of the sound heard by the user in the near-field, which is beneficial to improve the acoustic effect of the earphone 10. Further, since the sound production component 11 may be set so as not to block the external ear canal in the wearing state, the aforementioned cavity structure may be in a semi-open setting. In this way, a portion of the sound waves transmitted by the sound outlet 112 may be transmitted to the ear canal thereby allowing the user to hear the sound, and another portion thereof may be transmitted with the sound reflected by the ear canal through a gap between the sound production component 11 and the ear (e.g., a portion of the concha cavity not covered by the sound production component 11) to the outside of the earphone 10 and the ear, thereby creating a first leakage in the far-field. At the same time, the sound waves transmitted through the pressure relief hole 113 opened on the sound production component 11 generally forms a second leakage sound in the far-field. An intensity of the aforementioned first leakage sound is similar to an intensity of the aforementioned second leakage sound, and a phase of the aforementioned first leakage sound and a phase of the aforementioned second leakage sound are opposite (or substantially opposite) to each other, so that the aforementioned first leakage sound and the aforementioned second leakage sound can cancel each other out in the far-field, which is conducive to reducing the leakage of the earphone 10 in the far-field.

In some embodiments, a front cavity 114 may be formed between the transducer 116 and the housing 111. The sound outlet 112 is provided in a region on the housing 111 that forms the front cavity 114, and the front cavity 114 is communicated with the outside world through the sound outlet 112.

In some embodiments, the front cavity 114 is set between a diaphragm of the transducer 116 and the housing 111. In order to ensure that the diaphragm has a sufficient vibration space, the front cavity 114 may have a large depth dimension (i.e., a distance dimension between the diaphragm of the transducer 116 and the housing 111 directly opposite to it). In some embodiments, as shown in FIG. 31, the sound outlet 112 is set on the inner side surface IS in the thickness direction Z. At this point, the depth of the front cavity 114 may refer to a dimension of the front cavity 114 in the Z-direction. However, too large the depth of the front cavity 114 may lead to an increase in the dimension of the sound production component 11 and affect the wearing comfort of the earphone 10. In some embodiments, the depth of the front cavity 114 may be in a range of 0.55 mm-1.00 mm. In some embodiments, the depth of the front cavity 114 may be in a range of 0.66 mm-0.99 mm. In some embodiments, the depth of the front cavity 114 may be in a range of 0.76 mm-0.99 mm. In some embodiments, the depth of the front cavity 114 may be in a range of 0.96 mm-0.99 mm. In some embodiments, the depth of the front cavity 114 may be 0.97 mm.

In order to improve the sound production effect of the earphone 10, a resonance frequency of a structure similar to a Helmholtz resonator formed by the front cavity 114 and the sound outlet 112 should be as high as possible, so that the overall frequency response curve of the sound production component has a wide flat region. In some embodiments, a resonance frequency $f_1$ of the front cavity 114 may be no less than 3 kHz. In some embodiments, the resonance frequency $f_1$ of the front cavity 114 may be no less than 4 kHz. In some embodiments, the resonance frequency $f_1$ of the front cavity 114 may be no less than 6 kHz. In some embodiments, the resonance frequency $f_1$ of the front cavity 114 may be no less than 7 kHz. In some embodiments, the resonance frequency $f_1$ of the front cavity 114 may be no less than 8 kHz.

Referring to FIG. 31, in some embodiments, a position corresponding to the pressure relief hole 113 may be provided with an acoustic resistance net 118, which may be used to adjust an amplitude at the resonance frequency of the rear cavity, and may also play a dustproof and waterproof role. In some embodiments, the position of the sound outlet 112 may also be provided with an acoustic resistance net 118, which may be used to adjust an amplitude of the corresponding resonance peak of the front cavity 114, and may also play a dustproof and waterproof role.

In some embodiments, the acoustic resistance net 118 may include a yarn mesh, a steel mesh, or a combination thereof. In some embodiments, an acoustic resistance rate provided in the front cavity 114 may be the same as an acoustic resistance rate provided in the rear cavity 115, i.e., the acoustic resistance net 118 provided at the sound outlet 112 may have the same acoustic resistance rate as the acoustic resistance net 118 provided at the pressure relief hole 113. For example, in order to facilitate structural assembly (e.g., to reduce material types and/or avoid mixing) and increase consistency in appearance, the same acoustic resistance net 118 may be provided at the sound outlet 112 and the pressure relief hole 113. In some embodiments, the acoustic impedance rate of the acoustic resistance net 118 provided in the front cavity 114 may also be different from that of the acoustic resistance net 118 provided in the rear cavity 115, i.e., the acoustic impedance rate of the acoustic resistance net 118 provided at the sound outlet 112 may be different from that of the acoustic resistance net 118 provided at the pressure relief hole 113. For example, a preset output effect may be achieved by setting the acoustic resistance nets 118 with different acoustic impedance rates at the front cavity 114 and the rear cavity 115 based on other parameters of the front cavity 114 and the rear cavity 115 (e.g., the area (or the area ratio) of the sound outlet 112 and/or the pressure relief hole(s) 113, the depth of each hole, the aspect ratio, etc.). For example, by setting the acoustic resistance nets 118 with different acoustic impedance rates, the sound pressures at the sound outlet 112 and the pressure relief hole(s) 113 are close to each other, so that the far-field leakage sound can be effectively reduced.

When the other parameters of the acoustic resistance net 118 are constant, the magnitude of its acoustic resistance is related to its thickness, and different thicknesses of the acoustic resistance nets have a certain effect on the acoustic output performance of the corresponding acoustic holes. Therefore, the thickness of the acoustic resistance net 118 is limited by a certain range. In some embodiments, the thickness of the acoustic resistance net 118 provided at the pressure relief hole 113 may be in a range of 35 μm to 300 μm. In some embodiments, the thickness of the acoustic resistance net 118 provided at the pressure relief hole 113 may be in a range of 40 μm-150 μm. In some embodiments, the thickness of the acoustic resistance net 118 provided at the pressure relief hole 113 may be in a range of 50 μm-65 μm. In some embodiments, the thickness of the acoustic resistance net 118 provided at the pressure relief hole 113 may be in a range of 55 μm-62 μm. On the other hand, the greater a distance between a side of the acoustic resistance net 118 toward the exterior of the housing 111 (i.e., an upper surface of the acoustic resistance net 118) and an outer surface of the housing 111 is, the closer the position of the corresponding acoustic resistance net 118 is set to the rear cavity, and the smaller the volume of the rear cavity is. In some embodiments, the distance between the upper surface of the acoustic resistance net 118 provided at the pressure relief hole 113 and the outer surface of the housing 1111 may be in a range of 0.8 mm-0.9 mm. In some embodiments, the distance between the upper surface of the acoustic resistance net 118 provided at the pressure relief hole 113 and the outer surface of the housing 1111 may be in a range of 0.82 mm-0.86 mm. In some embodiments, the distance between the upper surface of the acoustic resistance net 118 provided at the pressure relief hole 113 and the outer surface of the housing 1111 may be mm.

In some embodiments, mesh densities of different types of acoustic resistance nets 118 may also be different, resulting in different acoustic resistances of the corresponding acoustic holes and thus having an impact on the output of the corresponding acoustic cavities. Therefore, the composition and type of acoustic resistance net 118 needs to be designed. In some embodiments, in order to improve structural stability while protecting against water and dust, a steel mesh or a combination of a yarn mesh and a steel mesh may be used at the pressure relief hole 113 and/or the sound outlet 112. In some embodiments, in order to improve the smoothness of the frequency response curve of the sound production component 11 while enabling the sound production component 11 to have a large output sound pressure, the acoustic resistance net 118 provided in the front cavity 114 may include a steel mesh (e.g., an etched steel mesh), and a mesh number of the steel mesh may be in a range of 60-100. In some embodiments, in order to further reduce the acoustic impedance rate of the acoustic resistance net 118 to increase the output sound pressure of the sound production component 11, the acoustic resistance net 118 provided in the front cavity 114 may include a steel mesh, and a mesh number of the steel mesh may be in a range of 70-90. In some embodiments, in order to improve the smoothness of the frequency response curve of the sound production component 11 while enabling the sound production component 11 to have a large output sound pressure, the acoustic resistance net 118 provided in the front cavity 114 may include a yarn mesh and a steel mesh (e.g., an etched steel mesh). The yarn mesh may have an acoustic resistance rate in a range of 2 MKS rayls-50 MKS rayls, and the steel mesh may have a mesh number in a range of 60-100. In some embodiments, in order to improve the smoothness of the frequency response curve of the sound production component 11 while enabling the sound production component 11 to have a large output sound pressure, the acoustic resistance net 118 provided in the front cavity 114 may include a yarn mesh and a steel mesh, the yarn mesh may have an acoustic resistance rate in a range of 5 MKS rayls-20 MKS rayls, and the steel mesh may have a mesh number in a range of 70-90. In some embodiments, in order to improve the smoothness of the frequency response curve of the sound production component 11 while enabling the sound production component 11 to have a large output sound pressure, the acoustic resistance net 118 provided in the front cavity 114 may include a yarn mesh and a steel mesh, the yarn mesh may have an acoustic impedance rate in a range of 6 MKS rayls-10 MKS rayls, and the steel mesh may have a mesh number in a range of 75-85. In some embodiments, when the acoustic resistance net 118 provided in the front cavity 114 includes a steel mesh (e.g., an etched steel mesh) or a combination of a yarn mesh and a steel mesh, the steel mesh may have an acoustic resistance rate in a range of 0.1 MKS rayls-10 MKS rayls. In some embodiments, the steel mesh may have an acoustic resistance rate in a range of 0.1 MKS rayls-5 MKS rayls. In some embodiments, the steel mesh may have an acoustic resistance rate in a range of 0.1 MKS rayls-3 MKS rayls.

Figure 32:
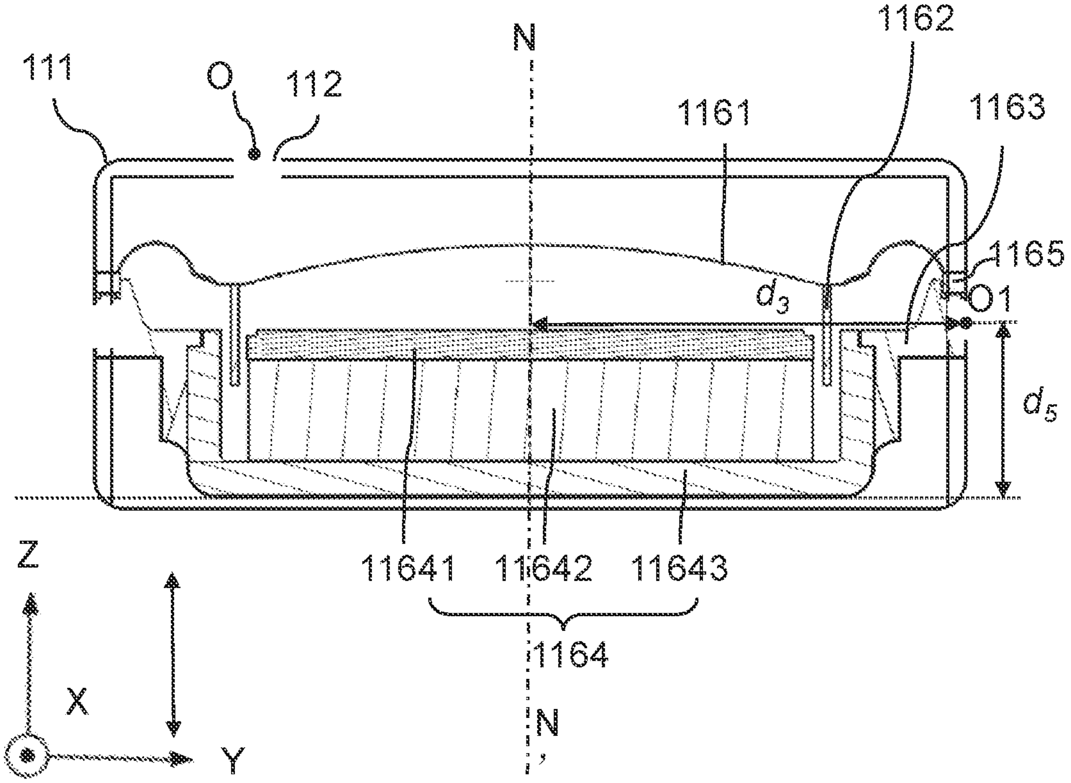
FIG. 32 is a diagram illustrating an exemplary internal structure of a transducer according to some embodiments of the present disclosure.

FIG. 32 is a diagram illustrating an exemplary internal structure of a transducer according to some embodiments of the present disclosure.

As shown in FIG. 32, the housing 111 accommodates the transducer 116. The transducer 116 includes a diaphragm 1161, a voice coil 1162, a cone holder 1163, and a magnetic circuit assembly 1164. The cone holder 1163 is provided around the diaphragm 1161, the voice coil 1162, and the magnetic circuit assembly 1164 to provide a fixing platform for mounting. The transducer 116 may be connected to the housing 111 through the cone holder 1163. The diaphragm 1161 covers the voice coil 1162 and the magnetic circuit assembly 1164 in the Z-direction, and the voice coil 1162 extends into the magnetic circuit assembly 1164 and is connected to the diaphragm 1161. A magnetic field generated after the voice coil 1162 is energized interacts with a magnetic field formed by the magnetic circuit assembly 1164, thereby driving the diaphragm 1161 to produce a mechanical vibration, which in turn produces sound through the dissertation of media such as air, and the sound is output through the sound outlet 112.

In some embodiments, the magnetic circuit assembly 1164 includes a magnetic conduction plate 11641, a magnet 11642, and an accommodation member 11643. The magnetic conduction plate 11641 and the magnet 11642 are connected with each other. The magnet 11642 is mounted on a bottom wall of the accommodation member 11643 on a side away from the magnetic conduction plate 11641, and the magnet 11642 has a gap between a peripheral side of the magnet 11642 and an inner side wall of the accommodation member 11643. In some embodiments, an outer side wall of the accommodation member 11643 is connected and fixed to the cone holder 1163. In some embodiments, both the accommodation member 11643 and the magnetic conduction plate 11641 may be made of a magnetically conductive material (e.g., iron, etc.).

In some embodiments, a peripheral side of the diaphragm 1161 may be connected to the cone holder 1163 by a fixing ring 1165. In some embodiments, a material of the fixing ring 1165 may include a stainless-steel material or any other metal material to adapt to the processing and manufacturing process of the diaphragm 1161.

Referring to FIG. 31 and FIG. 32, in some embodiments, in order to improve the acoustic output (especially low frequency output) effect of the sound production component 11 and improve the ability of the diaphragm 1161 to push the air, a projection area of the diaphragm 1161 along the Z direction is as large as possible. However, too large the area of the diaphragm 1161 leads to too large a dimension of the transducer 116, which in turn causes too large the housing 111, thus easily causing the housing 111 to collide and rub against the ear, thereby affecting the wearing comfort of the sound production component 11. Therefore, the dimension of the housing 111 needs to be designed. Exemplarily, a short-axis dimension (also be referred to as a width dimension) of the housing 111 in the Y-direction may be determined based on a dimension (e.g., 17 mm) of the concha cavity along the Y-direction, and then a suitable length-to-short ratio (i.e. a ratio of the dimension of the housing 111 in the X-direction to a dimension of the housing 111 in the Y-direction) is selected according to the wearing comfort, so as to determine a long-axis dimension (also be referred to as a length dimension) (e.g. 21.49 mm) of the housing 111 in the X-direction to match the dimension of the concha cavity along the X-direction.

In some embodiments, in order to facilitate the wearing by most users (e.g., to enable most users to wear the earphone 10 with the sound production component 11 at least partially inserted into the concha cavity or against the antihelix region) to form a cavity structure with better acoustics, for example, such that the earphone 10 forms the first leaking structure UC and the second leaking structure LC between the earphone 10 and the user's ear when the earphone 10 is in the wearing state to improve the acoustic performance of the earphone, the dimension of the housing 111 may be in a preset range. In some embodiments, depending on a width dimension range of the concha cavity along the Y-direction, the width dimension of the housing 111 along the Y-direction may be in a range of 11 mm-16 mm. In some embodiments, the width dimension of the housing 111 along the Y-direction may be in a range of 11 mm-15 mm. In some embodiments, the width dimension of the housing 111 along the Y-direction may be in a range of 14 mm-15 mm. In some embodiments, a ratio of the dimension of the housing 111 along the X-direction to the dimension of the housing 111 along the Y-direction may be in a range of 1.2-5. In some embodiments, the ratio of the dimension of the housing 111 along the X-direction to the dimension of the housing 111 along the Y-direction may be in a range of 1.4-4. In some embodiments, the ratio of the dimension of the housing 111 along the X-direction to the dimension of the housing 111 along the Y-direction may be in a range of 1.5-2. In some embodiments, the length dimension of the housing 111 along the X-direction may be in a range of 15 mm-30 mm. In some embodiments, the length dimension of the housing 111 along the X-direction may be in a range of 16 mm-28 mm. In some embodiments, the length dimension of the housing 111 along the X-direction may be in a range of 19 mm-24 mm. In some embodiments, in order to avoid the large volume of the housing 111 affecting the wearing comfort of the earphone 10, a thickness dimension of the housing 111 along the Z-direction may be in a range of 5 mm-20 mm. In some embodiments, the thickness dimension of the housing 111 along the Z-direction may be in a range of 5.1 mm-18 mm. In some embodiments, the thickness dimension of the housing 111 along the Z-direction may be in a range of 6 mm-15 mm. In some embodiments, the thickness dimension of the housing 111 along the Z-direction may be in a range of 7 mm-10 mm. In some embodiments, an area of the inner surface IS of the housing 111 (in the case where the inner surface IS is rectangular, the area is equal to a product of the length dimension and the width dimension of the housing 111) may be 90 $mm^2$-560 $mm^2$. In some embodiments, the area of the inner side surface IS may be considered to approximate the projection area of the diaphragm 1161 along the Z-direction. For example, the area of the inner side surface IS may differ by 10% from the projection area of the diaphragm 1161 along the Z-direction. In some embodiments, the area of the inner side surface IS may be 150 $mm^2$-360 $mm^2$. In some embodiments, the area of the inner side surface IS may be 160 $mm^2$-240 $mm^2$. In some embodiments, the area of the inner side surface IS may be 180 $mm^2$-200 $mm^2$. Based on the principles described in FIG. 23 to FIG. 26, when the earphone 10 is in the wearing state in the manner shown in FIG. 27, on the basis that the dimension of the earphone 10 satisfies the wearing comfort, the acoustic performance of the earphone 10 is superior to the existing open earphones, that is, the dimension of the earphone 10 can be smaller than the existing open earphones while achieving the same excellent acoustic performance.

Referring to FIG. 31 and FIG. 32, in some embodiments, a distance from the center O of the sound outlet 112 along the Z-direction to a bottom surface of the magnetic circuit assembly 1164 may be related to a vibration range of the diaphragm 1161 and a thickness of the magnetic circuit assembly 1164. The vibration range of the diaphragm 1161 may affect the amount of air pushed by the transducer of the sound production component 11. The greater the vibration range of the diaphragm 1161 is, the greater the amount of air pushed by the transducer of the sound production component 11 is, and the higher the sound production efficiency of the sound production component is. The greater the thickness of the magnetic circuit assembly 1164 is, the greater the total weight of the sound production component 11 is, which affects the comfort of the user. In addition, when the thickness of the sound production component in the Z-direction is a constant, the smaller the distance from the center O of the sound outlet 112 along the Z-direction to the bottom surface of the magnetic circuit assembly 1164 is, the larger the volume of the rear cavity may be. At this time, the smaller the resonance frequency of the rear cavity is, the resonance peak of the rear cavity moves to lower frequency, and a smaller range of the flat region of the frequency response curve is. In order to ensure that the sound production efficiency of the sound production component is sufficiently high, that the resonance frequency of the rear cavity is in a suitable frequency range (e.g., 1000 Hz-5000 Hz), and that the user is comfortable enough to wear, considering the structural strength, the difficulty of process implementation, and the overall thickness of the housing 111, the distance from the center O of the sound outlet 112 along the Z-direction to the bottom surface of the magnetic circuit assembly 1164 (i.e., a side of the accommodation member 11643 along the Z-direction away from the sound outlet 112) is in a range of 5.65 mm to 8.35 mm. In some embodiments, the distance from the center of the sound outlet 112 along the Z-direction to the bottom surface of the magnetic circuit assembly 1164 is in a range of 6.00 mm to 8.00 mm. In some embodiments, the distance from the center of the sound outlet 112 along the Z-direction to the bottom surface of the magnetic circuit assembly 1164 is in a range of 6.35 mm to 7.65 mm. In some embodiments, the distance from the center of the sound outlet 112 along the Z-direction to the bottom surface of the magnetic circuit assembly 1164 is in a range of 6.70 mm to 7.30 mm. In some embodiments, the distance from the center of the sound outlet 112 along the Z-direction to the bottom surface of the magnetic circuit assembly 1164 is in a range of 6.95 mm to 7.05 mm.

In some embodiments, in order to increase the resonance frequency of the rear cavity while also having a large sound capacity Ca, the volume V of the rear cavity needs to have a suitable value range. In some embodiments, in order to make the volume of the rear cavity have an appropriate value range, a distance from the center O1 of the pressure relief hole 113 to the bottom surface of the magnetic circuit assembly 1164 may be reasonably designed. Referring to FIG. 31 and FIG. 32, when the thickness of the sound production component 11 in the Z direction is constant, the smaller the distance from the center O1 of the pressure relief hole 113 to the bottom surface of the magnetic circuit assembly 1164 along the Z direction is, the larger the volume of the rear cavity may be, at which time, the sound capacity Ca of the rear cavity increases, but the corresponding resonance frequency of the rear cavity decreases. In order to ensure that the sound production efficiency of the sound production component 11 is sufficiently high, the resonance frequency of the rear cavity is in a suitable frequency range (e.g., 2000 Hz-6000 Hz), and the user is comfortable enough to wear it, taking into account the structural strength, the difficulty of process realization, and the overall thickness of the housing 111, a distance $d_5$ from the center O1 of the pressure relief hole 113 to the bottom surface of the magnetic circuit assembly 1164 (i.e., a side surface of the accommodation member 11643 away from the sound outlet 112 along the Z-direction) along the Z-direction is in a range of 1.31 mm to 1.98 mm. In some embodiments, the distance $d_5$ from the center O1 of the pressure relief hole 113 to the bottom surface of the magnetic circuit assembly 1164 along the Z-direction is in a range of 1.31 mm to 1.98 mm. In some embodiments, the distance $d_5$ from the center O1 of the pressure relief hole 113 to the bottom surface of the magnetic circuit assembly 1164 along the Z-direction is in a range of 1.41 mm to 1.88 mm. In some embodiments, the distance $d_5$ from the center O1 of the pressure relief hole 113 to the bottom surface of the magnetic circuit assembly 1164 along the Z-direction is in a range of 1.51 mm to 1.78 mm. In some embodiments, the distance $d_5$ from the center O1 of the pressure relief hole 113 to the bottom surface of the magnetic circuit assembly 1164 along the Z-direction is in a range of 1.56 mm to 1.72 mm.

In some embodiments, with a certain thickness of the sound production component, a difference between the distance from the center O of the sound outlet 112 to the bottom surface of the magnetic circuit assembly 1164 along the Z-direction and the distance from the center O1 of the pressure relief hole 113 to the bottom surface of the magnetic circuit assembly 1164 along the Z-direction should not be too large or too small. If it is too large, the volume of the front cavity can be too large, resulting in a smaller resonance frequency of the front cavity; if it is too small, the volume of the front cavity can be too small, resulting in a smaller vibration range of the diaphragm 1161 and affecting the amount of air pushed by the transducer of the sound production component 11, thereby affecting the sound production efficiency of the sound production component 11. In some embodiments, in order to ensure that the sound production efficiency of the sound production component 11 is sufficiently high, the resonance frequency of the rear cavity is in an appropriate frequency range (e.g., 2000 Hz-6000 Hz), and the user is comfortable enough to wear, a distance between the pressure relief hole 113 or the second pressure relief hole 1132 and the sound outlet 112 in the Z direction may be limited to achieve a better radio effect of the sound outlet 112 at the ear canal while the sound leakage cancellation effect is good. In some embodiments, a difference between the distance between the center O of the sound outlet 112 and the bottom surface of the magnetic circuit assembly 1164 along the Z-direction and the distance between the center O1 of the pressure relief hole 113 and the bottom surface of the magnetic circuit assembly 1164 along the Z-direction is in a range of 3.65 mm to 7.05 mm. In some embodiments, the difference between the distance between the center O of the sound outlet 112 and the bottom surface of the magnetic circuit assembly 1164 along the Z-direction and the distance between the center O1 of the pressure relief hole 113 and the bottom surface of the magnetic circuit assembly 1164 along the Z-direction is in a range of 4.00 mm to 6.85 mm. In some embodiments, the difference between the distance between the center O of the sound outlet 112 and the bottom surface of the magnetic circuit assembly 1164 along the Z-direction and the distance between the center O1 of the pressure relief hole 113 and the bottom surface of the magnetic circuit assembly 1164 along the Z-direction is in a range of 4.80 mm to 5.50 mm. In some embodiments, the difference between the distance between the center O of the sound outlet 112 and the bottom surface of the magnetic circuit assembly 1164 along the Z-direction and the distance between the center O1 of the pressure relief hole 113 and the bottom surface of the magnetic circuit assembly 1164 along the Z-direction is in a range of 5.20 mm to 5.55 mm.

In some embodiments, a distance between the center O of the sound outlet 112 and a long-axis center plane of the magnetic circuit assembly 1164 (e.g., a plane NN' perpendicular to an inward surface of the paper as shown in FIG. 32) is in a range of 1.45 mm to 2.15 mm. In the present disclosure, the long-axis center plane of the magnetic circuit assembly 1164 is a plane parallel to the lower side surface LS of the sound production component 11 and passing through the geometric center of the magnetic circuit assembly 1164. In other words, the long-axis center plane of the magnetic circuit assembly 1164 may divide the magnetic circuit assembly 1164 into two identical parts along the X-direction. The distance from the center O of the sound outlet 112 to the long-axis center plane of the magnetic circuit assembly 1164 is also a distance from the center O of the sound outlet 112 along the short-axis direction Y to the long-axis center plane. In some embodiments, the distance from the center O of the sound outlet 112 to the long-axis center plane is in a range of 1.55 mm to 2.05 mm. In some embodiments, the distance from the center O of the sound outlet 112 to the long-axis center plane is in a range of 1.65 mm to 1.95 mm. In some embodiments, the distance from the center O of the sound outlet 112 to the long-axis center plane is in a range of 1.75 mm to 1.85 mm.

In some embodiments, in order to adapt the dimension of the sound production component 11 to the dimension of the concha cavity, the dimension of the sound production component 11 along the Y-direction may be limited. In some embodiments, the dimension of the sound production component 11 along the Y-direction may be determined by the distance between the center O1 of the pressure relief hole 113 and the long-axis center plane of the magnetic circuit assembly 1164 (e.g., the plane NN' perpendicular to an inward surface of the paper as shown in FIG. 32). In some embodiments, the distance between the center O1 of the pressure relief hole 113 and the long-axis center plane of the magnetic circuit assembly 1164 (e.g., the plane NN' perpendicular to an inward surface of the paper as shown in FIG. 32) may be limited for design purposes. In some embodiments, the distance between the center O1 of the pressure relief hole 113 and the long-axis center plane of the magnetic circuit assembly 1164 is in a range of 5.45 mm to 8.19 mm. In the present disclosure, the long-axis center plane of the magnetic circuit assembly 1164 is a plane parallel to the lower side surface LS of the sound production component 11 and passing through the centroid of the magnetic circuit assembly 1164. That is, the long-axis center plane of the magnetic circuit assembly 1164 may divide the magnetic circuit assembly 1164 into two identical parts along the X-direction. The distance between the center O1 of the pressure relief hole 113 and the long-axis center plane of the magnetic circuit assembly 1164 is also a distance between the center O1 of the first pressure relief hole 1131 and the long-axis center plane along the short-axis direction Y. In some embodiments, the distance between the center O1 of the pressure relief hole 113 and the long-axis center plane of the magnetic circuit assembly 1164 is in a range of 5.95 mm to 8.69 mm. In some embodiments, the distance between the center O1 of the pressure relief hole 113 and the long-axis center plane of the magnetic circuit assembly 1164 is in a range of 6.45 mm to 7.19 mm. In some embodiments, the distance between the center O1 of the pressure relief hole 113 and the long-axis center plane of the magnetic circuit assembly 1164 is in a range of 6.65 mm to 6.99 mm.

In some embodiments, due to the presence of the pressure relief holes 113, the pressure in the rear cavity at a position close to the pressure relief hole 113 is similar to the outside pressure, and a pressure at a position away from the pressure relief hole 113 is higher than the outside pressure. Since the cone holder 1163 is provided with a sound transmission hole (not shown) connecting the rear side of the diaphragm 1161 to the rear cavity 115, in order to balance the pressure between the rear side of the diaphragm 1161 and the rear cavity 115, the sound transmission hole on the cone holder may be provided asymmetrically, so as to better balance the airflow. Specifically, at a position farther from the pressure relief hole 113, since the pressure is high, a dimension of the sound transmission hole may be large; and at a position closer to the pressure relief hole 113, since the pressure is low, the dimension of the sound transmission hole may be small. In some embodiments, by adjusting the dimensions (e.g., areas) of the pressure relief hole 113 and/or the sound transmission hole, the vibration of the low frequency of the earphone 10 can smoother.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. An earphone, comprising: a sound production component and a suspension structure, wherein in a wearing state, the suspension structure is used to place the sound production component at a position near but not blocking an ear canal; and the sound production component includes:

a housing;

a transducer residing inside the housing and configured to generate vibrations, the vibrations producing a sound wave inside the housing, and the transducer including a diaphragm; and at least two sound guiding holes located on the housing and configured to guide the sound wave inside the housing through the at least two sound guiding holes to an outside of the housing, the guided sound wave including at least two guided sound waves having different phases, the at least two guided sound waves interfering in a target region, and the interference reducing a sound pressure level of the leaked sound wave in the target region, wherein the at least two sound guiding holes include a sound outlet and a pressure relief hole, the sound outlet is disposed on an inner side surface of the housing facing an auricle and is configured to transmit a sound generated at a front side of the diaphragm to the ear canal, the pressure relief hole is disposed on at least another side surface of the housing and is configured to guide a sound generated at a rear side of the diaphragm out of the housing, and a distance between a center of the sound outlet and a midpoint of an upper boundary of the inner side surface is greater than a distance between a center of the pressure relief hole and the midpoint of the upper boundary of the inner side surface.

2. The earphone of claim 1, wherein a ratio of the distance between the center of the sound outlet and the midpoint of the upper boundary of the inner side surface to the distance between the center of the pressure relief hole and the midpoint of the upper boundary of the inner side surface is in a range of 1.3 to 2.1.

3. The earphone of claim 1, wherein a ratio of an area of the sound outlet to an area of the pressure relief hole is in a range of 0.5 to 1.5.

4. The earphone of claim 1, wherein in the wearing state, a ratio of a distance between a projection point of the center of the sound outlet on a sagittal plane and a centroid of a projection of an ear canal opening of the ear canal on the sagittal plane to a distance between a projection point of the center of the pressure relief hole on the sagittal plane and the centroid of the projection of the ear canal opening on the sagittal plane is in a range of 0.10-0.35.

5. The earphone of claim 1, wherein the suspension structure includes an ear hook, in the wearing state, a first portion of the ear hook is hung between an ear and a head of a user, a second portion of the ear hook extends towards a side of the auricle away from the head and connects to the sound production component, and a ratio of a distance between the center of the sound outlet and an upper vertex of the ear hook to a distance between the center of the pressure relief hole and the upper vertex of the ear hook is in a range of 1.10-1.70.

6. The earphone of claim 1, wherein the transducer further includes a magnetic circuit assembly, the magnetic circuit assembly is used to provide a magnetic field, and an absolute value of a difference between a distance between the center of the sound outlet and a long-axis center plane of the magnetic circuit assembly and a distance between the center of the pressure relief hole and the long-axis center plane is in a range of 4.0 mm-6.1 mm.

7. The earphone of claim 6, wherein a difference between a distance between the center of the sound outlet and a bottom surface of the magnetic circuit assembly and a distance between the center of the pressure relief hole and the bottom surface of the magnetic circuit assembly is in a range of 3.65 mm-7.05 mm.

8. The earphone of claim 1, wherein a distance from the center of the pressure relief hole to the inner side surface is in a range of 4.24 mm-7.96 mm.

9. The earphone of claim 1, wherein a distance from the center of the pressure relief hole to the center of the sound outlet is in a range of 4 mm-15.11 mm.

10. The earphone of claim 1, wherein a distance from a projection point of the center of the sound outlet on a sagittal plane to a projection point of the midpoint of the upper boundary of the inner side surface on the sagittal plane is in a range of 10.0 mm-15.2 mm.

11. The earphone of claim 1, wherein the suspension structure includes an ear hook, wherein in the wearing state, a distance from the center of the pressure relief hole to an upper vertex of the ear hook is in a range of 16.15 mm-24.25 mm.

12. The earphone of claim 11, wherein in the wearing state, a distance from the center of the sound outlet to the upper vertex of the ear hook is in a range of 22.5 mm-34.5 mm.

13. The earphone of claim 1, wherein an aspect ratio of the sound outlet is in a range of 1-10.

14. The earphone of claim 1, wherein the sound pressure level of the leaked sound wave within a target frequency range is reduced by 10 dB on average or more than 10 dB on average.

15. The earphone of claim 14, wherein the target frequency range is within a range of 1500 Hz to 3000 Hz.

16. The earphone of claim 15, wherein the frequency range is within a range of 2000 Hz to 2700 Hz.

17. The earphone of claim 16, wherein the sound pressure level of the leaked sound wave within the target frequency range is reduced by 20 dB or more than 20 dB on average.

18. The earphone of claim 16, wherein the sound pressure level of the leaked sound wave at 2300 Hz is reduced by more than 20 dB.

19. The earphone of claim 14, further including a damping layer configured to adjust a phase and amplitude of the guided sound wave.

20. The earphone of claim 19, wherein the damping layer includes at least one of a tuning paper, a tuning cotton, a nonwoven fabric, a silk, a cotton, a sponge, or a rubber.

* * * * *